United States Patent
Allison et al.

(10) Patent No.: US 9,330,375 B2
(45) Date of Patent: *May 3, 2016

(54) INTERACTIVE REAL ESTATE CONTRACT AND NEGOTIATION TOOL

(75) Inventors: Gregory Austin Allison, Morrow, OH (US); Matthew Allan Vorst, Blue Ash, OH (US)

(73) Assignee: dotloop, LLC, Seattle, WA (US)

( * ) Notice: Subject to any disclaimer, the term of this patent is extended or adjusted under 35 U.S.C. 154(b) by 642 days.

This patent is subject to a terminal disclaimer.

(21) Appl. No.: 12/589,099

(22) Filed: Oct. 16, 2009

(65) Prior Publication Data

US 2010/0100522 A1    Apr. 22, 2010

Related U.S. Application Data

(60) Provisional application No. 61/196,619, filed on Oct. 17, 2008.

(51) Int. Cl.
| | | |
|---|---|---|
| *G06F 17/30* | (2006.01) | |
| *G06Q 10/10* | (2012.01) | |
| *G06Q 50/16* | (2012.01) | |

(52) U.S. Cl.
CPC ............. *G06Q 10/10* (2013.01); *G06Q 50/16* (2013.01)

(58) Field of Classification Search
CPC ..... G06F 9/4875; G06F 17/24; G06F 17/211; G06F 17/212; G06F 17/30011; G06F 11/0742; G06F 17/3008
USPC .......................................... 707/805, 803, 736
See application file for complete search history.

(56) References Cited

U.S. PATENT DOCUMENTS

| | | | |
|---|---|---|---|
| 5,325,297 A | 6/1994 | Bird et al. | |
| 5,754,850 A | 5/1998 | Janssen | |
| 6,067,531 A | 5/2000 | Hoyt et al. | |
| 6,289,460 B1 | 9/2001 | Hajmiragha | |
| 6,519,618 B1 | 2/2003 | Snyder | |
| 6,711,554 B1 | 3/2004 | Salzmann et al. | |
| 6,810,404 B1 * | 10/2004 | Ferguson et al. | 707/999.005 |
| 6,944,648 B2 | 9/2005 | Cochran et al. | |
| 7,143,290 B1 * | 11/2006 | Ginter et al. | 713/176 |
| 7,725,359 B1 * | 5/2010 | Katzfey et al. | 705/26.1 |

(Continued)

FOREIGN PATENT DOCUMENTS

| | | | |
|---|---|---|---|
| KR | 1020020092595 A | 12/2002 | |
| KR | 1020070059931 A | 6/2007 | |

(Continued)

OTHER PUBLICATIONS

International Search Report dated Feb. 22, 2010 for Application No. PCT/US2009/061012.

(Continued)

*Primary Examiner* — James Trujillo
*Assistant Examiner* — Fatima Mina
(74) *Attorney, Agent, or Firm* — Perkins Coie LLP

(57) ABSTRACT

Term negotiation can utilize centralized systems accessed via web interfaces for purposes such as mediation of communications between buyers and sellers, maintenance of a history of negotiations, and notification of parties regarding changes suggested during negotiation. Changes to terms proposed by parties using centralized systems can be stored in a data warehouse, potentially along with timestamp and identification information.

17 Claims, 14 Drawing Sheets

(56) References Cited

U.S. PATENT DOCUMENTS

| | | |
|---|---|---|
| 8,239,496 B2 | 8/2012 | Peterson et al. |
| 2002/0069358 A1 | 6/2002 | Silvester |
| 2002/0099733 A1 | 7/2002 | Teruuchi et al. |
| 2002/0129056 A1 | 9/2002 | Conant et al. |
| 2002/0184485 A1 | 12/2002 | Dray, Jr. et al. |
| 2003/0056100 A1 | 3/2003 | Beatson |
| 2004/0133493 A1* | 7/2004 | Ford et al. ............ 705/35 |
| 2004/0205653 A1* | 10/2004 | Hadfield et al. ......... 715/530 |
| 2004/0220885 A1* | 11/2004 | Salzmann et al. ......... 705/80 |
| 2004/0225884 A1 | 11/2004 | Lorenzini et al. |
| 2004/0255114 A1 | 12/2004 | Lee et al. |
| 2005/0086596 A1* | 4/2005 | Koch et al. .......... 715/526 |
| 2006/0026136 A1 | 2/2006 | Drucker et al. |
| 2006/0085311 A1* | 4/2006 | Hoerle et al. ........... 705/35 |
| 2006/0259440 A1 | 11/2006 | Leake et al. |
| 2007/0088958 A1 | 4/2007 | Qa Im-maqami |
| 2007/0136361 A1 | 6/2007 | Lee et al. |
| 2008/0091954 A1* | 4/2008 | Morris et al. ............ 713/187 |
| 2008/0097777 A1 | 4/2008 | Rielo |
| 2008/0209313 A1 | 8/2008 | Gonser |
| 2008/0260287 A1 | 10/2008 | Berryman et al. |
| 2009/0003588 A1* | 1/2009 | Ross ..................... 380/28 |
| 2009/0024912 A1 | 1/2009 | McCabe et al. |
| 2009/0292786 A1 | 11/2009 | McCabe et al. |
| 2010/0287260 A1 | 11/2010 | Peterson et al. |
| 2011/0199631 A1 | 8/2011 | Healy |
| 2011/0276395 A1 | 11/2011 | Gaton et al. |
| 2011/0276875 A1 | 11/2011 | McCabe et al. |
| 2011/0314371 A1 | 12/2011 | Peterson et al. |

FOREIGN PATENT DOCUMENTS

| | | |
|---|---|---|
| WO | 9607156 A1 | 3/1996 |
| WO | 2009012478 A2 | 1/2009 |
| WO | 2009012478 A3 | 1/2009 |
| WO | 2010056262 A1 | 9/2010 |
| WO | 2010151630 A2 | 12/2010 |
| WO | 2011039563 A2 | 11/2011 |
| WO | 2011056819 A2 | 12/2011 |

OTHER PUBLICATIONS

International Search Report, PCT/US2008/070566, Mailed Feb. 19, 2009 (4 pages).

International Search Report, PCT/US2011/040218, Mailed Feb. 17, 2012 (3 pages).

International Search Report, PCT/US2010/039768, Mailed Feb. 23, 2011 (4 pages).

International Search Report, PCT/US2011/033194, Mailed Nov. 28, 2011 (4 pages).

* cited by examiner

INTERACTIVE REAL ESTATE CONTRACT AND NEGOTIATION TOOL

CROSS REFERENCE TO RELATED APPLICATIONS

This non-provisional application claims priority from U.S. Provisional Application Ser. No. 61/196,619, filed Oct. 17, 2008.

INCORPORATION BY REFERENCE

This application incorporates by reference in its entirety the information from the computer program listing appendix submitted herewith, comprising the files listed below:

| Creation | Size | Name |
| --- | --- | --- |
| 10/05/2009 03:43p | 24,251 | ADSource.txt |
| | | Directory of d:\SQL |
| 10/05/2009 04:57p | 74,284 | DB Schema.SQL |
| | | Directory of d:\app |
| 09/17/2009 11:39a | 7,541 | ContactUs.jsp |
| 09/10/2009 11:44p | 6,415 | ContactUsSuccess.jsp |
| 09/10/2009 11:44p | 749 | ErrorReport_Save.jsp |
| 09/10/2009 11:44p | 2,393 | Exception.jsp |
| 09/10/2009 11:44p | 10,380 | FAQ.jsp |
| 09/10/2009 11:49p | 3,107 | Help.jsp |
| 09/10/2009 11:44p | 5,897 | Home.jsp |
| 09/11/2009 12:12a | 5,533 | Jobs.jsp |
| 09/10/2009 11:49p | 1,790 | PopupHelp.jsp |
| 09/11/2009 12:12a | 7,132 | Privacy.jsp |
| 07/20/2009 09:54a | 80 | Status.jsp |
| 07/20/2009 09:54a | 469 | StatusDetail.jsp |
| 09/10/2009 11:49p | 7,983 | Terms.jsp |
| 09/10/2009 11:49p | 393 | Unsubscribe.jsp |
| 09/10/2009 11:44p | 284 | UnsubscribeSubmit.jsp |
| 09/10/2009 11:44p | 7,225 | UserAgreement.jsp |
| | | Directory of d:\app\META-INF |
| 07/05/2009 12:58p | 122 | MANIFEST.MF |
| | | Directory of d:\app\WEB-INF |
| 07/05/2009 12:58p | 1,043 | web.xml |
| | | Directory of d:\app\WEB-INF\email |
| 07/05/2009 12:58p | 6,870 | Agent_Info_Update_01.html |
| 07/05/2009 12:58p | 44 | Agent_Info_Update_01.subj |
| 07/05/2009 12:58p | 1,854 | Agent_Info_Update_01.text |
| 07/05/2009 12:58p | 6,668 | Client_Created_01.html |
| 07/05/2009 12:58p | 81 | Client_Created_01.subj |
| 07/05/2009 12:58p | 620 | Client_Created_01.text |
| 07/05/2009 12:58p | 6,870 | Contract_Accepted_01.html |
| 07/05/2009 12:58p | 68 | Contract_Accepted_01.subj |
| 07/05/2009 12:58p | 1,816 | Contract_Accepted_01.text |
| 07/05/2009 12:58p | 6,582 | Contract_Accepted_02.html |
| 07/05/2009 12:58p | 70 | Contract_Accepted_02.subj |
| 07/05/2009 12:58p | 1,275 | Contract_Accepted_02.text |
| 07/05/2009 12:58p | 6,507 | Contract_Accepted_03.html |
| 07/05/2009 12:58p | 63 | Contract_Accepted_03.subj |
| 07/05/2009 12:58p | 1,837 | Contract_Accepted_03.text |
| 07/05/2009 12:58p | 6,765 | Contract_Submitted_01.html |
| 07/05/2009 12:58p | 59 | Contract_Submitted_01.subj |
| 07/05/2009 12:58p | 1,687 | Contract_Submitted_01.text |
| 07/05/2009 12:58p | 6,550 | Contract_Submitted_02.html |
| 07/05/2009 12:58p | 60 | Contract_Submitted_02.subj |
| 07/05/2009 12:58p | 1,759 | Contract_Submitted_02.text |
| 08/02/2009 01:04p | 6,312 | Contract_Submitted_03.html |
| 07/05/2009 12:58p | 63 | Contract_Submitted_03.subj |
| 07/05/2009 12:58p | 1,513 | Contract_Submitted_03.text |
| 07/05/2009 12:58p | 195 | Exception_Email_01.html |
| 07/05/2009 12:58p | 27 | Exception_Email_01.subj |
| 07/05/2009 12:58p | 53 | Exception_Email_01.text |
| 07/05/2009 12:58p | 513 | Feedback_Email_01.html |
| 07/05/2009 12:58p | 63 | Feedback_Email_01.subj |
| 07/05/2009 12:58p | 222 | Feedback_Email_01.text |
| 07/05/2009 12:58p | 368 | Login_Email_01.html |
| 07/05/2009 12:58p | 60 | Login_Email_01.subj |
| 07/05/2009 12:58p | 154 | Login_Email_01.text |
| 09/16/2009 08:13p | 5,964 | New_Agent_01.html |
| 07/05/2009 12:58p | 113 | New_Agent_01.subj |
| 07/05/2009 12:58p | 1,588 | New_Agent_01.text |
| 07/05/2009 12:58p | 6,398 | New_Agent_Property_01.html |
| 07/05/2009 12:58p | 113 | New_Agent_Property_01.subj |

-continued

| Creation | Size | Name |
| --- | --- | --- |
| 07/05/2009 12:58p | 1,719 | New_Agent_Property_01.text |
| 07/05/2009 12:58p | 5,628 | New_Property_01.html |
| 07/05/2009 12:58p | 113 | New_Property_01.subj |
| 07/05/2009 12:58p | 901 | New_Property_01.text |
| 07/05/2009 12:58p | 6,776 | ReOpen_Offer_01.html |
| 07/05/2009 12:58p | 49 | ReOpen_Offer_01.subj |
| 07/05/2009 12:58p | 1,463 | ReOpen_Offer_01.text |
| 07/05/2009 12:58p | 6,355 | ReOpen_Offer_02.html |
| 07/05/2009 12:58p | 59 | ReOpen_Offer_02.subj |
| 07/05/2009 12:58p | 811 | ReOpen_Offer_02.text |
| 07/05/2009 12:58p | 332 | Register_New_Brokerage_01.html |
| 07/05/2009 12:58p | 78 | Register_New_Brokerage_01.subj |
| 07/05/2009 12:58p | 53 | Register_New_Brokerage_01.text |
| 07/05/2009 12:58p | 5,125 | Retrieve_Client_Password_01.html |
| 07/05/2009 12:58p | 46 | Retrieve_Client_Password_01.subj |
| 07/05/2009 12:58p | 1,045 | Retrieve_Client_Password_01.text |
| 07/05/2009 12:58p | 5,891 | Retrieve_Password_01.html |
| 07/05/2009 12:58p | 65 | Retrieve_Password_01.subj |
| 07/05/2009 12:58p | 1,109 | Retrieve_Password_01.text |
| 07/05/2009 12:58p | 5,826 | Retrieve_Username_01.html |
| 07/05/2009 12:58p | 65 | Retrieve_Username_01.subj |
| 07/05/2009 12:58p | 1,250 | Retrieve_Username_01.text |
| 07/05/2009 12:58p | 7,227 | User_Info_Update_01.html |
| 07/05/2009 12:58p | 48 | User_Info_Update_01.subj |
| 07/05/2009 12:58p | 1,828 | User_Info_Update_01.text |
| 07/05/2009 12:58p | 299 | Welcome_01.html |
| 07/05/2009 12:58p | 45 | Welcome_01.subj |
| 07/05/2009 12:58p | 102 | Welcome_01.text |
| 07/05/2009 12:58p | 5,896 | Withdraw_Offer_01.html |
| 07/05/2009 12:58p | 63 | Withdraw_Offer_01.subj |
| 07/05/2009 12:58p | 1,291 | Withdraw_Offer_01.text |
| | | Directory of d:\app\WEB-INF\lib |
| 07/05/2009 12:58p | 110,360 | activation.jar |
| 07/05/2009 12:58p | 3,635,877 | amazon-a2s-2007-10-29-java-library.jar |
| 07/05/2009 12:58p | 118,726 | commons-beanutils.jar |
| 07/05/2009 12:58p | 46,725 | commons-codec-1.3.jar |
| 07/05/2009 12:58p | 559,366 | commons-collections-3.1.jar |
| 07/05/2009 12:58p | 139,966 | commons-digester-1.7.jar |
| 07/05/2009 12:58p | 71,442 | commons-discovery-0.2.jar |
| 07/05/2009 12:58p | 16,326 | commons-email-beta.jar |
| 07/05/2009 12:58p | 31,909 | commons-fileupload-1.1.1.jar |
| 07/05/2009 12:58p | 279,781 | commons-httpclient-3.0.1.jar |
| 07/05/2009 12:58p | 45,550 | commons-io-1.0.jar |
| 07/05/2009 12:58p | 169,763 | commons-lang-2.0.jar |
| 07/05/2009 12:58p | 38,015 | commons-logging-1.0.4.jar |
| 07/05/2009 12:58p | 313,898 | dom4j-1.6.1.jar |
| 07/05/2009 12:58p | 802,494 | freemarker-2.3.8.jar |
| 07/05/2009 12:58p | 1,061,470 | iText-2.1.2u.jar |
| 07/05/2009 12:58p | 478,224 | ical4j-1.0-beta2.jar |
| 07/05/2009 12:58p | 2,465,761 | jasperreports-3.5.2.jar |
| 07/05/2009 12:58p | 32,062 | jaxrpc.jar |
| 09/08/2009 09:34a | 49,006 | json.jar |
| 07/05/2009 12:58p | 16,630 | jstl.jar |
| 07/05/2009 12:58p | 611,696 | jxl.jar |
| 07/05/2009 12:58p | 352,668 | log4j-1.2.8.jar |
| 07/05/2009 12:58p | 666,983 | mail.jar |
| 07/05/2009 12:58p | 178,220 | mailapi.jar |
| 10/02/2009 10:45a | 709,922 | mysql-connector-java-5.1.7-bin.jar |
| 07/05/2009 12:58p | 168,081 | ognl-2.6.11.jar |
| 07/05/2009 12:58p | 37,699 | paypal_base.jar |
| 07/05/2009 12:58p | 19,419 | saaj.jar |
| 07/05/2009 12:58p | 315,295 | standard.jar |
| 07/05/2009 12:58p | 2,326,673 | struts2-core-2.0.14.jar |
| 07/05/2009 12:58p | 261,710 | xstream-1.1.3.jar |
| 07/05/2009 12:58p | 459,735 | xwork-2.0.7.jar |
| | | Directory of d:\app\WEB-INF\tld |
| 09/04/2009 09:52a | 8,656 | form.tld |
| 07/05/2009 12:58p | 2,289 | foundation.tld |
| | | Directory of d:\app\admin |
| 07/05/2009 12:58p | 2,784 | AgentList.jsp |
| 08/30/2009 02:04p | 5,171 | Brokerage.jsp |
| 08/30/2009 02:04p | 2,740 | BrokerageAgentList.jsp |
| 08/31/2009 08:45a | 2,605 | BrokerageFormList.jsp |
| 08/25/2009 10:59a | 2,825 | BrokerageList.jsp |

-continued

| Creation | Size | Name |
|---|---|---|
| 08/30/2009 02:04p | 2,187 | BrokerageOfficeList.jsp |
| 08/02/2009 06:54p | 3,226 | Client.jsp |
| 08/02/2009 05:46p | 2,797 | ClientList.jsp |
| 07/05/2009 12:58p | 1,025 | EmailLog.jsp |
| 07/05/2009 12:58p | 1,661 | EmailLogList.jsp |
| 09/11/2009 12:02p | 527 | FormAdmin.jsp |
| 07/05/2009 12:58p | 2,285 | FormBrokerage.jsp |
| 09/11/2009 12:47p | 12,491 | FormDetail.jsp |
| 09/08/2009 09:34a | 2,732 | FormField.jsp |
| 07/05/2009 12:58p | 2,241 | FormFieldList.jsp |
| 07/05/2009 12:58p | 447 | FormFieldList_Json.jsp |
| 08/07/2009 09:18a | 1,140 | FormImport.jsp |
| 09/11/2009 12:01p | 3,894 | FormList.jsp |
| 09/11/2009 12:33p | 2,838 | FormMasterMetaList.jsp |
| 09/03/2009 03:48p | 8,217 | FormPage.jsp |
| 09/16/2009 03:32p | 11,190 | FormPageField.jsp |
| 08/18/2009 10:21a | 4,319 | FormPageFieldTableDefault.jsp |
| 08/10/2009 08:54a | 273 | FormPageFieldTableDefault_JsonList.jsp |
| 08/09/2009 12:24p | 439 | FormPageField_Json.jsp |
| 09/16/2009 08:13p | 2,250 | FormPageVerify.jsp |
| 07/05/2009 12:58p | 464 | Foundation.jsp |
| 07/05/2009 12:58p | 1,369 | Help.jsp |
| 07/05/2009 12:58p | 2,951 | HelpList.jsp |
| 09/02/2009 09:30a | 929 | Home.jsp |
| 08/02/2009 05:42p | 397 | InvalidCredentialsException.jsp |
| 07/05/2009 12:58p | 2,430 | Office.jsp |
| 07/05/2009 12:58p | 968 | OfficeList.jsp |
| 07/20/2009 09:54a | 867 | ServerStatus.jsp |
| 09/02/2009 09:30a | 1,142 | Statistics.jsp |
| 07/05/2009 12:58p | 3,557 | User.jsp |
| 09/20/2009 10:59a | 3,704 | UserAgent.jsp |
| 08/28/2009 11:14a | 3,696 | UserAgentPropertyUpload.jsp |
| 07/05/2009 12:58p | 3,176 | UserList.jsp |
| 07/05/2009 12:58p | 1,649 | UserPassword.jsp |
| 07/05/2009 12:58p | 1,439 | Workflow.jsp |
| | | Directory of d:\app\admin\codes |
| 07/05/2009 12:58p | 817 | AgentTitle.jsp |
| 07/05/2009 12:58p | 768 | AgentTitleList.jsp |
| 07/05/2009 12:58p | 848 | PhoneType.jsp |
| 07/05/2009 12:58p | 764 | PhoneTypeList.jsp |
| | | Directory of d:\app\admin\include |
| 08/31/2009 08:45a | 1,073 | FormRow.jsp |
| 08/05/2009 05:14p | 29 | adminFooter.jsp |
| 09/08/2009 09:34a | 317 | adminHeader.jsp |
| 07/05/2009 12:58p | 148 | adminHeaderDirectives.jsp |
| 07/05/2009 12:58p | 963 | adminHeaderNavigation.jsp |
| | | Directory of d:\app\agent |
| 07/05/2009 12:58p | 605 | AgentJSON.jsp |
| 07/05/2009 12:58p | 774 | AgentListJSON.jsp |
| | | Directory of d:\app\apps |
| 09/08/2009 09:34a | 101 | JSON.jsp |
| | | Directory of d:\app\client |
| 09/18/2009 06:20p | 8,123 | Client.jsp |
| 09/20/2009 10:59a | 5,863 | ClientList.jsp |
| 07/05/2009 12:59p | 393 | ClientListJSON.jsp |
| 09/10/2009 11:50p | 5,189 | ClientNotes.jsp |
| 09/10/2009 11:50p | 4,538 | ClientOffers.jsp |
| 07/05/2009 12:59p | 250 | ClientSaveJSON.jsp |
| | | Directory of d:\app\clientPortal |
| 09/16/2009 08:13p | 7,043 | ClientContractSignatures.jsp |
| 09/10/2009 11:44p | 6,103 | ClientContractSigned.jsp |
| 09/10/2009 11:44p | 4,240 | ClientCredentials.jsp |
| 09/10/2009 11:44p | 14,599 | ClientDashboard.jsp |
| 09/10/2009 11:44p | 2,751 | ClientEnroll.jsp |
| 09/10/2009 11:44p | 1,477 | ClientForgotPassword.jsp |
| 09/10/2009 11:44p | 1,758 | ClientForgotPasswordSecurity.jsp |
| 09/10/2009 11:44p | 1,121 | ClientForgotPasswordSent.jsp |
| 09/20/2009 10:59a | 7,129 | ClientFormList.jsp |
| 09/10/2009 11:44p | 5,063 | ClientHome.jsp |
| 09/10/2009 11:44p | 2,785 | ClientLogin.jsp |

-continued

| Creation | Size | Name |
| --- | --- | --- |
| 09/10/2009 11:44p | 4,518 | ClientNoticeHistory.jsp |
| 09/10/2009 11:44p | 6,031 | ClientPropertyList.jsp |
| | | Directory of d:\app\clientPortal\include |
| 08/04/2009 09:35a | 1,337 | ContractFooter.jsp |
| 09/17/2009 11:04a | 1,782 | Footer.jsp |
| 09/10/2009 11:44p | 2,213 | Header.jsp |
| 07/05/2009 12:58p | 148 | HeaderDirectives.jsp |
| 09/16/2009 08:13p | 3,414 | HeaderSignedIn.jsp |
| | | Directory of d:\app\contract |
| 07/20/2009 09:54a | 1,629 | ContractAgentBuyerList.jsp |
| 09/10/2009 11:49p | 6,995 | ContractAgentList.jsp |
| 07/05/2009 12:59p | 740 | ContractAgentListJson.jsp |
| 07/05/2009 12:59p | 3,470 | ContractAgentListPopup.jsp |
| 07/20/2009 09:54a | 1,619 | ContractAgentSellerList.jsp |
| 09/17/2009 09:51a | 6,284 | ContractAttachment.jsp |
| 09/10/2009 11:49p | 5,051 | ContractAttachmentList.jsp |
| 07/05/2009 12:59p | 910 | ContractClientBuyerList.jsp |
| 09/10/2009 11:49p | 7,216 | ContractClientList.jsp |
| 07/05/2009 12:59p | 750 | ContractClientListJson.jsp |
| 07/05/2009 12:59p | 3,604 | ContractClientListPopup.jsp |
| 07/05/2009 12:59p | 913 | ContractClientSellerList.jsp |
| 09/10/2009 11:49p | 4,276 | ContractHistory.jsp |
| 09/10/2009 11:49p | 3,430 | ContractHistoryFieldList.jsp |
| 09/18/2009 12:26p | 7,654 | ContractList.jsp |
| 09/10/2009 11:49p | 7,693 | ContractPayment.jsp |
| 09/10/2009 11:49p | 7,135 | ContractReOpen.jsp |
| 09/10/2009 11:49p | 4,912 | ContractReOpenError.jsp |
| 09/10/2009 11:44p | 7,106 | ContractSearchList.jsp |
| 09/10/2009 11:49p | 2,728 | ContractSent.jsp |
| 09/10/2009 11:49p | 2,723 | ContractSign.jsp |
| 09/17/2009 11:39a | 15,348 | ContractSignature.jsp |
| 09/10/2009 11:49p | 1,184 | ContractSignatureBypassed.jsp |
| 09/10/2009 11:49p | 13,757 | ContractSignatureClients.jsp |
| 09/15/2009 05:23p | 7,583 | ContractSubmit.jsp |
| 07/05/2009 12:59p | 325 | ContractWarningsJson.jsp |
| 09/10/2009 11:49p | 3,153 | ContractWithdraw.jsp |
| 09/10/2009 11:44p | 23,313 | CreateOffer.jsp |
| 07/05/2009 12:59p | 869 | FieldHistoryJSON.jsp |
| 09/10/2009 11:44p | 619 | InsufficientRightsException.jsp |
| 09/10/2009 11:49p | 6,655 | LookupProperty.jsp |
| 09/10/2009 11:49p | 7,579 | MyContractArchiveList.jsp |
| 09/10/2009 11:49p | 7,624 | MyContractList.jsp |
| 09/10/2009 11:49p | 9,178 | NewContract.jsp |
| 07/05/2009 12:59p | 582 | NewContractAgentJSON.jsp |
| 09/10/2009 11:49p | 20,361 | PrepareSubmit.jsp |
| 09/10/2009 11:44p | 7,677 | SaveContract.jsp |
| 07/05/2009 12:59p | 325 | TestContractPopup.jsp |
| 07/05/2009 12:59p | 188 | UpdateOfferNameJSON.jsp |
| | | Directory of d:\app\contract\contracts\JSP Template |
| 08/17/2009 09:39a | 0 | COPY ALL FILES INTO FOLDER AND EDIT |
| | | Page_01_Inc.txt |
| 09/10/2009 11:45p | 1,184 | Page_01.jsp |
| 08/17/2009 09:39a | 391 | Page_01_Client.jsp |
| 08/17/2009 09:39a | 513 | Page_01_ClientView.jsp |
| 09/08/2009 09:34a | 2,169 | Page_01_Inc.jsp |
| 09/10/2009 11:45p | 713 | Page_01_New.jsp |
| | | Directory of d:\app\contract\contracts\kentucky\Lexington_Board\Addendum |
| 09/10/2009 11:47p | 1,184 | Page_01.jsp |
| 08/17/2009 09:39a | 391 | Page_01_Client.jsp |
| 08/17/2009 09:39a | 513 | Page_01_ClientView.jsp |
| 08/26/2009 08:57p | 4,087 | Page_01_Inc.jsp |
| 09/10/2009 11:47p | 713 | Page_01_New.jsp |
| | | Directory of |
| | | d:\app\contract\contracts\kentucky\Lexington_Board\Addendum_To_Offer_To_Purchase |
| 09/10/2009 11:47p | 1,184 | Page_01.jsp |
| 08/14/2009 04:01p | 391 | Page_01_Client.jsp |
| 08/14/2009 04:01p | 513 | Page_01_ClientView.jsp |
| 08/28/2009 09:08a | 9,733 | Page_01_Inc.jsp |
| 09/10/2009 11:47p | 713 | Page_01_New.jsp |

-continued

| Creation | Size | Name |
|---|---|---|
| Directory of d:\app\contract\contracts\kentucky\Lexington_Board\Additional_Work_Authorization ||||

| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 6,915 | Page_01_Inc.jsp |
| 09/24/2009 10:34a | 713 | Page_01_New.jsp |
| Directory of d:\app\contract\contracts\kentucky\Lexington_Board\Advertising_Disclosure ||||

| 09/10/2009 11:48p | 1,184 | Page_01.jsp |
| 08/17/2009 09:39a | 391 | Page_01_Client.jsp |
| 08/17/2009 09:39a | 513 | Page_01_ClientView.jsp |
| 08/23/2009 01:12p | 3,920 | Page_01_Inc.jsp |
| 09/10/2009 11:48p | 713 | Page_01_New.jsp |
| Directory of d:\app\contract\contracts\kentucky\Lexington_Board\Arbitrate_Request_Agreement ||||

| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/24/2009 10:34a | 6,042 | Page_01_Inc.jsp |
| 09/24/2009 10:34a | 713 | Page_01_New.jsp |
| Directory of d:\app\contract\contracts\kentucky\Lexington_Board\Business_Input_Sheet ||||

| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 09/03/2009 03:31p | 14,142 | Page_01_Inc.jsp |
| 09/10/2009 11:47p | 713 | Page_01_New.jsp |
| Directory of d:\app\contract\contracts\kentucky\Lexington_Board\Buyer_Representation_Agreement ||||

| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/30/2009 09:31a | 9,867 | Page_01_Inc.jsp |
| 09/24/2009 10:34a | 713 | Page_01_New.jsp |
| Directory of d:\app\contract\contracts\kentucky\Lexington_Board\Commercial_Agreement_To_Lease ||||

| 09/24/2009 10:35a | 1,184 | Page_01.jsp |
| 09/24/2009 10:35a | 391 | Page_01_Client.jsp |
| 09/24/2009 10:35a | 513 | Page_01_ClientView.jsp |
| 09/30/2009 09:31a | 8,114 | Page_01_Inc.jsp |
| 09/24/2009 10:35a | 713 | Page_01_New.jsp |
| 09/24/2009 10:35a | 1,184 | Page_02.jsp |
| 09/24/2009 10:35a | 391 | Page_02_Client.jsp |
| 09/24/2009 10:35a | 513 | Page_02_ClientView.jsp |
| 09/30/2009 09:31a | 6,634 | Page_02_Inc.jsp |
| 09/24/2009 10:35a | 713 | Page_02_New.jsp |
| Directory of d:\app\contract\contracts\kentucky\Lexington_Board\Commercial_Exclusive_Right_To_Sell ||||

| 09/28/2009 12:41p | 1,184 | Page_01.jsp |
| 09/28/2009 12:41p | 391 | Page_01_Client.jsp |
| 09/28/2009 12:41p | 513 | Page_01_ClientView.jsp |
| 09/28/2009 12:41p | 8,240 | Page_01_Inc.jsp |
| 09/28/2009 12:41p | 713 | Page_01_New.jsp |
| Directory of d:\app\contract\contracts\kentucky\Lexington_Board\Commercial_Input_Sheet_07_08 ||||

| 09/10/2009 11:47p | 1,184 | Page_01.jsp |
| 08/29/2009 12:01p | 391 | Page_01_Client.jsp |
| 08/29/2009 12:01p | 513 | Page_01_ClientView.jsp |
| 09/03/2009 03:31p | 12,566 | Page_01_Inc.jsp |
| 09/10/2009 11:47p | 713 | Page_01_New.jsp |
| 09/10/2009 11:47p | 1,184 | Page_02.jsp |
| 08/29/2009 12:01p | 391 | Page_02_Client.jsp |
| 08/29/2009 12:01p | 513 | Page_02_ClientView.jsp |
| 09/03/2009 03:31p | 25,630 | Page_02_Inc.jsp |
| 09/10/2009 11:47p | 713 | Page_02_New.jsp |
| Directory of d:\app\contract\contracts\kentucky\Lexington_Board\Commercial_Land_Input_Sheet ||||

| 09/10/2009 11:47p | 1,186 | Page_01.jsp |
| 09/10/2009 11:47p | 415 | Page_01_Client.jsp |

-continued

| Creation | Size | Name |
| --- | --- | --- |
| 09/10/2009 11:47p | 537 | Page_01_ClientView.jsp |
| 09/04/2009 09:52a | 16,360 | Page_01_Inc.jsp |
| 09/10/2009 11:47p | 713 | Page_01_New.jsp |

Directory of
d:\app\contract\contracts\kentucky\Lexington_Board\Commercial_Offer_To_Purchase

| Creation | Size | Name |
| --- | --- | --- |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 8,736 | Page_01_Inc.jsp |
| 09/24/2009 10:34a | 713 | Page_01_New.jsp |
| 09/24/2009 10:34a | 1,184 | Page_02.jsp |
| 09/24/2009 10:34a | 391 | Page_02_Client.jsp |
| 09/24/2009 10:34a | 513 | Page_02_ClientView.jsp |
| 10/02/2009 10:45a | 7,729 | Page_02_Inc.jsp |
| 09/24/2009 10:34a | 713 | Page_02_New.jsp |
| 09/24/2009 10:34a | 1,184 | Page_03.jsp |
| 09/24/2009 10:34a | 391 | Page_03_Client.jsp |
| 09/24/2009 10:34a | 513 | Page_03_ClientView.jsp |
| 10/02/2009 10:45a | 4,693 | Page_03_Inc.jsp |
| 09/24/2009 10:34a | 713 | Page_03_New.jsp |
| 09/24/2009 10:34a | 1,184 | Page_04.jsp |
| 09/24/2009 10:34a | 391 | Page_04_Client.jsp |
| 09/24/2009 10:34a | 513 | Page_04_ClientView.jsp |
| 10/02/2009 10:45a | 1,313 | Page_04_Inc.jsp |
| 09/24/2009 10:34a | 713 | Page_04_New.jsp |

Directory of
d:\app\contract\contracts\kentucky\Lexington_Board\Conditional_Land_Sale_Clause

| Creation | Size | Name |
| --- | --- | --- |
| 09/10/2009 11:47p | 1,184 | Page_01.jsp |
| 08/17/2009 11:40a | 391 | Page_01_Client.jsp |
| 08/17/2009 11:40a | 513 | Page_01_ClientView.jsp |
| 09/02/2009 09:30a | 6,299 | Page_01_Inc.jsp |
| 09/10/2009 11:47p | 713 | Page_01_New.jsp |

Directory of d:\app\contract\contracts\kentucky\Lexington_Board\Confidentiality_Agreement

| Creation | Size | Name |
| --- | --- | --- |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 4,957 | Page_01_Inc.jsp |
| 09/24/2009 10:34a | 713 | Page_01_New.jsp |

Directory of
d:\app\contract\contracts\kentucky\Lexington_Board\Cooperation_Compensation_Agreement

| Creation | Size | Name |
| --- | --- | --- |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/28/2009 12:41p | 4,959 | Page_01_Inc.jsp |
| 09/24/2009 10:34a | 713 | Page_01_New.jsp |

Directory of d:\app\contract\contracts\kentucky\Lexington_Board\Estimated_Seller_Proceeds

| Creation | Size | Name |
| --- | --- | --- |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/30/2009 09:31a | 12,846 | Page_01_Inc.jsp |
| 09/24/2009 10:34a | 713 | Page_01_New.jsp |

Directory of d:\app\contract\contracts\kentucky\Lexington_Board\Exclusive_Right_To_Rent

| Creation | Size | Name |
| --- | --- | --- |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/28/2009 12:41p | 7,382 | Page_01_Inc.jsp |
| 09/24/2009 10:34a | 713 | Page_01_New.jsp |

Directory of d:\app\contract\contracts\kentucky\Lexington_Board\Exclusive_Right_To_Sell

| Creation | Size | Name |
| --- | --- | --- |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 08/23/2009 01:12p | 6,876 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |
| 09/10/2009 11:47p | 537 | Page_02_ClientView.jsp |
| 08/23/2009 01:12p | 5,465 | Page_02_Inc.jsp |
| 09/10/2009 11:47p | 713 | Page_02_New.jsp |

-continued

| Creation | Size | Name |
|---|---|---|
| colspan="3" | Directory of d:\app\contract\contracts\kentucky\Lexington_Board\Farm_Offer_Purchase_Check | |
| 09/28/2009 12:41p | 1,184 | Page_01.jsp |
| 09/28/2009 12:41p | 391 | Page_01_Client.jsp |
| 09/28/2009 12:41p | 513 | Page_01_ClientView.jsp |
| 10/02/2009 10:45a | 7,735 | Page_01_Inc.jsp |
| 09/28/2009 12:41p | 713 | Page_01_New.jsp |
| colspan="3" | Directory of d:\app\contract\contracts\kentucky\Lexington_Board\Google_Base_Opt_Out | |
| 09/28/2009 12:41p | 1,184 | Page_01.jsp |
| 09/28/2009 12:41p | 391 | Page_01_Client.jsp |
| 09/28/2009 12:41p | 513 | Page_01_ClientView.jsp |
| 09/28/2009 12:41p | 2,538 | Page_01_Inc.jsp |
| 09/28/2009 12:41p | 713 | Page_01_New.jsp |
| colspan="3" | Directory of d:\app\contract\contracts\kentucky\Lexington_Board\Inducements_Rebate_Disclosure\Buyer | |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 10/02/2009 10:45a | 2,882 | Page_01_Inc.jsp |
| 09/10/2009 11:47p | 713 | Page_01_New.jsp |
| colspan="3" | Directory of d:\app\contract\contracts\kentucky\Lexington_Board\Inducements_Rebate_Disclosure\Seller | |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 10/02/2009 10:45a | 2,790 | Page_01_Inc.jsp |
| 09/10/2009 11:47p | 713 | Page_01_New.jsp |
| colspan="3" | Directory of d:\app\contract\contracts\kentucky\Lexington_Board\Intent_To_Sell | |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/28/2009 12:41p | 4,574 | Page_01_Inc.jsp |
| 09/24/2009 10:34a | 713 | Page_01_New.jsp |
| colspan="3" | Directory of d:\app\contract\contracts\kentucky\Lexington_Board\Kickout_Right_Of_Refusal | |
| 09/24/2009 10:34a | 10,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 7,091 | Page_01_Inc.jsp |
| 09/24/2009 10:34a | 713 | Page_01_New.jsp |
| colspan="3" | Directory of d:\app\contract\contracts\kentucky\Lexington_Board\Lead_Based_Paint_Acknowledgement | |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 08/28/2009 09:08a | 7,743 | Page_01_Inc.jsp |
| 09/10/2009 11:47p | 713 | Page_01_New.jsp |
| colspan="3" | Directory of d:\app\contract\contracts\kentucky\Lexington_Board\Listing_Agent_Check | |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/30/2009 09:31a | 7,574 | Page_01_Inc.jsp |
| 09/24/2009 10:34a | 713 | Page_01_New.jsp |
| 09/28/2009 12:41p | 1,186 | Page_02.jsp |
| 09/28/2009 12:41p | 415 | Page_02_Client.jsp |
| 09/28/2009 12:41p | 537 | Page_02_ClientView.jsp |
| 09/30/2009 09:31a | 7,513 | Page_02_Inc.jsp |
| 09/28/2009 12:41p | 713 | Page_02_New.jsp |
| colspan="3" | Directory of d:\app\contract\contracts\kentucky\Lexington_Board\Loan_Assumption_Addendum | |
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 08/28/2009 11:15a | 6,167 | Page_01_Inc.jsp |
| 09/10/2009 11:48p | 713 | Page_01_New.jsp |
| colspan="3" | Directory of d:\app\contract\contracts\kentucky\Lexington_Board\MLS_Farm_Input_Sheet | |
| 09/10/2009 11:47p | 1,186 | Page_01.jsp |
| 09/10/2009 11:47p | 415 | Page_01_Client.jsp |

-continued

| Creation | Size | Name |
| --- | --- | --- |
| 09/10/2009 11:47p | 537 | Page_01_ClientView.jsp |
| 09/01/2009 06:37p | 13,767 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |
| 09/10/2009 11:47p | 537 | Page_02_ClientView.jsp |
| 08/28/2009 04:33p | 22,558 | Page_02_Inc.jsp |
| 09/10/2009 11:47p | 713 | Page_02_New.jsp |

Directory of d:\app\contract\contracts\kentucky\Lexington_Board\MLS_Multi_Housing_Input_Sheet

| Creation | Size | Name |
| --- | --- | --- |
| 09/10/2009 11:48p | 1,184 | Page_01.jsp |
| 08/29/2009 12:01p | 391 | Page_01_Client.jsp |
| 08/29/2009 12:01p | 513 | Page_01_ClientView.jsp |
| 09/08/2009 08:48p | 9,534 | Page_01_Inc.jsp |
| 09/10/2009 11:47p | 713 | Page_01_New.jsp |
| 09/10/2009 11:48p | 1,184 | Page_02.jsp |
| 08/29/2009 12:01p | 391 | Page_02_Client.jsp |
| 08/29/2009 12:01p | 513 | Page_02_ClientView.jsp |
| 09/04/2009 05:17p | 13,921 | Page_02_Inc.jsp |
| 09/10/2009 11:48p | 713 | Page_02_New.jsp |
| 09/10/2009 11:48p | 1,184 | Page_03.jsp |
| 08/29/2009 12:01p | 391 | Page_03_Client.jsp |
| 08/29/2009 12:01p | 513 | Page_03_ClientView.jsp |
| 09/08/2009 08:48p | 18,829 | Page_03_Inc.jsp |
| 09/10/2009 11:48p | 713 | Page_03_New.jsp |

Directory of d:\app\contract\contracts\kentucky\Lexington_Board\MLS_Rent_Input_Sheet

| Creation | Size | Name |
| --- | --- | --- |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 09/01/2009 06:37p | 8,591 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |
| 09/10/2009 11:47p | 537 | Page_02_ClientView.jsp |
| 08/27/2009 02:17p | 34,228 | Page_02_Inc.jsp |
| 09/10/2009 11:47p | 713 | Page_02_New.jsp |

Directory of d:\app\contract\contracts\kentucky\Lexington_Board\MLS_Residential_Input_Sheet

| Creation | Size | Name |
| --- | --- | --- |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 09/03/2009 03:31p | 9,778 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |
| 09/10/2009 11:47p | 537 | Page_02_ClientView.jsp |
| 08/28/2009 04:21p | 58,496 | Page_02_Inc.jsp |
| 09/10/2009 11:47p | 713 | Page_02_New.jsp |

Directory of d:\app\contract\contracts\kentucky\Lexington_Board\Offer_To_Purchase

| Creation | Size | Name |
| --- | --- | --- |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 08/28/2009 04:33p | 10,177 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |
| 09/10/2009 11:47p | 537 | Page_02_ClientView.jsp |
| 08/17/2009 02:54p | 6,949 | Page_02_Inc.jsp |
| 09/10/2009 11:47p | 713 | Page_02_New.jsp |
| 09/10/2009 11:47p | 1,186 | Page_03.jsp |
| 09/10/2009 11:47p | 422 | Page_03_Client.jsp |
| 09/10/2009 11:47p | 544 | Page_03_ClientView.jsp |
| 08/17/2009 02:54p | 7,168 | Page_03_Inc.jsp |
| 09/10/2009 11:47p | 713 | Page_03_New.jsp |
| 09/10/2009 11:47p | 1,186 | Page_04.jsp |
| 09/10/2009 11:47p | 415 | Page_04_Client.jsp |
| 09/10/2009 11:47p | 537 | Page_04_ClientView.jsp |
| 08/17/2009 02:54p | 5,399 | Page_04_Inc.jsp |
| 09/10/2009 11:47p | 713 | Page_04_New.jsp |
| 09/10/2009 11:47p | 1,186 | Page_05.jsp |
| 09/10/2009 11:47p | 415 | Page_05_Client.jsp |
| 09/10/2009 11:47p | 537 | Page_05_ClientView.jsp |

-continued

| Creation | Size | Name |
|---|---|---|
| 08/28/2009 04:33p | 5,919 | Page_05_Inc.jsp |
| 09/10/2009 11:47p | 713 | Page_05_New.jsp |

Directory of d:\app\contract\contracts\kentucky\Lexington_Board\Post_Closing_Agreement

| Creation | Size | Name |
|---|---|---|
| 09/18/2009 12:26p | 1,184 | Page_01.jsp |
| 09/18/2009 12:26p | 391 | Page_01_Client.jsp |
| 09/18/2009 12:26p | 513 | Page_01_ClientView.jsp |
| 09/28/2009 12:41p | 8,944 | Page_01_Inc.jsp |
| 09/18/2009 12:26p | 713 | Page_01_New.jsp |

Directory of d:\app\contract\contracts\kentucky\Lexington_Board\Pre_Closing_Agreement

| Creation | Size | Name |
|---|---|---|
| 09/18/2009 03:26p | 1,184 | Page_01.jsp |
| 09/18/2009 03:26p | 391 | Page_01_Client.jsp |
| 09/18/2009 03:26p | 513 | Page_01_ClientView.jsp |
| 09/30/2009 09:31a | 9,339 | Page_01_Inc.jsp |
| 09/18/2009 03:26p | 713 | Page_01_New.jsp |

Directory of d:\app\contract\contracts\kentucky\Lexington_Board\Referral_Office_Certification

| Creation | Size | Name |
|---|---|---|
| 09/28/2009 12:41p | 1,184 | Page_01.jsp |
| 09/28/2009 12:41p | 391 | Page_01_Client.jsp |
| 09/28/2009 12:41p | 513 | Page_01_ClientView.jsp |
| 09/28/2009 12:41p | 2,809 | Page_01_Inc.jsp |
| 09/28/2009 12:41p | 713 | Page_01_New.jsp |

Directory of d:\app\contract\contracts\kentucky\Lexington_Board\Release_Agreement

| Creation | Size | Name |
|---|---|---|
| 09/17/2009 07:29p | 1,184 | Page_01.jsp |
| 09/17/2009 07:29p | 391 | Page_01_Client.jsp |
| 09/17/2009 07:29p | 513 | Page_01_ClientView.jsp |
| 09/30/2009 09:31a | 5,884 | Page_01_Inc.jsp |
| 09/17/2009 07:29p | 713 | Page_01_New.jsp |

Directory of d:\app\contract\contracts\kentucky\Lexington_Board\Release_Contingency

| Creation | Size | Name |
|---|---|---|
| 09/17/2009 07:29p | 1,184 | Page_01.jsp |
| 09/17/2009 07:29p | 391 | Page_01_Client.jsp |
| 09/17/2009 07:29p | 513 | Page_01_ClientView.jsp |
| 09/28/2009 12:41p | 4,204 | Page_01_Inc.jsp |
| 09/17/2009 07:29p | 713 | Page_01_New.jsp |

Directory of d:\app\contract\contracts\kentucky\Lexington_Board\Release_Of_Exclusive_Right_To_Sell

| Creation | Size | Name |
|---|---|---|
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 08/28/2009 04:21p | 4,024 | Page_01_Inc.jsp |
| 09/10/2009 11:48p | 713 | Page_01_New.jsp |

Directory of d:\app\contract\contracts\kentucky\Lexington_Board\Release_Right_Of_Refusal

| Creation | Size | Name |
|---|---|---|
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 5,928 | Page_01_Inc.jsp |
| 09/24/2009 10:34a | 713 | Page_01_New.jsp |

Directory of d:\app\contract\contracts\kentucky\Lexington_Board\Rental_Lead_Based_Disclosure

| Creation | Size | Name |
|---|---|---|
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 6,702 | Page_01_Inc.jsp |
| 09/24/2009 10:34a | 713 | Page_01_New.jsp |

Directory of d:\app\contract\contracts\kentucky\Lexington_Board\Right_Of_Refusal

| Creation | Size | Name |
|---|---|---|
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 10/02/2009 10:45a | 5,330 | Page_01_Inc.jsp |
| 09/24/2009 10:34a | 713 | Page_01_New.jsp |

Directory of d:\app\contract\contracts\kentucky\Lexington_Board\Right_To_Sell_Commission

| Creation | Size | Name |
|---|---|---|
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/28/2009 12:41p | 4,632 | Page_01_Inc.jsp |
| 09/24/2009 10:34a | 713 | Page_01_New.jsp |

-continued

| Creation | Size | Name |
|---|---|---|
| Directory of d:\app\contract\contracts\kentucky\Lexington_Board\Sanitary_Sewer_Info | | |
| 09/28/2009 12:41p | 1,184 | Page_01.jsp |
| 09/28/2009 12:41p | 391 | Page_01_Client.jsp |
| 09/28/2009 12:41p | 513 | Page_01_ClientView.jsp |
| 09/28/2009 12:41p | 5,327 | Page_01_Inc.jsp |
| 09/28/2009 12:41p | 713 | Page_01_New.jsp |
| Directory of d:\app\contract\contracts\kentucky\Lexington_Board\Sellers_Mortgage_Info | | |
| 09/18/2009 10:13a | 1,184 | Page_01.jsp |
| 09/18/2009 10:13a | 391 | Page_01_Client.jsp |
| 09/18/2009 10:13a | 513 | Page_01_ClientView.jsp |
| 09/28/2009 12:41p | 6,335 | Page_01_Inc.jsp |
| 09/18/2009 10:13a | 713 | Page_01_New.jsp |
| Directory of d:\app\contract\contracts\kentucky\Lexington_Board\Settlement_Statement | | |
| 09/30/2009 09:31a | 1,184 | Page_01.jsp |
| 09/30/2009 09:31a | 391 | Page_01_Client.jsp |
| 09/30/2009 09:31a | 513 | Page_01_ClientView.jsp |
| 09/30/2009 09:31a | 36,309 | Page_01_Inc.jsp |
| 09/30/2009 09:31a | 713 | Page_01_New.jsp |
| 09/30/2009 09:31a | 1,186 | Page_02.jsp |
| 09/30/2009 09:31a | 415 | Page_02_Client.jsp |
| 09/30/2009 09:31a | 537 | Page_02_ClientView.jsp |
| 10/02/2009 10:45a | 40,692 | Page_02_Inc.jsp |
| 09/30/2009 09:31a | 713 | Page_02_New.jsp |
| Directory of d:\app\contract\contracts\kentucky\Lexington_Board\Status_Change_Worksheet | | |
| 09/10/2009 11:47p | 1,184 | Page_01.jsp |
| 08/17/2009 09:39a | 391 | Page_01_Client.jsp |
| 08/17/2009 09:39a | 513 | Page_01_ClientView.jsp |
| 08/17/2009 09:39a | 10,409 | Page_01_Inc.jsp |
| 09/10/2009 11:47p | 713 | Page_01_New.jsp |
| Directory of d:\app\contract\contracts\kentucky\Lexington_Board\Utilities_Info_Letter | | |
| 09/28/2009 12:41p | 1,184 | Page_01.jsp |
| 09/28/2009 12:41p | 391 | Page_01_Client.jsp |
| 09/28/2009 12:41p | 513 | Page_01_ClientView.jsp |
| 10/02/2009 10:45a | 3,403 | Page_01_Inc.jsp |
| 09/28/2009 12:41p | 713 | Page_01_New.jsp |
| Directory of d:\app\contract\contracts\kentucky\Lexington_Board\Vacant_Land_Disclosure_Statement | | |
| 09/18/2009 03:26p | 1,184 | Page_01.jsp |
| 09/18/2009 03:26p | 391 | Page_01_Client.jsp |
| 09/18/2009 03:26p | 513 | Page_01_ClientView.jsp |
| 09/18/2009 03:26p | 11,892 | Page_01_Inc.jsp |
| 09/18/2009 03:26p | 713 | Page_01_New.jsp |
| 09/18/2009 03:26p | 1,184 | Page_02.jsp |
| 09/18/2009 03:26p | 391 | Page_02_Client.jsp |
| 09/18/2009 03:26p | 513 | Page_02_ClientView.jsp |
| 09/18/2009 03:26p | 15,188 | Page_02_Inc.jsp |
| 09/18/2009 03:26p | 713 | Page_02_New.jsp |
| 09/18/2009 03:26p | 1,184 | Page_03.jsp |
| 09/18/2009 03:26p | 391 | Page_03_Client.jsp |
| 09/18/2009 03:26p | 513 | Page_03_ClientView.jsp |
| 09/18/2009 03:26p | 2,984 | Page_03_Inc.jsp |
| 09/18/2009 03:26p | 713 | Page_03_New.jsp |
| Directory of d:\app\contract\contracts\kentucky\Lexington_Board\Withdrawal_Of_Exclusive_Right_To_Sell | | |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 09/01/2009 06:37p | 3,502 | Page_01_Inc.jsp |
| 09/10/2009 11:47p | 713 | Page_01_New.jsp |
| Directory of d:\app\contract\contracts\kentucky\brokers\Cave_Run\Addendum | | |
| 09/30/2009 09:30a | 1,184 | Page_01.jsp |
| 09/30/2009 09:30a | 391 | Page_01_Client.jsp |
| 09/30/2009 09:30a | 513 | Page_01_ClientView.jsp |
| 09/30/2009 09:30a | 4,054 | Page_01_Inc.jsp |
| 09/30/2009 09:30a | 713 | Page_01_New.jsp |

-continued

| Creation | Size | Name |
|---|---|---|
| colspan=3 | Directory of d:\app\contract\contracts\kentucky\brokers\Cave_Run\Addendum_To_Offer_To_Purchase | |
| 09/30/2009 09:30a | 1,184 | Page_01.jsp |
| 09/30/2009 09:30a | 391 | Page_01_Client.jsp |
| 09/30/2009 09:30a | 513 | Page_01_ClientView.jsp |
| 09/30/2009 09:30a | 9,700 | Page_01_Inc.jsp |
| 09/30/2009 09:30a | 713 | Page_01_New.jsp |
| colspan=3 | Directory of d:\app\contract\contracts\kentucky\brokers\Cave_Run\Advertising_Disclosure | |
| 09/30/2009 09:31a | 1,184 | Page_01.jsp |
| 09/30/2009 09:31a | 391 | Page_01_Client.jsp |
| 09/30/2009 09:31a | 513 | Page_01_ClientView.jsp |
| 09/30/2009 09:31a | 3,898 | Page_01_Inc.jsp |
| 09/30/2009 09:31a | 713 | Page_01_New.jsp |
| colspan=3 | Directory of d:\app\contract\contracts\kentucky\brokers\Cave_Run\Business_Input_Sheet | |
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 09/30/2009 09:30a | 14,119 | Page_01_Inc.jsp |
| 09/30/2009 09:30a | 713 | Page_01_New.jsp |
| colspan=3 | Directory of d:\app\contract\contracts\kentucky\brokers\Cave_Run\Buyer_Consumer_Guide_To_Agency_Relationships | |
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 09/03/2009 03:31p | 3,794 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 422 | Page_02_Client.jsp |
| 09/10/2009 11:46p | 544 | Page_02_ClientView.jsp |
| 09/03/2009 03:31p | 5,145 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 422 | Page_03_Client.jsp |
| 09/10/2009 11:46p | 544 | Page_03_ClientView.jsp |
| 09/03/2009 03:31p | 1,676 | Page_03_Inc.jsp |
| 09/10/2009 11:46p | 713 | Page_03_New.jsp |
| colspan=3 | Directory of d:\app\contract\contracts\kentucky\brokers\Cave_Run\Commercial_Input_Sheet_07_08 | |
| 09/30/2009 09:30a | 1,184 | Page_01.jsp |
| 09/30/2009 09:30a | 391 | Page_01_Client.jsp |
| 09/30/2009 09:30a | 513 | Page_01_ClientView.jsp |
| 09/30/2009 09:30a | 12,554 | Page_01_Inc.jsp |
| 09/30/2009 09:30a | 713 | Page_01_New.jsp |
| 09/30/2009 09:30a | 1,184 | Page_02.jsp |
| 09/30/2009 09:30a | 391 | Page_02_Client.jsp |
| 09/30/2009 09:30a | 513 | Page_02_ClientView.jsp |
| 09/30/2009 09:30a | 25,619 | Page_02_Inc.jsp |
| 09/30/2009 09:30a | 713 | Page_02_New.jsp |
| colspan=3 | Directory of d:\app\contract\contracts\kentucky\brokers\Cave_Run\Commercial_Land_Input_Sheet | |
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 09/30/2009 09:30a | 16,337 | Page_01_Inc.jsp |
| 09/30/2009 09:30a | 713 | Page_01_New.jsp |
| colspan=3 | Directory of d:\app\contract\contracts\kentucky\brokers\Cave_Run\Conditional_Land_Sale_Clause | |
| 09/30/2009 09:30a | 1,184 | Page_01.jsp |
| 09/30/2009 09:30a | 391 | Page_01_Client.jsp |
| 09/30/2009 09:30a | 513 | Page_01_ClientView.jsp |
| 09/30/2009 09:30a | 6,224 | Page_01_Inc.jsp |
| 09/30/2009 09:30a | 713 | Page_01_New.jsp |

-continued

| Creation | Size | Name |
|---|---|---|
| colspan=3 | Directory of d:\app\contract\contracts\kentucky\brokers\ Cave_Run\Exclusive_Right_To_Sell | |
| 09/17/2009 07:29p | 1,186 | Page_01.jsp |
| 09/17/2009 07:29p | 415 | Page_01_Client.jsp |
| 09/17/2009 07:29p | 537 | Page_01_ClientView.jsp |
| 09/30/2009 09:30a | 6,854 | Page_01_Inc.jsp |
| 09/17/2009 07:29p | 713 | Page_01_New.jsp |
| 09/17/2009 07:29p | 1,186 | Page_02.jsp |
| 09/17/2009 07:29p | 415 | Page_02_Client.jsp |
| 09/17/2009 07:29p | 537 | Page_02_ClientView.jsp |
| 09/30/2009 09:30a | 5,356 | Page_02_Inc.jsp |
| 09/17/2009 07:29p | 713 | Page_02_New.jsp |
| colspan=3 | Directory of d:\app\contract\contracts\kentucky\brokers\Cave_Run\ Inducements_Rebate_Disclosure\Buyer | |
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 10/02/2009 10:45a | 2,863 | Page_01_Inc.jsp |
| 09/30/2009 09:30a | 713 | Page_01_New.jsp |
| colspan=3 | Directory of d:\app\contract\contracts\kentucky\brokers\Cave_Run\ Inducements_Rebate_Disclosure\Seller | |
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 10/02/2009 10:45a | 2,833 | Page_01_Inc.jsp |
| 09/30/2009 09:30a | 713 | Page_01_New.jsp |
| colspan=3 | Directory of d:\app\contract\contracts\kentucky\brokers\Cave_Run\ Lead_Based_Paint_Acknowledgement | |
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 09/30/2009 09:30a | 7,710 | Page_01_Inc.jsp |
| 09/30/2009 09:30a | 713 | Page_01_New.jsp |
| colspan=3 | Directory of d:\app\contract\contracts\kentucky\brokers\Cave_Run\ Loan_Assumption_Addendum | |
| 09/30/2009 09:31a | 1,186 | Page_01.jsp |
| 09/30/2009 09:31a | 415 | Page_01_Client.jsp |
| 09/30/2009 09:31a | 537 | Page_01_ClientView.jsp |
| 09/30/2009 09:31a | 6,088 | Page_01_Inc.jsp |
| 09/30/2009 09:31a | 713 | Page_01_New.jsp |
| colspan=3 | Directory of d:\app\contract\contracts\kentucky\brokers\ Cave_Run\MLS_Farm_Input_Sheet | |
| 09/30/2009 09:31a | 1,186 | Page_01.jsp |
| 09/30/2009 09:31a | 415 | Page_01_Client.jsp |
| 09/30/2009 09:31a | 537 | Page_01_ClientView.jsp |
| 09/30/2009 09:31a | 13,755 | Page_01_Inc.jsp |
| 09/30/2009 09:31a | 713 | Page_01_New.jsp |
| 09/30/2009 09:31a | 1,186 | Page_02.jsp |
| 09/30/2009 09:31a | 415 | Page_02_Client.jsp |
| 09/30/2009 09:31a | 537 | Page_02_ClientView.jsp |
| 09/30/2009 09:31a | 22,547 | Page_02_Inc.jsp |
| 09/30/2009 09:31a | 713 | Page_02_New.jsp |
| colspan=3 | Directory of d:\app\contract\contracts\kentucky\brokers\Cave_Run\ MLS_Multi_Housing_Input_Sheet | |
| 09/30/2009 09:31a | 1,184 | Page_01.jsp |
| 09/30/2009 09:31a | 391 | Page_01_Client.jsp |
| 09/30/2009 09:31a | 513 | Page_01_ClientView.jsp |
| 09/30/2009 09:31a | 9,522 | Page_01_Inc.jsp |
| 09/30/2009 09:31a | 713 | Page_01_New.jsp |
| 09/30/2009 09:31a | 1,184 | Page_02.jsp |
| 09/30/2009 09:31a | 391 | Page_02_Client.jsp |
| 09/30/2009 09:31a | 513 | Page_02_ClientView.jsp |
| 09/30/2009 09:31a | 13,921 | Page_02_Inc.jsp |
| 09/30/2009 09:31a | 713 | Page_02_New.jsp |
| 09/30/2009 09:31a | 1,184 | Page_03.jsp |

-continued

| Creation | Size | Name |
|---|---|---|
| 09/30/2009 09:31a | 391 | Page_03_Client.jsp |
| 09/30/2009 09:31a | 513 | Page_03_ClientView.jsp |
| 09/30/2009 09:31a | 18,818 | Page_03_Inc.jsp |
| 09/30/2009 09:31a | 713 | Page_03_New.jsp |

Directory of d:\app\contract\contracts\kentucky\brokers\
Cave_Run\MLS_Rent_Input_Sheet

| Creation | Size | Name |
|---|---|---|
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 09/30/2009 09:30a | 8,579 | Page_01_Inc.jsp |
| 09/30/2009 09:30a | 713 | Page_01_New.jsp |
| 09/30/2009 09:30a | 1,186 | Page_02.jsp |
| 09/30/2009 09:30a | 415 | Page_02_Client.jsp |
| 09/30/2009 09:30a | 537 | Page_02_ClientView.jsp |
| 09/30/2009 09:30a | 34,217 | Page_02_Inc.jsp |
| 09/30/2009 09:30a | 713 | Page_02_New.jsp |

Directory of
d:\app\contract\contracts\kentucky\brokers\Cave_Run\
MLS_Residential_Input_Sheet

| Creation | Size | Name |
|---|---|---|
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 09/30/2009 09:30a | 9,766 | Page_01_Inc.jsp |
| 09/30/2009 09:30a | 713 | Page_01_New.jsp |
| 09/30/2009 09:30a | 1,186 | Page_02.jsp |
| 09/30/2009 09:30a | 415 | Page_02_Client.jsp |
| 09/30/2009 09:30a | 537 | Page_02_ClientView.jsp |
| 09/30/2009 09:30a | 58,485 | Page_02_Inc.jsp |
| 09/30/2009 09:30a | 713 | Page_02_New.jsp |

Directory of d:\app\contract\contracts\kentucky\brokers\
Cave_Run\Offer_To_Purchase

| Creation | Size | Name |
|---|---|---|
| 09/17/2009 07:29p | 1,186 | Page_01.jsp |
| 09/17/2009 07:29p | 415 | Page_01_Client.jsp |
| 09/17/2009 07:29p | 537 | Page_01_ClientView.jsp |
| 09/17/2009 07:29p | 10,325 | Page_01_Inc.jsp |
| 09/17/2009 07:29p | 713 | Page_01_New.jsp |
| 09/17/2009 07:29p | 1,186 | Page_02.jsp |
| 09/17/2009 07:29p | 415 | Page_02_Client.jsp |
| 09/17/2009 07:29p | 537 | Page_02_ClientView.jsp |
| 09/17/2009 07:29p | 6,949 | Page_02_Inc.jsp |
| 09/17/2009 07:29p | 713 | Page_02_New.jsp |
| 09/17/2009 07:29p | 1,186 | Page_03.jsp |
| 09/17/2009 07:29p | 422 | Page_03_Client.jsp |
| 09/17/2009 07:29p | 544 | Page_03_ClientView.jsp |
| 09/17/2009 07:29p | 7,168 | Page_03_Inc.jsp |
| 09/17/2009 07:29p | 713 | Page_03_New.jsp |
| 09/17/2009 07:29p | 1,186 | Page_04.jsp |
| 09/17/2009 07:29p | 415 | Page_04_Client.jsp |
| 09/17/2009 07:29p | 537 | Page_04_ClientView.jsp |
| 09/30/2009 09:30a | 5,492 | Page_04_Inc.jsp |
| 09/17/2009 07:29p | 713 | Page_04_New.jsp |
| 09/17/2009 07:29p | 1,186 | Page_05.jsp |
| 09/17/2009 07:29p | 415 | Page_05_Client.jsp |
| 09/17/2009 07:29p | 537 | Page_05_ClientView.jsp |
| 09/17/2009 07:29p | 5,817 | Page_05_Inc.jsp |
| 09/17/2009 07:29p | 713 | Page_05_New.jsp |

Directory of
d:\app\contract\contracts\kentucky\brokers\Cave_Run\
Release_Of_Exclusive_Right_To_Sell

| Creation | Size | Name |
|---|---|---|
| 09/30/2009 09:31a | 1,186 | Page_01.jsp |
| 09/30/2009 09:31a | 415 | Page_01_Client.jsp |
| 09/30/2009 09:31a | 537 | Page_01_ClientView.jsp |
| 09/30/2009 09:31a | 4,002 | Page_01_Inc.jsp |
| 09/30/2009 09:31a | 713 | Page_01_New.jsp |

Directory of
d:\app\contract\contracts\kentucky\brokers\Cave_Run\
Seller_Consumer_Guide_To_Agency_Relationships

| Creation | Size | Name |
|---|---|---|
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 09/03/2009 03:31p | 3,794 | Page_01_Inc.jsp |
| 09/10/2009 11:46p | 713 | Page_01_New.jsp |

-continued

| Creation | Size | Name |
| --- | --- | --- |
| 09/10/2009 11:46p | 1,186 | Page_02.jsp |
| 09/10/2009 11:46p | 422 | Page_02_Client.jsp |
| 09/10/2009 11:46p | 544 | Page_02_ClientView.jsp |
| 09/03/2009 03:31p | 5,145 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 422 | Page_03_Client.jsp |
| 09/10/2009 11:46p | 544 | Page_03_ClientView.jsp |
| 09/03/2009 03:31p | 1,676 | Page_03_Inc.jsp |
| 09/10/2009 11:46p | 713 | Page_03_New.jsp |
| | | Directory of d:\app\contract\contracts\kentucky\brokers\Cave_Run\Status_Change_Worksheet |
| 09/30/2009 09:30a | 1,184 | Page_01.jsp |
| 09/30/2009 09:30a | 391 | Page_01_Client.jsp |
| 09/30/2009 09:30a | 513 | Page_01_ClientView.jsp |
| 09/30/2009 09:30a | 10,387 | Page_01_Inc.jsp |
| 09/30/2009 09:30a | 713 | Page_01_New.jsp |
| | | Directory of d:\app\contract\contracts\kentucky\brokers\Cave_Run\Vacant_Land_Disclosure_Statement |
| 09/10/2009 11:46p | 1,184 | Page_01.jsp |
| 09/02/2009 09:30a | 391 | Page_01_Client.jsp |
| 09/02/2009 09:30a | 513 | Page_01_ClientView.jsp |
| 09/04/2009 09:52a | 11,892 | Page_01_Inc.jsp |
| 09/10/2009 11:46p | 713 | Page_01_New.jsp |
| 09/10/2009 11:46p | 1,184 | Page_02.jsp |
| 09/02/2009 09:30a | 391 | Page_02_Client.jsp |
| 09/02/2009 09:30a | 513 | Page_02_ClientView.jsp |
| 09/04/2009 12:31p | 15,188 | Page_02_Inc.jsp |
| 09/10/2009 11:46p | 713 | Page_02_New.jsp |
| 09/10/2009 11:46p | 1,184 | Page_03.jsp |
| 09/02/2009 09:30a | 391 | Page_03_Client.jsp |
| 09/02/2009 09:30a | 513 | Page_03_ClientView.jsp |
| 09/03/2009 03:31p | 2,984 | Page_03_Inc.jsp |
| 09/10/2009 11:46p | 713 | Page_03_New.jsp |
| | | Directory of d:\app\contract\contracts\kentucky\brokers\Cave_Run\Withdrawal_Of_Exclusive_Right_To_Sell |
| 09/30/2009 09:30a | 1,186 | Page_01.jsp |
| 09/30/2009 09:30a | 415 | Page_01_Client.jsp |
| 09/30/2009 09:30a | 537 | Page_01_ClientView.jsp |
| 09/30/2009 09:30a | 3,480 | Page_01_Inc.jsp |
| 09/30/2009 09:30a | 713 | Page_01_New.jsp |
| | | Directory of d:\app\contract\contracts\kentucky\nkar\Addendum_To_Exclusive_Right_To_Sell |
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 08/12/2009 12:56p | 2,802 | Page_01_Inc.jsp |
| 09/10/2009 11:46p | 713 | Page_01_New.jsp |
| | | Directory of d:\app\contract\contracts\kentucky\nkar\Consumer_Guide_To_Agency_Relationships |
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 08/05/2009 05:49p | 4,055 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 422 | Page_02_Client.jsp |
| 09/10/2009 11:46p | 544 | Page_02_ClientView.jsp |
| 08/05/2009 05:49p | 4,437 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 422 | Page_03_Client.jsp |
| 09/10/2009 11:46p | 544 | Page_03_ClientView.jsp |
| 08/05/2009 05:49p | 2,641 | Page_03_Inc.jsp |
| 09/10/2009 11:46p | 713 | Page_03_New.jsp |
| | | Directory of d:\app\contract\contracts\kentucky\nkar\Consumer_Guide_To_Dual_Agency_Relationships |
| 09/10/2009 11:47p | 1,186 | Page_01.jsp |
| 09/10/2009 11:47p | 422 | Page_01_Client.jsp |

-continued

| Creation | Size | Name |
| --- | --- | --- |
| 09/10/2009 11:46p | 544 | Page_01_ClientView.jsp |
| 08/23/2009 01:12p | 4,210 | Page_01_Inc.jsp |
| 09/10/2009 11:46p | 713 | Page_01_New.jsp |
| 09/10/2009 11:47p | 1,186 | Page_02.jsp |
| 09/10/2009 11:47p | 422 | Page_02_Client.jsp |
| 09/10/2009 11:46p | 544 | Page_02_ClientView.jsp |
| 08/23/2009 01:12p | 4,599 | Page_02_Inc.jsp |
| 09/10/2009 11:47p | 713 | Page_02_New.jsp |
| 09/10/2009 11:47p | 1,186 | Page_03.jsp |
| 09/10/2009 11:47p | 422 | Page_03_Client.jsp |
| 09/10/2009 11:47p | 544 | Page_03_ClientView.jsp |
| 08/10/2009 08:43p | 2,694 | Page_03_Inc.jsp |
| 09/10/2009 11:47p | 713 | Page_03_New.jsp |
| | | Directory of d:\app\contract\contracts\kentucky\nkar\ Contract_To_Purchase |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 08/15/2009 06:39p | 7,428 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |
| 09/10/2009 11:47p | 537 | Page_02_ClientView.jsp |
| 07/27/2009 01:48p | 8,255 | Page_02_Inc.jsp |
| 09/10/2009 11:47p | 713 | Page_02_New.jsp |
| 09/10/2009 11:47p | 1,186 | Page_03.jsp |
| 09/10/2009 11:47p | 415 | Page_03_Client.jsp |
| 09/10/2009 11:47p | 537 | Page_03_ClientView.jsp |
| 09/12/2009 04:45p | 8,995 | Page_03_Inc.jsp |
| 09/10/2009 11:47p | 713 | Page_03_New.jsp |
| 09/10/2009 11:47p | 1,186 | Page_04.jsp |
| 09/10/2009 11:47p | 415 | Page_04_Client.jsp |
| 09/10/2009 11:47p | 537 | Page_04_ClientView.jsp |
| 07/27/2009 01:48p | 9,094 | Page_04_Inc.jsp |
| 09/10/2009 11:47p | 713 | Page_04_New.jsp |
| 09/10/2009 11:47p | 1,186 | Page_05.jsp |
| 09/10/2009 11:47p | 415 | Page_05_Client.jsp |
| 09/10/2009 11:47p | 537 | Page_05_ClientView.jsp |
| 07/27/2009 01:48p | 8,274 | Page_05_Inc.jsp |
| 09/10/2009 11:47p | 713 | Page_05_New.jsp |
| 09/10/2009 11:47p | 1,186 | Page_06.jsp |
| 09/10/2009 11:47p | 415 | Page_06_Client.jsp |
| 09/10/2009 11:47p | 537 | Page_06_ClientView.jsp |
| 08/01/2009 07:59p | 5,878 | Page_06_Inc.jsp |
| 09/10/2009 11:47p | 713 | Page_06_New.jsp |
| 09/10/2009 11:47p | 1,186 | Page_07.jsp |
| 09/10/2009 11:47p | 415 | Page_07_Client.jsp |
| 09/10/2009 11:47p | 537 | Page_07_ClientView.jsp |
| 08/13/2009 11:06p | 4,029 | Page_07_Inc.jsp |
| 09/10/2009 11:47p | 713 | Page_07_New.jsp |
| | | Directory of d:\app\contract\contracts\kentucky\nkar\ Contract_To_Purchase_Addendum |
| 09/24/2009 10:34a | 1,184 | Page_01.jsp |
| 09/24/2009 10:34a | 391 | Page_01_Client.jsp |
| 09/24/2009 10:34a | 513 | Page_01_ClientView.jsp |
| 09/30/2009 09:31a | 4,122 | Page_01_Inc.jsp |
| 09/24/2009 10:34a | 713 | Page_01_New.jsp |
| | | Directory of d:\app\contract\contracts\kentucky\nkar\ Contract_To_Purchase_Counter_Offer |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 08/13/2009 10:26p | 5,203 | Page_01_Inc.jsp |
| 09/10/2009 11:47p | 713 | Page_01_New.jsp |
| | | Directory of d:\app\contract\contracts\kentucky\nkar\ Disclosure_Of_Property_Condition |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 09/16/2009 08:13p | 17,794 | Page_01_Inc.jsp |
| 09/10/2009 11:47p | 713 | Page_01_New.jsp |
| 09/10/2009 11:47p | 1,186 | Page_02.jsp |
| 09/10/2009 11:47p | 415 | Page_02_Client.jsp |

-continued

| Creation | Size | Name |
|---|---|---|
| 09/10/2009 11:47p | 537 | Page_02_ClientView.jsp |
| 09/16/2009 08:13p | 24,215 | Page_02_Inc.jsp |
| 09/10/2009 11:47p | 713 | Page_02_New.jsp |
| 09/10/2009 11:47p | 1,186 | Page_03.jsp |
| 09/10/2009 11:47p | 415 | Page_03_Client.jsp |
| 09/10/2009 11:47p | 537 | Page_03_ClientView.jsp |
| 09/16/2009 08:13p | 17,671 | Page_03_Inc.jsp |
| 09/10/2009 11:47p | 713 | Page_03_New.jsp |
| | | Directory of d:\app\contract\contracts\kentucky\nkar\Exclusive_Right_To_Sell |
| 09/10/2009 11:46p | 1,186 | Page_01.jsp |
| 09/10/2009 11:46p | 415 | Page_01_Client.jsp |
| 09/10/2009 11:46p | 537 | Page_01_ClientView.jsp |
| 09/17/2009 07:29p | 9,075 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 415 | Page_02_Client.jsp |
| 09/10/2009 11:46p | 537 | Page_02_ClientView.jsp |
| 07/23/2009 09:21p | 10,333 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 415 | Page_03_Client.jsp |
| 09/10/2009 11:46p | 537 | Page_03_ClientView.jsp |
| 09/17/2009 07:29p | 10,001 | Page_03_Inc.jsp |
| 09/10/2009 11:46p | 713 | Page_03_New.jsp |
| 09/10/2009 11:46p | 1,186 | Page_04.jsp |
| 09/10/2009 11:46p | 415 | Page_04_Client.jsp |
| 09/10/2009 11:46p | 537 | Page_04_ClientView.jsp |
| 09/18/2009 03:26p | 6,932 | Page_04_Inc.jsp |
| 09/10/2009 11:46p | 713 | Page_04_New.jsp |
| | | Directory of d:\app\contract\contracts\kentucky\nkar\Exclusive_Right_To_Sell_Withdrawl |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 07/20/2009 09:54a | 3,856 | Page_01_Inc.jsp |
| 09/10/2009 11:47p | 713 | Page_01_New.jsp |
| | | Directory of d:\app\contract\contracts\kentucky\nkar\Explanation_Of_New_Agency_Forms |
| 10/02/2009 10:45a | 1,184 | Page_01.jsp |
| 10/02/2009 10:45a | 391 | Page_01_Client.jsp |
| 10/02/2009 10:45a | 513 | Page_01_ClientView.jsp |
| 10/02/2009 10:45a | 4,506 | Page_01_Inc.jsp |
| 10/02/2009 10:45a | 713 | Page_01_New.jsp |
| 10/02/2009 10:45a | 1,186 | Page_02.jsp |
| 10/02/2009 10:45a | 415 | Page_02_Client.jsp |
| 10/02/2009 10:45a | 537 | Page_02_ClientView.jsp |
| 10/02/2009 10:45a | 1,921 | Page_02_Inc.jsp |
| 10/02/2009 10:45a | 713 | Page_02_New.jsp |
| | | Directory of d:\app\contract\contracts\kentucky\nkar\Lead_Based_Paint_Disclosure |
| 09/10/2009 11:47p | 1,186 | Page_01.jsp |
| 09/10/2009 11:47p | 415 | Page_01_Client.jsp |
| 09/10/2009 11:47p | 537 | Page_01_ClientView.jsp |
| 07/27/2009 01:48p | 6,811 | Page_01_Inc.jsp |
| 09/10/2009 11:47p | 713 | Page_01_New.jsp |
| | | Directory of d:\app\contract\contracts\kentucky\nkar\MLS_Residential_Worksheet |
| 09/12/2009 04:45p | 1,186 | Page_01.jsp |
| 09/12/2009 04:45p | 415 | Page_01_Client.jsp |
| 09/12/2009 04:45p | 537 | Page_01_ClientView.jsp |
| 09/30/2009 09:31a | 13,147 | Page_01_Inc.jsp |
| 09/12/2009 04:45p | 713 | Page_01_New.jsp |
| 09/12/2009 04:45p | 1,186 | Page_02.jsp |
| 09/12/2009 04:45p | 415 | Page_02_Client.jsp |
| 09/12/2009 04:45p | 537 | Page_02_ClientView.jsp |
| 10/02/2009 10:45a | 46,460 | Page_02_Inc.jsp |
| 09/12/2009 04:45p | 713 | Page_02_New.jsp |
| | | Directory of d:\app\contract\contracts\kentucky\nkar\Mutual_Release_Form |
| 10/02/2009 10:45a | 1,184 | Page_01.jsp |
| 10/02/2009 10:45a | 391 | Page_01_Client.jsp |
| 10/02/2009 10:45a | 513 | Page_01_ClientView.jsp |

-continued

| Creation | Size | Name |
| --- | --- | --- |
| 10/02/2009 10:45a | 7,560 | Page_01_Inc.jsp |
| 10/02/2009 10:45a | 713 | Page_01_New.jsp |

Directory of d:\app\contract\contracts\kentucky\nkar\Termination_Of_Purchase_Contract

| Creation | Size | Name |
| --- | --- | --- |
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 08/13/2009 03:51p | 3,791 | Page_01_Inc.jsp |
| 09/10/2009 11:46p | 713 | Page_01_New.jsp |

Directory of d:\app\contract\contracts\kentucky\state\Buyer_Agency_Disclosure_Statement

| Creation | Size | Name |
| --- | --- | --- |
| 09/10/2009 11:46p | 1,186 | Page_01.jsp |
| 09/10/2009 11:46p | 415 | Page_01_Client.jsp |
| 09/10/2009 11:46p | 537 | Page_01_ClientView.jsp |
| 08/26/2009 08:57p | 6,959 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 415 | Page_02_Client.jsp |
| 09/10/2009 11:46p | 537 | Page_02_ClientView.jsp |
| 07/20/2009 09:54a | 4,933 | Page_02_Inc.jsp |
| 09/10/2009 11:46p | 713 | Page_02_New.jsp |

Directory of d:\app\contract\contracts\kentucky\state\Buyer_Consumer_Guide_To_Agency_Relationships

| Creation | Size | Name |
| --- | --- | --- |
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 09/04/2009 09:53p | 3,851 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 422 | Page_02_Client.jsp |
| 09/10/2009 11:46p | 544 | Page_02_ClientView.jsp |
| 09/04/2009 09:53p | 5,354 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 422 | Page_03_Client.jsp |
| 09/10/2009 11:46p | 544 | Page_03_ClientView.jsp |
| 09/04/2009 09:53p | 1,676 | Page_03_Inc.jsp |
| 09/10/2009 11:46p | 713 | Page_03_New.jsp |

Directory of d:\app\contract\contracts\kentucky\state\Release_Of_Earnest_Money_Deposit

| Creation | Size | Name |
| --- | --- | --- |
| 09/10/2009 11:46p | 1,184 | Page_01.jsp |
| 09/01/2009 06:37p | 391 | Page_01_Client.jsp |
| 09/01/2009 06:37p | 513 | Page_01_ClientView.jsp |
| 09/04/2009 05:17p | 4,921 | Page_01_Inc.jsp |
| 09/10/2009 11:46p | 713 | Page_01_New.jsp |

Directory of d:\app\contract\contracts\kentucky\state\Residential_One_Time_Showing_Agreement

| Creation | Size | Name |
| --- | --- | --- |
| 09/10/2009 11:46p | 1,184 | Page_01.jsp |
| 09/01/2009 06:37p | 391 | Page_01_Client.jsp |
| 09/01/2009 06:37p | 513 | Page_01_ClientView.jsp |
| 09/03/2009 03:31p | 5,027 | Page_01_Inc.jsp |
| 09/10/2009 11:46p | 713 | Page_01_New.jsp |

Directory of d:\app\contract\contracts\kentucky\state\Seller_Agency_Disclosure_Statement

| Creation | Size | Name |
| --- | --- | --- |
| 09/10/2009 11:46p | 1,186 | Page_01.jsp |
| 09/10/2009 11:46p | 415 | Page_01_Client.jsp |
| 09/10/2009 11:46p | 537 | Page_01_ClientView.jsp |
| 09/30/2009 09:30a | 6,733 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 415 | Page_02_Client.jsp |
| 09/10/2009 11:46p | 537 | Page_02_ClientView.jsp |
| 07/20/2009 09:54a | 4,933 | Page_02_Inc.jsp |
| 09/10/2009 11:46p | 713 | Page_02_New.jsp |

Directory of d:\app\contract\contracts\kentucky\state\Seller_Consumer_Guide_To_Agency_Relationships

| Creation | Size | Name |
| --- | --- | --- |
| 09/10/2009 11:46p | 1,186 | Page_01.jsp |
| 09/10/2009 11:46p | 422 | Page_01_Client.jsp |
| 09/10/2009 11:46p | 544 | Page_01_ClientView.jsp |
| 09/04/2009 09:53p | 3,851 | Page_01_Inc.jsp |

-continued

| Creation | Size | Name |
|---|---|---|
| 09/10/2009 11:46p | 713 | Page_01_New.jsp |
| 09/10/2009 11:46p | 1,186 | Page_02.jsp |
| 09/10/2009 11:46p | 422 | Page_02_Client.jsp |
| 09/10/2009 11:46p | 544 | Page_02_ClientView.jsp |
| 09/04/2009 09:53p | 5,354 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 422 | Page_03_Client.jsp |
| 09/10/2009 11:46p | 544 | Page_03_ClientView.jsp |
| 09/04/2009 09:53p | 1,676 | Page_03_Inc.jsp |
| 09/10/2009 11:46p | 713 | Page_03_New.jsp |

Directory of d:\app\contract\contracts\mls_contracts\Outgoing_Referral_Request

| Creation | Size | Name |
|---|---|---|
| 09/10/2009 11:46p | 1,184 | Page_01.jsp |
| 07/27/2009 01:48p | 391 | Page_01_Client.j sp |
| 07/27/2009 01:48p | 513 | Page_01_ClientView.jsp |
| 07/27/2009 01:48p | 941 | Page_01_Inc.jsp |
| 09/10/2009 11:46p | 713 | Page_01_New.jsp |

Directory of d:\app\contract\contracts\mls_contracts\Purchase_Contract

| Creation | Size | Name |
|---|---|---|
| 09/10/2009 11:46p | 1,184 | Page_01.jsp |
| 07/27/2009 01:48p | 391 | Page_01_Client.jsp |
| 07/27/2009 01:48p | 513 | Page_01_ClientView.jsp |
| 07/27/2009 01:48p | 9,390 | Page_01_Inc.jsp |
| 09/10/2009 11:46p | 713 | Page_01_New.jsp |
| 09/10/2009 11:46p | 1,186 | Page_02.jsp |
| 07/27/2009 01:48p | 391 | Page_02_Client.jsp |
| 07/27/2009 01:48p | 513 | Page_02_ClientView.jsp |
| 07/27/2009 01:48p | 9,929 | Page_02_Inc.jsp |
| 09/10/2009 11:46p | 713 | Page_02_New.jsp |
| 09/10/2009 11:46p | 1,231 | Page_03.jsp |
| 07/30/2009 10:10p | 438 | Page_03_Client.jsp |
| 07/30/2009 10:10p | 560 | Page_03_ClientView.jsp |
| 07/27/2009 01:48p | 9,991 | Page_03_Inc.jsp |
| 09/10/2009 11:46p | 760 | Page_03_New.jsp |
| 09/10/2009 11:46p | 1,231 | Page_04.jsp |
| 07/30/2009 10:10p | 438 | Page_04_Client.jsp |
| 07/30/2009 10:10p | 560 | Page_04_ClientView.jsp |
| 07/27/2009 01:48p | 5,542 | Page_04_Inc.jsp |
| 09/10/2009 11:46p | 760 | Page_04_New.jsp |

Directory of d:\app\contract\contracts\ohio\brokers\group_realty\Consumer_Guide_To_Agency_Relationships

| Creation | Size | Name |
|---|---|---|
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 08/11/2009 06:45p | 4,695 | Page_01_Inc.jsp |
| 09/10/2009 11:48p | 713 | Page_01_New.jsp |
| 09/10/2009 11:48p | 1,186 | Page_02.jsp |
| 09/10/2009 11:48p | 415 | Page_02_Client.jsp |
| 09/10/2009 11:48p | 537 | Page_02_ClientView.jsp |
| 08/11/2009 06:45p | 5,675 | Page_02_Inc.jsp |
| 09/10/2009 11:48p | 713 | Page_02_New.jsp |
| 09/10/2009 11:48p | 1,186 | Page_03.jsp |
| 09/10/2009 11:48p | 415 | Page_03_Client.jsp |
| 09/10/2009 11:48p | 537 | Page_03_ClientView.jsp |
| 08/11/2009 06:45p | 1,732 | Page_03_Inc.jsp |
| 09/10/2009 11:48p | 713 | Page_03_New.jsp |

Directory of d:\app\contract\contracts\ohio\brokers\group_realty\Listing_Report

| Creation | Size | Name |
|---|---|---|
| 09/10/2009 11:48p | 1,186 | Page_01.jsp |
| 08/11/2009 06:45p | 391 | Page_01_Client.jsp |
| 08/11/2009 06:45p | 513 | Page_01_ClientView.jsp |
| 08/11/2009 06:45p | 4,199 | Page_01_Inc.jsp |
| 09/10/2009 11:48p | 713 | Page_01_New.jsp |

Directory of d:\app\contract\contracts\ohio\brokers\group_realty\Sale_Pending_Report

| Creation | Size | Name |
|---|---|---|
| 09/10/2009 11:48p | 1,186 | Page_01.jsp |
| 08/11/2009 06:45p | 391 | Page_01_Client.jsp |
| 08/11/2009 06:45p | 513 | Page_01_ClientView.jsp |
| 08/11/2009 06:45p | 2,230 | Page_01_Inc.jsp |
| 09/10/2009 11:48p | 713 | Page_01_New.jsp |

-continued

| Creation | Size | Name |
|---|---|---|
| \multicolumn{3}{c}{Directory of d:\app\contract\contracts\ohio\brokers\hhb_partners\ Buyer_Consumer_Guide_To_Agency_Relationships} | | |
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/11/2009 02:03p | 5,210 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/10/2009 11:14p | 6,617 | Page_02_Inc.jsp |
| 09/11/2009 12:12a | 713 | Page_02_New.jsp |
| \multicolumn{3}{c}{Directory of d:\app\contract\contracts\ohio\brokers\hhb_partners\ Seller_Consumer_Guide_To_Agency_Relationships} | | |
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/11/2009 02:03p | 5,210 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/10/2009 11:14p | 6,617 | Page_02_Inc.jsp |
| 09/11/2009 12:12a | 713 | Page_02_New.jsp |
| \multicolumn{3}{c}{Directory of d:\app\contract\contracts\ohio\brokers\huff_realty\Addendum_To_Contract_To_Purchase} | | |
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 09/08/2009 08:48p | 3,830 | Page_01_Inc.jsp |
| 09/10/2009 11:48p | 713 | Page_01_New.jsp |
| \multicolumn{3}{c}{Directory of d:\app\contract\contracts\ohio\brokers\huff_realty\Affiliated_Business_Disclosure} | | |
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 09/08/2009 08:48p | 6,690 | Page_01_Inc.jsp |
| 09/10/2009 11:48p | 713 | Page_01_New.jsp |
| 09/10/2009 11:48p | 1,186 | Page_02.jsp |
| 09/10/2009 11:48p | 415 | Page_02_Client.jsp |
| 09/10/2009 11:48p | 537 | Page_02_ClientView.jsp |
| 09/08/2009 08:48p | 6,000 | Page_02_Inc.jsp |
| 09/10/2009 11:48p | 713 | Page_02_New.jsp |
| \multicolumn{3}{c}{Directory of d:\app\contract\contracts\ohio\brokers\huff_realty\ Consumer_Guide_To_Agency_Relationships_Buyer} | | |
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/08/2009 08:48p | 6,213 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/08/2009 08:48p | 4,909 | Page_02_Inc.jsp |
| 09/11/2009 12:12a | 713 | Page_02_New.jsp |
| \multicolumn{3}{c}{Directory of d:\app\contract\contracts\ohio\brokers\huff_realty\ Consumer_Guide_To_Agency_Relationships_Seller} | | |
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/08/2009 08:48p | 9,660 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/08/2009 08:48p | 4,853 | Page_02_Inc.jsp |
| 09/11/2009 12:12a | 713 | Page_02_New.jsp |

-continued

| Creation | Size | Name |
|---|---|---|
| Directory of d:\app\contract\contracts\ohio\brokers\huff_realty\Contingency_Removal | | |
| 09/10/2009 11:48p | 1,184 | Page_01.jsp |
| 09/04/2009 12:31p | 391 | Page_01_Client.jsp |
| 09/04/2009 12:31p | 513 | Page_01_ClientView.jsp |
| 09/08/2009 08:48p | 3,676 | Page_01_Inc.jsp |
| 09/10/2009 11:48p | 713 | Page_01_New.jsp |
| Directory of d:\app\contract\contracts\ohio\brokers\huff_realty\Contract_To_Purchase | | |
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 09/08/2009 08:48p | 9,616 | Page_01_Inc.jsp |
| 09/10/2009 11:48p | 713 | Page_01_New.jsp |
| 09/10/2009 11:48p | 1,186 | Page_02.jsp |
| 09/10/2009 11:48p | 415 | Page_02_Client.jsp |
| 09/10/2009 11:48p | 537 | Page_02_ClientView.jsp |
| 09/08/2009 08:48p | 10,991 | Page_02_Inc.jsp |
| 09/10/2009 11:48p | 713 | Page_02_New.jsp |
| 09/10/2009 11:48p | 1,186 | Page_03.jsp |
| 09/10/2009 11:48p | 415 | Page_03_Client.jsp |
| 09/10/2009 11:48p | 537 | Page_03_ClientView.jsp |
| 09/08/2009 08:48p | 10,434 | Page_03_Inc.jsp |
| 09/10/2009 11:48p | 713 | Page_03_New.jsp |
| 09/10/2009 11:48p | 1,186 | Page_04.jsp |
| 09/10/2009 11:48p | 415 | Page_04_Client.jsp |
| 09/10/2009 11:48p | 537 | Page_04_ClientView.jsp |
| 09/08/2009 08:48p | 8,837 | Page_04_Inc.jsp |
| 09/10/2009 11:48p | 713 | Page_04_New.jsp |
| 09/10/2009 11:48p | 1,186 | Page_05.jsp |
| 09/10/2009 11:48p | 415 | Page_05_Client.jsp |
| 09/10/2009 11:48p | 537 | Page_05_ClientView.jsp |
| 09/01/2009 06:37p | 9,031 | Page_05_Inc.jsp |
| 09/10/2009 11:48p | 713 | Page_05_New.jsp |
| Directory of d:\app\contract\contracts\ohio\brokers\huff_realty\Exclusive_Right_To_Sell | | |
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 09/08/2009 08:48p | 11,037 | Page_01_Inc.jsp |
| 09/10/2009 11:48p | 713 | Page_01_New.jsp |
| 09/10/2009 11:48p | 1,186 | Page_02.jsp |
| 09/10/2009 11:48p | 415 | Page_02_Client.jsp |
| 09/10/2009 11:48p | 537 | Page_02_ClientView.jsp |
| 08/31/2009 05:17p | 10,644 | Page_02_Inc.jsp |
| 09/10/2009 11:48p | 713 | Page_02_New.jsp |
| 09/10/2009 11:48p | 1,186 | Page_03.jsp |
| 09/10/2009 11:48p | 415 | Page_03_Client.jsp |
| 09/10/2009 11:48p | 537 | Page_03_ClientView.jsp |
| 09/08/2009 08:48p | 9,391 | Page_03_Inc.jsp |
| 09/10/2009 11:48p | 713 | Page_03_New.jsp |
| Directory of d:\app\contract\contracts\ohio\brokers\huff_realty\Inspection_Form | | |
| 09/10/2009 11:48p | 1,184 | Page_01.jsp |
| 09/03/2009 03:31p | 391 | Page_01_Client.jsp |
| 09/03/2009 03:31p | 513 | Page_01_ClientView.jsp |
| 09/08/2009 08:48p | 7,644 | Page_01_Inc.jsp |
| 09/10/2009 11:48p | 713 | Page_01_New.jsp |
| Directory of d:\app\contract\contracts\ohio\brokers\huff_realty\Release_Of_Earnest_Money | | |
| 09/10/2009 11:48p | 1,184 | Page_01.jsp |
| 09/04/2009 05:17p | 391 | Page_01_Client.jsp |
| 09/04/2009 05:17p | 513 | Page_01_ClientView.jsp |
| 09/04/2009 05:17p | 4,629 | Page_01_Inc.jsp |
| 09/10/2009 11:48p | 713 | Page_01_New.jsp |
| Directory of d:\app\contract\contracts\ohio\cabr\Consumer_Guide_To_Agency_Relationships | | |
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/24/2009 10:35a | 4,693 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/08/2009 08:48p | 6,011 | Page_02_Inc.jsp |
| 09/11/2009 12:12a | 713 | Page_02_New.jsp |

-continued

| Creation | Size | Name |
| --- | --- | --- |
| 09/11/2009 12:12a | 1,186 | Page_03.jsp |
| 09/11/2009 12:12a | 415 | Page_03_Client.jsp |
| 09/11/2009 12:12a | 537 | Page_03_ClientView.jsp |
| 09/15/2009 09:42a | 1,763 | Page_03_Inc.jsp |
| 09/11/2009 12:12a | 713 | Page_03_New.jsp |
| Directory of d:\app\contract\contracts\ohio\cabr\Contract_Addendum | | |
| 09/10/2009 11:49p | 1,186 | Page_01.jsp |
| 09/10/2009 11:49p | 415 | Page_01_Client.jsp |
| 09/10/2009 11:49p | 537 | Page_01_ClientView.jsp |
| 09/09/2009 07:57p | 3,071 | Page_01_Inc.jsp |
| 09/10/2009 11:49p | 713 | Page_01_New.jsp |
| Directory of d:\app\contract\contracts\ohio\cabr\Contract_To_Purchase | | |
| 09/10/2009 11:49p | 1,186 | Page_01.jsp |
| 09/10/2009 11:49p | 415 | Page_01_Client.jsp |
| 09/10/2009 11:49p | 537 | Page_01_ClientView.jsp |
| 09/08/2009 08:48p | 9,785 | Page_01_Inc.jsp |
| 09/10/2009 11:49p | 713 | Page_01_New.jsp |
| 09/10/2009 11:49p | 1,186 | Page_02.jsp |
| 09/10/2009 11:49p | 415 | Page_02_Client.jsp |
| 09/10/2009 11:49p | 537 | Page_02_ClientView.jsp |
| 08/05/2009 05:49p | 10,711 | Page_02_Inc.jsp |
| 09/10/2009 11:49p | 713 | Page_02_New.jsp |
| 09/10/2009 11:49p | 1,186 | Page_03.jsp |
| 09/10/2009 11:49p | 415 | Page_03_Client.jsp |
| 09/10/2009 11:49p | 537 | Page_03_ClientView.jsp |
| 08/05/2009 05:49p | 10,147 | Page_03_Inc.jsp |
| 09/10/2009 11:49p | 713 | Page_03_New.jsp |
| 09/10/2009 11:49p | 1,186 | Page_04.jsp |
| 09/10/2009 11:49p | 415 | Page_04_Client.jsp |
| 09/10/2009 11:49p | 537 | Page_04_ClientView.jsp |
| 09/18/2009 10:38a | 9,009 | Page_04_Inc.jsp |
| 09/10/2009 11:49p | 713 | Page_04_New.jsp |
| 09/10/2009 11:49p | 1,186 | Page_05.jsp |
| 09/10/2009 11:49p | 415 | Page_05_Client.jsp |
| 09/10/2009 11:49p | 537 | Page_05_ClientView.jsp |
| 08/31/2009 05:00p | 9,170 | Page_05_Inc.jsp |
| 09/10/2009 11:49p | 713 | Page_05_New.jsp |
| Directory of d:\app\contract\contracts\ohio\cabr\Contract_To_Purchase_Commercial | | |
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/30/2009 09:31a | 7,030 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/12/2009 04:45p | 8,357 | Page_02_Inc.jsp |
| 09/11/2009 12:12a | 713 | Page_02_New.jsp |
| 09/11/2009 12:12a | 1,186 | Page_03.jsp |
| 09/11/2009 12:12a | 415 | Page_03_Client.jsp |
| 09/11/2009 12:12a | 537 | Page_03_ClientView.jsp |
| 09/12/2009 04:45p | 4,308 | Page_03_Inc.jsp |
| 09/11/2009 12:12a | 713 | Page_03_New.jsp |
| Directory of d:\app\contract\contracts\ohio\cabr\Exclusive_Buyer_Agency_Contract | | |
| 09/12/2009 04:45p | 1,184 | Page_01.jsp |
| 09/12/2009 04:45p | 391 | Page_01_Client.jsp |
| 09/12/2009 04:45p | 513 | Page_01_ClientView.jsp |
| 09/14/2009 11:05a | 8,230 | Page_01_Inc.jsp |
| 09/12/2009 04:45p | 713 | Page_01_New.jsp |
| 09/12/2009 04:45p | 1,184 | Page_02.jsp |
| 09/12/2009 04:45p | 391 | Page_02_Client.jsp |
| 09/12/2009 04:45p | 513 | Page_02_ClientView.jsp |
| 09/14/2009 11:05a | 8,964 | Page_02_Inc.jsp |
| 09/12/2009 04:45p | 713 | Page_02_New.jsp |
| 09/12/2009 04:45p | 1,184 | Page_03.jsp |
| 09/12/2009 04:45p | 391 | Page_03_Client.jsp |
| 09/12/2009 04:45p | 513 | Page_03_ClientView.jsp |
| 09/14/2009 11:05a | 5,716 | Page_03_Inc.jsp |
| 09/12/2009 04:45p | 713 | Page_03_New.jsp |
| Directory of d:\app\contract\contracts\ohio\cabr\Exclusive_Right_to_Sell | | |
| 09/10/2009 11:49p | 1,186 | Page_01.jsp |
| 09/10/2009 11:49p | 415 | Page_01_Client.jsp |

-continued

| Creation | Size | Name |
|---|---|---|
| 09/10/2009 11:49p | 537 | Page_01_ClientView.jsp |
| 09/15/2009 09:42a | 11,975 | Page_01_Inc.jsp |
| 09/10/2009 11:49p | 713 | Page_01_New.jsp |
| 09/10/2009 11:49p | 1,186 | Page_02.jsp |
| 09/10/2009 11:49p | 415 | Page_02_Client.jsp |
| 09/10/2009 11:49p | 537 | Page_02_ClientView.jsp |
| 09/14/2009 11:05a | 10,603 | Page_02_Inc.jsp |
| 09/10/2009 11:49p | 713 | Page_02_New.jsp |
| 09/10/2009 11:49p | 1,186 | Page_03.jsp |
| 09/10/2009 11:49p | 415 | Page_03_Client.jsp |
| 09/10/2009 11:49p | 537 | Page_03_ClientView.jsp |
| 09/15/2009 09:42a | 7,600 | Page_03_Inc.jsp |
| 09/10/2009 11:49p | 713 | Page_03_New.jsp |
| Directory of d:\app\contract\contracts\ohio\cabr\Exclusive_Right_to_Sell_Commercial | | |
| 09/15/2009 09:42a | 1,186 | Page_01.jsp |
| 09/15/2009 09:42a | 415 | Page_01_Client.jsp |
| 09/15/2009 09:42a | 537 | Page_01_ClientView.jsp |
| 09/15/2009 09:42a | 6,987 | Page_01_Inc.jsp |
| 09/15/2009 09:42a | 713 | Page_01_New.jsp |
| 09/15/2009 09:42a | 1,186 | Page_02.jsp |
| 09/15/2009 09:42a | 415 | Page_02_Client.jsp |
| 09/15/2009 09:42a | 537 | Page_02_ClientView.jsp |
| 09/15/2009 09:42a | 9,452 | Page_02_Inc.jsp |
| 09/15/2009 09:42a | 713 | Page_02_New.jsp |
| 09/15/2009 09:42a | 1,186 | Page_03.jsp |
| 09/15/2009 09:42a | 415 | Page_03_Client.jsp |
| 09/15/2009 09:42a | 537 | Page_03_ClientView.jsp |
| 09/15/2009 09:42a | 4,549 | Page_03_Inc.jsp |
| 09/15/2009 09:42a | 713 | Page_03_New.jsp |
| Directory of d:\app\contract\contracts\ohio\cabr\Lead_Based_Paint_Disclosure_Housing_Sales | | |
| 09/10/2009 11:49p | 1,186 | Page_01.jsp |
| 09/10/2009 11:49p | 415 | Page_01_Client.jsp |
| 09/10/2009 11:49p | 537 | Page_01_ClientView.jsp |
| 09/12/2009 04:45p | 7,800 | Page_01_Inc.jsp |
| 09/10/2009 11:49p | 713 | Page_01_New.jsp |
| Directory of d:\app\contract\contracts\ohio\cabr\Lead_Based_Paint_Inspection_Addendum | | |
| 09/11/2009 12:12a | 1,184 | Page_01.jsp |
| 09/10/2009 04:30p | 391 | Page_01_Client.jsp |
| 09/10/2009 04:30p | 513 | Page_01_ClientView.jsp |
| 09/12/2009 04:45p | 5,706 | Page_01_Inc.jsp |
| 09/11/2009 12:12a | 713 | Page_01_New.jsp |
| Directory of d:\app\contract\contracts\ohio\cabr\Listing_Report | | |
| 09/11/2009 12:12a | 1,186 | Page_01.jsp |
| 09/09/2009 07:57p | 391 | Page_01_Client.jsp |
| 09/09/2009 07:57p | 513 | Page_01_ClientView.jsp |
| 09/11/2009 02:03p | 4,383 | Page_01_Inc.jsp |
| 09/11/2009 12:12a | 713 | Page_01_New.jsp |
| Directory of d:\app\contract\contracts\ohio\cabr\MLS_Commercial_Worksheet | | |
| 09/10/2009 11:48p | 1,186 | Page_01.jsp |
| 09/10/2009 11:48p | 415 | Page_01_Client.jsp |
| 09/10/2009 11:48p | 537 | Page_01_ClientView.jsp |
| 09/08/2009 08:48p | 16,276 | Page_01_Inc.jsp |
| 09/10/2009 11:48p | 713 | Page_01_New.jsp |
| 09/10/2009 11:48p | 1,186 | Page_02.jsp |
| 09/10/2009 11:48p | 415 | Page_02_Client.jsp |
| 09/10/2009 11:48p | 537 | Page_02_ClientView.jsp |
| 08/17/2009 09:39a | 65,121 | Page_02_Inc.jsp |
| 09/10/2009 11:48p | 713 | Page_02_New.jsp |
| Directory of d:\app\contract\contracts\ohio\cabr\MLS_Conditional_Withdrawal_Worksheet | | |
| 09/10/2009 11:48p | 1,186 | Page_01.jsp |
| 07/30/2009 10:11p | 391 | Page_01_Client.jsp |
| 07/30/2009 10:11p | 513 | Page_01_ClientView.jsp |
| 09/18/2009 03:26p | 5,370 | Page_01_Inc.jsp |
| 09/10/2009 11:48p | 713 | Page_01_New.jsp |
| Directory of d:\app\contract\contracts\ohio\cabr\MLS_Land_Worksheet | | |
| 09/10/2009 11:49p | 1,186 | Page_01.jsp |
| 09/10/2009 11:49p | 415 | Page_01_Client.jsp |
| 09/10/2009 11:49p | 537 | Page_01_ClientView.jsp |
| 09/16/2009 09:31a | 13,682 | Page_01_Inc.jsp |

-continued

| Creation | Size | Name |
|---|---|---|
| 09/10/2009 11:49p | 713 | Page_01_New.jsp |
| 09/10/2009 11:49p | 1,186 | Page_02.jsp |
| 09/10/2009 11:49p | 415 | Page_02_Client.jsp |
| 09/10/2009 11:49p | 537 | Page_02_ClientView.jsp |
| 09/16/2009 09:31a | 22,917 | Page_02_Inc.jsp |
| 09/10/2009 11:49p | 713 | Page_02_New.jsp |

Directory of d:\app\contract\contracts\ohio\cabr\MLS_Listing_Amendment_Worksheet

| Creation | Size | Name |
|---|---|---|
| 09/11/2009 12:12a | 1,186 | Page_01.jsp |
| 09/10/2009 11:51p | 391 | Page_01_Client.jsp |
| 09/10/2009 11:51p | 513 | Page_01_ClientView.jsp |
| 09/14/2009 02:16p | 6,243 | Page_01_Inc.jsp |
| 09/11/2009 12:12a | 713 | Page_01_New.jsp |

Directory of d:\app\contract\contracts\ohio\cabr\MLS_Multi_Family_Worksheet

| Creation | Size | Name |
|---|---|---|
| 09/10/2009 11:49p | 1,186 | Page_01.jsp |
| 09/10/2009 11:49p | 415 | Page_01_Client.jsp |
| 09/10/2009 11:48p | 537 | Page_01_ClientView.jsp |
| 08/17/2009 09:39a | 12,811 | Page_01_Inc.jsp |
| 09/10/2009 11:49p | 713 | Page_01_New.jsp |
| 09/10/2009 11:49p | 1,186 | Page_02.jsp |
| 09/10/2009 11:49p | 415 | Page_02_Client.jsp |
| 09/10/2009 11:49p | 537 | Page_02_ClientView.jsp |
| 08/17/2009 09:39a | 36,550 | Page_02_Inc.jsp |
| 09/10/2009 11:49p | 713 | Page_02_New.jsp |

Directory of d:\app\contract\contracts\ohio\cabr\MLS_Residential_Worksheet

| Creation | Size | Name |
|---|---|---|
| 09/10/2009 11:49p | 1,186 | Page_01.jsp |
| 09/10/2009 11:49p | 415 | Page_01_Client.jsp |
| 09/10/2009 11:49p | 537 | Page_01_ClientView.jsp |
| 08/17/2009 09:39a | 13,532 | Page_01_Inc.jsp |
| 09/10/2009 11:49p | 713 | Page_01_New.jsp |
| 09/10/2009 11:49p | 1,186 | Page_02.jsp |
| 09/10/2009 11:49p | 415 | Page_02_Client.jsp |
| 09/10/2009 11:49p | 537 | Page_02_ClientView.jsp |
| 08/17/2009 09:39a | 64,849 | Page_02_Inc.jsp |
| 09/10/2009 11:49p | 713 | Page_02_New.jsp |

Directory of d:\app\contract\contracts\ohio\cabr\Post_Inspection_Agreement

| Creation | Size | Name |
|---|---|---|
| 09/11/2009 02:03p | 1,186 | Page_01.jsp |
| 09/11/2009 02:03p | 422 | Page_01_Client.jsp |
| 09/11/2009 02:03p | 544 | Page_01_ClientView.jsp |
| 09/11/2009 02:03p | 3,936 | Page_01_Inc.jsp |
| 09/11/2009 02:03p | 713 | Page_01_New.jsp |

Directory of d:\app\contract\contracts\ohio\cabr\Sale_Pending_Report

| Creation | Size | Name |
|---|---|---|
| 09/11/2009 12:12a | 1,186 | Page_01.jsp |
| 09/09/2009 07:57p | 391 | Page_01_Client.jsp |
| 09/09/2009 07:57p | 513 | Page_01_ClientView.jsp |
| 09/15/2009 09:42a | 6,942 | Page_01_Inc.jsp |
| 09/11/2009 12:12a | 713 | Page_01_New.jsp |

Directory of d:\app\contract\contracts\ohio\cabr\Short_Sale_Addendum

| Creation | Size | Name |
|---|---|---|
| 09/24/2009 10:35a | 1,186 | Page_01.jsp |
| 09/24/2009 10:35a | 415 | Page_01_Client.jsp |
| 09/24/2009 10:35a | 537 | Page_01_ClientView.jsp |
| 09/24/2009 10:35a | 9,305 | Page_01_Inc.jsp |
| 09/24/2009 10:35a | 713 | Page_01_New.jsp |

Directory of d:\app\contract\contracts\ohio\dabr\Contract_To_Purchase_Inspection_Addendum

| Creation | Size | Name |
|---|---|---|
| 09/10/2009 11:49p | 1,186 | Page_01.jsp |
| 09/10/2009 11:49p | 422 | Page_01_Client.jsp |
| 09/10/2009 11:49p | 544 | Page_01_ClientView.jsp |
| 07/05/2009 12:59p | 8,104 | Page_01_Inc.jsp |
| 09/10/2009 11:49p | 713 | Page_01_New.jsp |
| 09/10/2009 11:49p | 1,186 | Page_02.jsp |
| 09/10/2009 11:49p | 422 | Page_02_Client.jsp |
| 09/10/2009 11:49p | 544 | Page_02_ClientView.jsp |
| 07/05/2009 12:59p | 3,020 | Page_02_Inc.jsp |
| 09/10/2009 11:49p | 713 | Page_02_New.jsp |

Directory of d:\app\contract\contracts\ohio\dabr\Contract_To_Purchase_Real_Estate

| Creation | Size | Name |
|---|---|---|
| 09/10/2009 11:49p | 1,186 | Page_01.jsp |
| 09/10/2009 11:49p | 429 | Page_01_Client.jsp |
| 09/10/2009 11:49p | 551 | Page_01_ClientView.jsp |
| 07/27/2009 01:48p | 15,233 | Page_01_Inc.jsp |

-continued

| Creation | Size | Name |
|---|---|---|
| 09/10/2009 11:49p | 713 | Page_01_New.jsp |
| 09/10/2009 11:49p | 1,186 | Page_02.jsp |
| 09/10/2009 11:49p | 429 | Page_02_Client.jsp |
| 09/10/2009 11:49p | 551 | Page_02_ClientView.jsp |
| 07/27/2009 01:48p | 10,906 | Page_02_Inc.jsp |
| 09/10/2009 11:49p | 713 | Page_02_New.jsp |

Directory of d:\app\contract\contracts\ohio\dabr\Post_Inspection_Agreement

| Creation | Size | Name |
|---|---|---|
| 09/10/2009 11:49p | 1,186 | Page_01.jsp |
| 09/10/2009 11:49p | 422 | Page_01_Client.jsp |
| 09/10/2009 11:49p | 544 | Page_01_ClientView.jsp |
| 08/13/2009 03:26p | 4,523 | Page_01_Inc.jsp |
| 09/10/2009 11:49p | 713 | Page_01_New.jsp |

Directory of d:\app\contract\contracts\ohio\dabr\Property_Change_Report

| Creation | Size | Name |
|---|---|---|
| 09/15/2009 09:42a | 1,186 | Page_01.jsp |
| 09/15/2009 09:42a | 429 | Page_01_Client.jsp |
| 09/15/2009 09:42a | 551 | Page_01_ClientView.jsp |
| 10/02/2009 10:45a | 6,724 | Page_01_Inc.jsp |
| 09/15/2009 09:42a | 713 | Page_01_New.jsp |

Directory of d:\app\contract\contracts\ohio\state\Agency_Disclosure

| Creation | Size | Name |
|---|---|---|
| 09/10/2009 11:48p | 1,186 | Page_01.jsp |
| 08/17/2009 02:54p | 391 | Page_01_Client.jsp |
| 08/17/2009 02:54p | 513 | Page_01_ClientView.jsp |
| 08/17/2009 02:54p | 7,344 | Page_01_Inc.jsp |
| 09/10/2009 11:48p | 713 | Page_01_New.jsp |
| 09/10/2009 11:48p | 1,186 | Page_02.jsp |
| 08/17/2009 02:54p | 391 | Page_02_Client.jsp |
| 08/17/2009 02:54p | 513 | Page_02_ClientView.jsp |
| 08/17/2009 02:54p | 5,707 | Page_02_Inc.jsp |
| 09/10/2009 11:48p | 713 | Page_02_New.jsp |

Directory of d:\app\contract\contracts\ohio\state\Consumer_Guide_To_Agency_Relationships

| Creation | Size | Name |
|---|---|---|
| 09/11/2009 12:12a | 1,186 | Page_01.jsp |
| 09/11/2009 12:12a | 415 | Page_01_Client.jsp |
| 09/11/2009 12:12a | 537 | Page_01_ClientView.jsp |
| 09/15/2009 09:42a | 4,748 | Page_01_Inc.jsp |
| 09/11/2009 12:12a | 713 | Page_01_New.jsp |
| 09/11/2009 12:12a | 1,186 | Page_02.jsp |
| 09/11/2009 12:12a | 415 | Page_02_Client.jsp |
| 09/11/2009 12:12a | 537 | Page_02_ClientView.jsp |
| 09/09/2009 07:57p | 5,927 | Page_02_Inc.jsp |
| 09/11/2009 12:12a | 713 | Page_02_New.jsp |
| 09/11/2009 12:12a | 1,186 | Page_03.jsp |
| 09/11/2009 12:12a | 415 | Page_03_Client.jsp |
| 09/11/2009 12:12a | 537 | Page_03_ClientView.jsp |
| 09/09/2009 07:57p | 1,759 | Page_03_Inc.jsp |
| 09/11/2009 12:12a | 713 | Page_03_New.jsp |

Directory of d:\app\contract\contracts\ohio\state\Residential_Property_Disclosure_Form

| Creation | Size | Name |
|---|---|---|
| 09/10/2009 11:48p | 1,186 | Page_01.jsp |
| 08/11/2009 04:36p | 391 | Page_01_Client.jsp |
| 08/11/2009 04:36p | 513 | Page_01_ClientView.jsp |
| 09/14/2009 11:05a | 7,574 | Page_01_Inc.jsp |
| 09/10/2009 11:48p | 713 | Page_01_New.jsp |
| 09/10/2009 11:48p | 1,186 | Page_02.jsp |
| 09/10/2009 11:48p | 415 | Page_02_Client.jsp |
| 09/10/2009 11:48p | 537 | Page_02_ClientView.jsp |
| 09/14/2009 11:05a | 14,999 | Page_02_Inc.jsp |
| 09/10/2009 11:48p | 713 | Page_02_New.jsp |
| 09/10/2009 11:48p | 1,186 | Page_03.jsp |
| 09/10/2009 11:48p | 415 | Page_03_Client.jsp |
| 09/10/2009 11:48p | 537 | Page_03_ClientView.jsp |
| 09/08/2009 08:48p | 10,045 | Page_03_Inc.jsp |
| 09/10/2009 11:48p | 713 | Page_03_New.jsp |
| 09/10/2009 11:48p | 1,186 | Page_04.jsp |
| 09/10/2009 11:48p | 415 | Page_04_Client.jsp |
| 09/10/2009 11:48p | 537 | Page_04_ClientView.jsp |
| 09/04/2009 05:17p | 7,947 | Page_04_Inc.jsp |
| 09/10/2009 11:48p | 713 | Page_04_New.jsp |

Directory of d:\app\contract\contracts\remax_preferred\Agency_Disclosure

| Creation | Size | Name |
|---|---|---|
| 09/10/2009 11:45p | 1,186 | Page_01.jsp |
| 07/05/2009 12:59p | 391 | Page_01_Client.jsp |
| 07/05/2009 12:59p | 513 | Page_01_ClientView.jsp |
| 09/15/2009 05:23p | 7,343 | Page_01_Inc.jsp |

-continued

| Creation | Size | Name |
|---|---|---|
| 09/10/2009 11:45p | 713 | Page_01_New.jsp |
| 09/10/2009 11:45p | 1,186 | Page_02.jsp |
| 08/14/2009 02:37p | 391 | Page_02_Client.jsp |
| 08/14/2009 02:37p | 513 | Page_02_ClientView.jsp |
| 08/14/2009 02:37p | 5,707 | Page_02_Inc.jsp |
| 09/10/2009 11:45p | 713 | Page_02_New.jsp |

Directory of
d:\app\contract\contracts\remax_preferred\Consumer_Guide_To_Agency_Relationships

| Creation | Size | Name |
|---|---|---|
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 09/30/2009 09:30a | 5,946 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 08/04/2009 09:36a | 6,398 | Page_02_Inc.jsp |
| 09/10/2009 11:45p | 713 | Page_02_New.jsp |

Directory of d:\app\contract\contracts\remax_preferred\Contract_Addendum

| Creation | Size | Name |
|---|---|---|
| 09/10/2009 11:46p | 1,186 | Page_01.jsp |
| 09/10/2009 11:46p | 415 | Page_01_Client.jsp |
| 09/10/2009 11:46p | 537 | Page_01_ClientView.jsp |
| 10/02/2009 10:45a | 4,375 | Page_01_Inc.jsp |
| 09/10/2009 11:46p | 713 | Page_01_New.jsp |

Directory of d:\app\contract\contracts\remax_preferred\Contract_To_Purchase

| Creation | Size | Name |
|---|---|---|
| 09/10/2009 11:46p | 1,186 | Page_01.jsp |
| 09/10/2009 11:46p | 415 | Page_01_Client.jsp |
| 09/10/2009 11:46p | 537 | Page_01_ClientView.jsp |
| 07/05/2009 12:59p | 10,252 | Page_01_Inc.jsp |
| 09/10/2009 11:46p | 713 | Page_01_New.jsp |
| 09/10/2009 11:46p | 1,186 | Page_02.jsp |
| 09/10/2009 11:46p | 415 | Page_02_Client.jsp |
| 09/10/2009 11:46p | 537 | Page_02_ClientView.jsp |
| 09/15/2009 05:23p | 10,522 | Page_02_Inc.jsp |
| 09/10/2009 11:46p | 713 | Page_02_New.jsp |
| 09/10/2009 11:46p | 1,186 | Page_03.jsp |
| 09/10/2009 11:46p | 415 | Page_03_Client.jsp |
| 09/10/2009 11:46p | 537 | Page_03_ClientView.jsp |
| 07/20/2009 09:54a | 10,518 | Page_03_Inc.jsp |
| 09/10/2009 11:46p | 713 | Page_03_New.jsp |
| 09/10/2009 11:46p | 1,186 | Page_04.jsp |
| 09/10/2009 11:46p | 415 | Page_04_Client.jsp |
| 09/10/2009 11:46p | 537 | Page_04_ClientView.jsp |
| 07/05/2009 12:59p | 8,834 | Page_04_Inc.jsp |
| 09/10/2009 11:46p | 713 | Page_04_New.jsp |
| 09/10/2009 11:46p | 1,186 | Page_05.jsp |
| 09/10/2009 11:46p | 415 | Page_05_Client.jsp |
| 09/10/2009 11:46p | 537 | Page_05_ClientView.jsp |
| 07/05/2009 12:59p | 5,468 | Page_05_Inc.jsp |
| 09/10/2009 11:46p | 713 | Page_05_New.jsp |

Directory of d:\app\contract\contracts\remax_preferred\Earnest_Money_Addendum

| Creation | Size | Name |
|---|---|---|
| 09/10/2009 11:46p | 1,186 | Page_01.jsp |
| 09/10/2009 11:46p | 415 | Page_01_Client.jsp |
| 09/10/2009 11:46p | 537 | Page_01_ClientView.jsp |
| 07/05/2009 12:59p | 3,312 | Page_01_Inc.jsp |
| 09/10/2009 11:46p | 713 | Page_01_New.jsp |

Directory of d:\app\contract\contracts\remax_preferred\Post_Inspection_Agreement

| Creation | Size | Name |
|---|---|---|
| 09/10/2009 11:45p | 1,186 | Page_01.jsp |
| 09/10/2009 11:45p | 422 | Page_01_Client.jsp |
| 09/10/2009 11:45p | 544 | Page_01_ClientView.jsp |
| 08/14/2009 02:37p | 4,949 | Page_01_Inc.jsp |
| 09/10/2009 11:45p | 713 | Page_01_New.jsp |

Directory of
d:\app\contract\contracts\remax_resources\Buyer_Agency_Exclusive_Right_To_Represent

| Creation | Size | Name |
|---|---|---|
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 09/15/2009 09:42a | 7,987 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |

-continued

| Creation | Size | Name |
|---|---|---|
| 09/10/2009 11:45p | 537 | Page_02_ClientView.jsp |
| 09/15/2009 09:42a | 3,826 | Page_02_Inc.jsp |
| 09/10/2009 11:45p | 713 | Page_02_New.jsp |

Directory of d:\app\contract\contracts\remax_resources\Consumer_Guide_To_Agency_Relationships

| Creation | Size | Name |
|---|---|---|
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 10/02/2009 10:45a | 4,599 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 09/10/2009 04:30p | 5,678 | Page_02_Inc.jsp |
| 09/10/2009 11:45p | 713 | Page_02_New.jsp |
| 09/10/2009 11:45p | 1,186 | Page_03.jsp |
| 09/10/2009 11:45p | 415 | Page_03_Client.jsp |
| 09/10/2009 11:45p | 537 | Page_03_ClientView.jsp |
| 07/30/2009 10:11p | 1,736 | Page_03_Inc.jsp |
| 09/10/2009 11:45p | 713 | Page_03_New.jsp |

Directory of d:\app\contract\contracts\remax_resources\Exclusive_Agency_Contract

| Creation | Size | Name |
|---|---|---|
| 09/10/2009 11:45p | 1,186 | Page_01.jsp |
| 07/30/2009 10:11p | 391 | Page_01_Client.jsp |
| 07/30/2009 10:11p | 513 | Page_01_ClientView.jsp |
| 09/30/2009 09:30a | 7,838 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 09/30/2009 09:30a | 6,816 | Page_02_Inc.jsp |
| 09/10/2009 11:45p | 713 | Page_02_New.jsp |

Directory of d:\app\contract\contracts\remax_resources\Exclusive_Right_To_Sell

| Creation | Size | Name |
|---|---|---|
| 09/10/2009 11:45p | 1,186 | Page_01.jsp |
| 07/30/2009 10:11p | 391 | Page_01_Client.jsp |
| 07/30/2009 10:11p | 513 | Page_01_ClientView.jsp |
| 09/12/2009 04:45p | 7,873 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 08/05/2009 05:49p | 7,143 | Page_02_Inc.jsp |
| 09/10/2009 11:45p | 713 | Page_02_New.jsp |

Directory of d:\app\contract\contracts\remax_resources\LeadPaint_Disclosure_form

| Creation | Size | Name |
|---|---|---|
| 09/10/2009 11:44p | 1,186 | Page_01.jsp |
| 09/10/2009 11:44p | 422 | Page_01_Client.jsp |
| 09/10/2009 11:44p | 544 | Page_01_ClientView.jsp |
| 09/16/2009 08:13p | 6,667 | Page_01_Inc.jsp |
| 09/10/2009 11:44p | 713 | Page_01_New.jsp |

Directory of d:\app\contract\contracts\remax_resources\Listing_Change_Report

| Creation | Size | Name |
|---|---|---|
| 09/10/2009 11:45p | 1,186 | Page_01.jsp |
| 07/23/2009 09:29a | 391 | Page_01_Client.jsp |
| 07/23/2009 09:29a | 513 | Page_01_ClientView.jsp |
| 09/16/2009 08:13p | 7,150 | Page_01_Inc.jsp |
| 09/10/2009 11:45p | 713 | Page_01_New.jsp |

Directory of d:\app\contract\contracts\remax_resources\Listing_Report

| Creation | Size | Name |
|---|---|---|
| 09/10/2009 11:45p | 1,186 | Page_01.jsp |
| 07/23/2009 09:29a | 391 | Page_01_Client.jsp |
| 07/23/2009 09:29a | 513 | Page_01_ClientView.jsp |
| 08/17/2009 07:56p | 4,211 | Page_01_Inc.jsp |
| 09/10/2009 11:45p | 713 | Page_01_New.jsp |

Directory of d:\app\contract\contracts\remax_resources\Purchase_Agreement_Addendum

| Creation | Size | Name |
|---|---|---|
| 09/10/2009 11:45p | 1,186 | Page_01.jsp |
| 09/10/2009 11:45p | 422 | Page_01_Client.jsp |
| 09/10/2009 11:45p | 544 | Page_01_ClientView.jsp |
| 08/13/2009 03:51p | 11,423 | Page_01_Inc.jsp |
| 09/10/2009 11:45p | 713 | Page_01_New.jsp |

Directory of d:\app\contract\contracts\remax_resources\property_disclosure

| Creation | Size | Name |
|---|---|---|
| 09/10/2009 11:45p | 1,186 | Page_01.jsp |
| 07/23/2009 09:29a | 391 | Page_01_Client.jsp |

-continued

| Creation | Size | Name |
|---|---|---|
| 07/23/2009 09:29a | 513 | Page_01_ClientView.jsp |
| 09/14/2009 02:16p | 7,574 | Page_01_Inc.jsp |
| 09/10/2009 11:44p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 09/14/2009 02:16p | 14,999 | Page_02_Inc.jsp |
| 09/10/2009 11:44p | 713 | Page_02_New.jsp |
| 09/10/2009 11:45p | 1,186 | Page_03.jsp |
| 09/10/2009 11:45p | 415 | Page_03_Client.jsp |
| 09/10/2009 11:45p | 537 | Page_03_ClientView.jsp |
| 09/14/2009 02:16p | 10,045 | Page_03_Inc.jsp |
| 09/10/2009 11:44p | 713 | Page_03_New.jsp |
| 09/10/2009 11:45p | 1,186 | Page_04.jsp |
| 09/10/2009 11:45p | 415 | Page_04_Client.jsp |
| 09/10/2009 11:45p | 537 | Page_04_ClientView.jsp |
| 09/14/2009 02:16p | 7,947 | Page_04_Inc.jsp |
| 09/10/2009 11:44p | 713 | Page_04_New.jsp |
| Directory of d:\app\contract\contracts\remax_unlimited\Affiliated_Business_Arrangement_Disclosure | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 07/27/2009 01:47p | 5,393 | Page_01_Inc.jsp |
| 09/10/2009 11:45p | 713 | Page_01_New.jsp |
| Directory of d:\app\contract\contracts\remax_unlimited\Affiliated_Business_Arrangement_Disclosure(ND) | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 08/05/2009 05:49p | 7,614 | Page_01_Inc.jsp |
| 09/10/2009 11:45p | 713 | Page_01_New.jsp |
| Directory of d:\app\contract\contracts\remax_unlimited\Amendment_To_The_Listing_Agreement | | |
| 09/10/2009 11:45p | 1,186 | Page_01.jsp |
| 07/27/2009 01:47p | 391 | Page_01_Client.jsp |
| 07/27/2009 01:47p | 513 | Page_01_ClientView.jsp |
| 09/14/2009 02:16p | 5,531 | Page_01_Inc.jsp |
| 09/10/2009 11:45p | 713 | Page_01_New.jsp |
| Directory of d:\app\contract\contracts\remax_unlimited\Cancellation_Of_Listing_Agreement | | |
| 09/10/2009 11:45p | 1,186 | Page_01.jsp |
| 07/30/2009 10:11p | 391 | Page_01_Client.jsp |
| 07/30/2009 10:11p | 513 | Page_01_ClientView.jsp |
| 08/05/2009 09:37a | 4,002 | Page_01_Inc.jsp |
| 09/10/2009 11:45p | 713 | Page_01_New.jsp |
| Directory of d:\app\contract\contracts\remax_unlimited\Consumer_Guide_To_Agency_Relationships | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 08/19/2009 01:14p | 5,277 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 08/11/2009 02:32p | 5,523 | Page_02_Inc.jsp |
| 09/10/2009 11:45p | 713 | Page_02_New.jsp |
| Directory of d:\app\contract\contracts\remax_unlimited\Contract_Addendum | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 09/08/2009 08:48p | 2,712 | Page_01_Inc.jsp |
| 09/10/2009 11:45p | 713 | Page_01_New.jsp |
| Directory of d:\app\contract\contracts\remax_unlimited\Contract_To_Purchase | | |
| 09/24/2009 10:34a | 1,186 | Page_01.jsp |
| 09/24/2009 10:34a | 415 | Page_01_Client.jsp |
| 09/24/2009 10:34a | 537 | Page_01_ClientView.jsp |
| 09/24/2009 10:34a | 9,785 | Page_01_Inc.jsp |
| 09/24/2009 10:34a | 713 | Page_01_New.jsp |
| 09/24/2009 10:34a | 1,186 | Page_02.jsp |

-continued

| Creation | Size | Name |
|---|---|---|
| 09/24/2009 10:34a | 415 | Page_02_Client.jsp |
| 09/24/2009 10:34a | 537 | Page_02_ClientView.jsp |
| 09/24/2009 10:34a | 11,000 | Page_02_Inc.jsp |
| 09/24/2009 10:34a | 713 | Page_02_New.jsp |
| 09/24/2009 10:34a | 1,186 | Page_03.jsp |
| 09/24/2009 10:34a | 415 | Page_03_Client.jsp |
| 09/24/2009 10:34a | 537 | Page_03_ClientView.jsp |
| 09/24/2009 10:34a | 10,147 | Page_03_Inc.jsp |
| 09/24/2009 10:34a | 713 | Page_03_New.jsp |
| 09/24/2009 10:34a | 1,186 | Page_04.jsp |
| 09/24/2009 10:34a | 415 | Page_04_Client.jsp |
| 09/24/2009 10:34a | 537 | Page_04_ClientView.jsp |
| 09/24/2009 10:34a | 9,009 | Page_04_Inc.jsp |
| 09/24/2009 10:34a | 713 | Page_04_New.jsp |
| 09/24/2009 10:34a | 1,186 | Page_05.jsp |
| 09/24/2009 10:34a | 415 | Page_05_Client.jsp |
| 09/24/2009 10:34a | 537 | Page_05_ClientView.jsp |
| 09/24/2009 10:34a | 9,170 | Page_05_Inc.jsp |
| 09/24/2009 10:34a | 713 | Page_05_New.jsp |
| Directory of d:\app\contract\contracts\remax_unlimited\Exclusive_Right_to_Sell | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 08/07/2009 05:38p | 11,974 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 07/27/2009 01:47p | 10,598 | Page_02_Inc.jsp |
| 09/10/2009 11:45p | 713 | Page_02_New.jsp |
| 09/10/2009 11:45p | 1,186 | Page_03.jsp |
| 09/10/2009 11:45p | 415 | Page_03_Client.jsp |
| 09/10/2009 11:45p | 537 | Page_03_ClientView.jsp |
| 07/27/2009 01:47p | 7,610 | Page_03_Inc.jsp |
| 09/10/2009 11:45p | 713 | Page_03_New.jsp |
| Directory of d:\app\contract\contracts\remax_unlimited\Lead_Based_Paint_Disclosure_Housing_Sales | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 07/27/2009 01:47p | 8,481 | Page_01_Inc.jsp |
| 09/10/2009 11:45p | 713 | Page_01_New.jsp |
| Directory of d:\app\contract\contracts\remax_unlimited\Non_Disclosure_and_Confidentiality_Agreement | | |
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 09/30/2009 09:30a | 4,132 | Page_01_Inc.jsp |
| 09/10/2009 11:45p | 713 | Page_01_New.jsp |
| Directory of d:\app\contract\contracts\remax_unlimited\Post_Inspection_Agreement | | |
| 09/10/2009 11:45p | 1,186 | Page_01.jsp |
| 09/10/2009 11:45p | 422 | Page_01_Client.jsp |
| 09/10/2009 11:45p | 544 | Page_01_ClientView.jsp |
| 08/13/2009 03:26p | 3,937 | Page_01_Inc.jsp |
| 09/10/2009 11:45p | 713 | Page_01_New.jsp |
| Directory of d:\app\contract\contracts\remax_unlimited\Residential_Property_Disclosure_Form | | |
| 09/10/2009 11:45p | 1,186 | Page_01.jsp |
| 07/30/2009 10:11p | 391 | Page_01_Client.jsp |
| 07/30/2009 10:11p | 513 | Page_01_ClientView.jsp |
| 09/14/2009 02:16p | 7,574 | Page_01_Inc.jsp |
| 09/10/2009 11:45p | 713 | Page_01_New.jsp |
| 09/10/2009 11:45p | 1,186 | Page_02.jsp |
| 09/10/2009 11:45p | 415 | Page_02_Client.jsp |
| 09/10/2009 11:45p | 537 | Page_02_ClientView.jsp |
| 09/14/2009 02:16p | 14,999 | Page_02_Inc.jsp |
| 09/10/2009 11:45p | 713 | Page_02_New.jsp |
| 09/10/2009 11:45p | 1,186 | Page_03.jsp |
| 09/10/2009 11:45p | 415 | Page_03_Client.jsp |
| 09/10/2009 11:45p | 537 | Page_03_ClientView.jsp |
| 09/14/2009 02:16p | 10,045 | Page_03_Inc.jsp |
| 09/10/2009 11:45p | 713 | Page_03_New.jsp |

-continued

| Creation | Size | Name |
|---|---|---|
| 09/10/2009 11:45p | 1,186 | Page_04.jsp |
| 09/10/2009 11:45p | 415 | Page_04_Client.jsp |
| 09/10/2009 11:45p | 537 | Page_04_ClientView.jsp |
| 09/14/2009 02:16p | 7,947 | Page_04_Inc.jsp |
| 09/10/2009 11:45p | 713 | Page_04_New.jsp |

Directory of d:\app\contract\contracts\remax_unlimited\Short_Sale_Addendum

| Creation | Size | Name |
|---|---|---|
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 07/27/2009 01:47p | 9,305 | Page_01_Inc.jsp |
| 09/10/2009 11:45p | 713 | Page_01_New.jsp |

Directory of d:\app\contract\contracts\remax_unlimited\Understanding_Short_Sales

| Creation | Size | Name |
|---|---|---|
| 09/10/2009 11:45p | 1,186 | Page_01.jsp |
| 09/10/2009 11:45p | 415 | Page_01_Client.jsp |
| 09/10/2009 11:45p | 537 | Page_01_ClientView.jsp |
| 07/27/2009 01:47p | 7,324 | Page_01_Inc.jsp |
| 09/10/2009 11:45p | 713 | Page_01_New.jsp |

Directory of d:\app\contract\contracts\sibcy_cline\Agency_Disclosure_Form

| Creation | Size | Name |
|---|---|---|
| 09/10/2009 11:44p | 1,186 | Page_01.jsp |
| 07/27/2009 01:47p | 391 | Page_01_Client.jsp |
| 07/27/2009 01:47p | 513 | Page_01_ClientView.jsp |
| 09/14/2009 02:16p | 7,334 | Page_01_Inc.jsp |
| 09/10/2009 11:44p | 713 | Page_01_New.jsp |

Directory of d:\app\contract\contracts\sibcy_cline\Purchase_Contract

| Creation | Size | Name |
|---|---|---|
| 09/10/2009 11:44p | 1,184 | Page_01.jsp |
| 07/27/2009 01:47p | 391 | Page_01_Client.jsp |
| 07/27/2009 01:47p | 513 | Page_01_ClientView.jsp |
| 07/27/2009 01:47p | 9,401 | Page_01_Inc.jsp |
| 09/10/2009 11:44p | 713 | Page_01_New.jsp |
| 09/10/2009 11:44p | 1,184 | Page_02.jsp |
| 07/27/2009 01:47p | 391 | Page_02_Client.jsp |
| 07/27/2009 01:47p | 513 | Page_02_ClientView.jsp |
| 07/27/2009 01:47p | 9,940 | Page_02_Inc.jsp |
| 09/10/2009 11:44p | 713 | Page_02_New.jsp |
| 09/10/2009 11:44p | 1,184 | Page_03.jsp |
| 07/27/2009 01:47p | 391 | Page_03_Client.jsp |
| 07/27/2009 01:47p | 513 | Page_03_ClientView.jsp |
| 07/27/2009 01:47p | 10,002 | Page_03_Inc.jsp |
| 09/10/2009 11:44p | 713 | Page_03_New.jsp |
| 09/10/2009 11:44p | 1,184 | Page_04.jsp |
| 07/27/2009 01:47p | 391 | Page_04_Client.jsp |
| 07/27/2009 01:47p | 513 | Page_04_ClientView.jsp |
| 07/27/2009 01:47p | 5,553 | Page_04_Inc.jsp |
| 09/10/2009 11:44p | 713 | Page_04_New.jsp |

Directory of d:\app\contract\contracts\test

| Creation | Size | Name |
|---|---|---|
| 09/10/2009 11:44p | 1,184 | Page_01.jsp |
| 09/04/2009 09:52a | 391 | Page_01_Client.jsp |
| 09/04/2009 09:52a | 513 | Page_01_ClientView.jsp |
| 09/04/2009 09:52a | 1,438 | Page_01_Inc.jsp |
| 09/10/2009 11:44p | 713 | Page_01_New.jsp |

Directory of d:\app\contract\include

| Creation | Size | Name |
|---|---|---|
| 09/24/2009 10:35a | 7,621 | ContractFormRow.jsp |
| 07/05/2009 12:59p | 197 | ContractHeaderNav.jsp |
| 08/28/2009 04:56p | 758 | ContractPageNav.jsp |
| 08/28/2009 04:58p | 771 | ContractPageNavClient.jsp |
| 07/05/2009 12:59p | 5,984 | ContractPopupFooter.jsp |
| 08/28/2009 04:57p | 6,446 | ContractSideNav.jsp |

Directory of d:\app\email

| Creation | Size | Name |
|---|---|---|
| 09/10/2009 11:44p | 1,835 | Footer.jsp |
| 07/05/2009 12:58p | 1,104 | Header.jsp |
| 09/16/2009 08:13p | 3,116 | Welcome.jsp |

Directory of d:\app\foundation

| Creation | Size | Name |
|---|---|---|
| 07/05/2009 12:58p | 656 | BrokerageListJSON.jsp |
| 09/13/2009 12:31p | 101 | JSON.jsp |
| 07/05/2009 12:58p | 650 | OfficeListJSON.jsp |

Directory of d:\app\help

| Creation | Size | Name |
|---|---|---|
| 09/17/2009 07:29p | 3,635 | all-either_agent.jsp |
| 09/17/2009 07:29p | 2,928 | buyer-buyers_agent.jsp |

-continued

| Creation | Size | Name |
|---|---|---|
| 09/17/2009 07:29p | 3,131 | one_side-eithers_agent.jsp |
| 09/17/2009 07:29p | 3,176 | seller-sellers_agent.jsp |

Directory of d:\app\include

| Creation | Size | Name |
|---|---|---|
| 09/17/2009 11:02a | 2,310 | Footer.jsp |
| 09/15/2009 02:10p | 2,555 | Header.jsp |
| 08/28/2009 01:06p | 254 | HeaderDirectives.jsp |
| 08/28/2009 01:14p | 1,142 | HeaderNavClients.jsp |
| 08/28/2009 01:13p | 972 | HeaderNavMyProfile.jsp |
| 08/28/2009 01:15p | 553 | HeaderNavOffer.jsp |
| 08/28/2009 01:15p | 1,543 | HeaderNavProperty.jsp |
| 09/10/2009 11:49p | 6,239 | HeaderSignedIn.jsp |
| 09/17/2009 11:02a | 1,644 | PublicFooter.jsp |
| 09/10/2009 11:49p | 2,192 | PublicHeader.jsp |
| 07/23/2009 09:29a | 0 | UserHelpSideNav.jsp |

Directory of d:\app\officeManager

| Creation | Size | Name |
|---|---|---|
| 09/10/2009 11:44p | 3,151 | Home.jsp |

Directory of d:\app\property

| Creation | Size | Name |
|---|---|---|
| 07/05/2009 12:58p | 1,615 | ErrorInsufficientRights.jsp |
| 09/10/2009 11:44p | 6,478 | MyPropertyList.jsp |
| 07/05/2009 12:58p | 963 | MyPropertyListFrag.jsp |
| 07/05/2009 12:58p | 892 | MyPropertyListJSON.jsp |
| 09/10/2009 11:44p | 3,443 | NewProperty.jsp |
| 09/10/2009 11:44p | 1,960 | Properties.jsp |
| 09/16/2009 08:13p | 6,605 | Property.jsp |
| 09/10/2009 11:44p | 4,290 | PropertyAgentList.jsp |
| 08/28/2009 04:53p | 1,386 | PropertyAgentListFrag.jsp |
| 09/10/2009 11:44p | 4,257 | PropertyClientList.jsp |
| 08/28/2009 04:53p | 1,188 | PropertyClientListFrag.jsp |
| 09/10/2009 11:44p | 4,606 | PropertyList.jsp |
| 07/05/2009 12:58p | 1,500 | PropertyListFrag.jsp |
| 07/05/2009 12:58p | 892 | PropertyListJSON.jsp |
| 09/10/2009 11:44p | 3,077 | PropertyOfferList.jsp |
| 07/05/2009 12:58p | 3,454 | PropertyOfferListFrag.jsp |
| 07/05/2009 12:58p | 104 | PropertyStatusJson.jsp |

Directory of d:\app\user

| Creation | Size | Name |
|---|---|---|
| 09/10/2009 11:49p | 1,755 | ContactUs.jsp |
| 09/10/2009 11:49p | 999 | ContactUsSuccess.jsp |
| 09/10/2009 11:49p | 1,120 | CreateUser.jsp |
| 09/10/2009 11:49p | 1,970 | Feedback.jsp |
| 09/10/2009 11:49p | 575 | FeedbackSubmitted.jsp |
| 09/10/2009 11:50p | 1,263 | ForgotPassword.jsp |
| 09/10/2009 11:50p | 330 | ForgotPasswordSent.jsp |
| 09/10/2009 11:49p | 964 | ForgotUsername.jsp |
| 09/10/2009 11:49p | 330 | ForgotUsernameSent.jsp |
| 09/10/2009 11:49p | 2,280 | Help.jsp |
| 09/10/2009 11:49p | 6,810 | Home.jsp |
| 09/10/2009 11:49p | 1,485 | Login.jsp |
| 09/10/2009 11:50p | 3,109 | LoginAgentList.jsp |
| 09/10/2009 11:49p | 1,062 | Mail.jsp |
| 09/10/2009 11:49p | 1,830 | MailList.jsp |
| 09/10/2009 11:49p | 8,206 | MyProfile.jsp |
| 09/10/2009 11:50p | 3,714 | MyProfileContact.jsp |
| 09/10/2009 11:49p | 5,595 | MyProfileCredentials.jsp |
| 09/16/2009 08:13p | 1,178 | MyProfileEmailList.jsp |
| 07/05/2009 12:59p | 1,098 | MyProfileFaxList.jsp |
| 07/05/2009 12:59p | 1,108 | MyProfileMobileList.jsp |
| 09/10/2009 11:49p | 2,965 | MyProfilePicture.jsp |
| 07/05/2009 12:59p | 1,110 | MyProfileTelephoneList.jsp |
| 07/05/2009 12:59p | 1,123 | MyProfileWebsiteList.jsp |
| 09/11/2009 12:12a | 4,352 | Privacy.jsp |
| 09/17/2009 05:31p | 7,603 | Register.jsp |
| 09/18/2009 12:19p | 7,525 | RegisterAgent.jsp |
| 09/18/2009 12:16p | 8,152 | RegisterAgentList.jsp |
| 09/18/2009 12:18p | 4,828 | RegisterBrokerage.jsp |
| 09/10/2009 11:49p | 5,125 | Terms.jsp |
| 09/10/2009 11:49p | 4,137 | VideoSupport.jsp |

-continued

| Creation | Size | Name |
|---|---|---|
| 09/10/2009 11:49p | 485 | WebinarSchedule.jsp |
| 09/11/2009 12:12a | 3,311 | WelcomeNewUser.jsp |
| | | Directory of d:\app\user\include |
| 07/23/2009 09:30a | 550 | UserHelpSideNav.jsp |
| | | Directory of d:\app\verify |
| 09/10/2009 11:44p | 5,839 | Verify.jsp |
| 09/10/2009 11:44p | 8,248 | VerifyCode.jsp |
| | | Directory of d:\docs |
| 07/05/2009 01:00p | 113 | index.html |
| 07/05/2009 01:00p | 3,132 | test.html |
| | | Directory of d:\docs\brokerages\mls_contracts |
| 07/05/2009 01:00p | 9,905 | ContracttoPurchase.jpg |
| 07/05/2009 01:00p | 4,713 | ContracttoPurchaseSm.jpg |
| | | Directory of d:\docs\brokerages\sibcy_cline |
| 07/05/2009 01:00p | 13,599 | ContracttoPurchase.jpg |
| 07/05/2009 01:00p | 8,008 | ContracttoPurchaseSm.jpg |
| | | Directory of d:\docs\contract\contracts\common |
| 07/05/2009 01:00p | 3,797 | equal_opportunity-logo.jpg |
| 07/05/2009 01:00p | 24,964 | realtor-logo.jpg |
| 07/05/2009 01:00p | 1,295 | realtor-only-logo.gif |
| | | Directory of d:\docs\contract\contracts\kentucky |
| 09/28/2009 12:41p | 11,116 | lbar-logo.jpg |
| 07/20/2009 09:54a | 3,279 | nkar-logo.gif |
| | | Directory of d:\docs\contract\contracts\ohio |
| 07/05/2009 01:00p | 5,448 | consumer-guide.gif |
| 07/05/2009 01:00p | 4,867 | discover-ohio-logo.gif |
| 07/23/2009 09:30a | 3,913 | rapattoni_mls.gif |
| | | Directory of d:\docs\contract\contracts\ohio\brokers\comey_shepherd |
| 09/15/2009 09:43a | 9,462 | logo.jpg |
| | | Directory of d:\docs\contract\contracts\ohio\brokers\group_realtors |
| 09/16/2009 08:13p | 14,735 | logo.JPG |
| | | Directory of d:\docs\contract\contracts\ohio\brokers\henkle_schueler |
| 09/11/2009 02:04p | 11,139 | logo.jpg |
| | | Directory of d:\docs\contract\contracts\ohio\brokers\hhb |
| 09/10/2009 04:30p | 4,806 | HHB_Color.gif |
| 09/10/2009 11:14p | 4,581 | HHB_Color_Trimmed.gif |
| 09/11/2009 02:04p | 31,357 | HHB_address.jpg |
| | | Directory of d:\docs\contract\contracts\ohio\brokers\huff_realty |
| 09/10/2009 11:55p | 2,350 | EqualHousing_RedBg.jpg |
| 09/10/2009 11:55p | 137,079 | HuffDirectLogo.jpg |
| 09/10/2009 11:55p | 22,829 | HuffEqualOpp.jpg |
| 09/10/2009 11:55p | 2,799 | HuffInvert.GIF |
| 09/04/2009 02:00p | 5,019 | HuffLogo.gif |
| 09/10/2009 11:55p | 2,741 | HuffLogoSmall.GIF |
| | | Directory of d:\docs\contract\contracts\ohio\brokers\keller_williams |
| 09/15/2009 09:43a | 118,877 | KellerWilliamsAdvisors.jpg |
| 09/15/2009 09:43a | 30,618 | logo.jpg |
| | | Directory of d:\docs\contract\contracts\ohio\brokers\pete_kopf |
| 09/16/2009 08:13p | 2,560 | logo.GIF |
| | | Directory of d:\docs\contract\contracts\remax |
| 07/05/2009 01:00p | 6,036 | remax-logo.jpg |
| 07/05/2009 01:00p | 2,170 | remax-logo-plain.gif |
| | | Directory of d:\docs\contract\contracts\remax_preferred |
| 07/05/2009 01:00p | 10,139 | remax_preferred-logo.gif |
| 07/05/2009 01:00p | 3,602 | remax_preferred_small-logo.gif |
| | | Directory of d:\docs\contract\contracts\remax_resources |
| 07/05/2009 01:00p | 2,820 | resources_logo.gif |
| 07/05/2009 01:00p | 8,238 | resources_logo-lg.gif |

-continued

| Creation | Size | Name |
|---|---|---|
| \multicolumn{3}{c}{Directory of d:\docs\contract\contracts\remax_unlimited} | | |
| 07/05/2009 01:00p | 26,545 | remax_unlimited-logo.jpg |
| \multicolumn{3}{c}{Directory of d:\docs\contract\contracts\sibcy_cline} | | |
| 07/05/2009 01:00p | 4,922 | EOLogo.jpg |
| 07/05/2009 01:00p | 4,672 | RealtorLogo.jpg |
| 07/05/2009 01:00p | 13,599 | SibcyClineLogo.jpg |
| \multicolumn{3}{c}{Directory of d:\docs\flash} | | |
| 07/05/2009 01:00p | 245,090 | Home_6.swf |
| 09/10/2009 11:54p | 175,792 | Home_7.swf |
| 07/05/2009 01:00p | 2,556 | expressInstall.as |
| 07/05/2009 01:00p | 54,272 | expressInstall.fla |
| 08/08/2009 06:30p | 3,677,714 | new_workflow_creating_an_offer.swf |
| 07/23/2009 09:21p | 557,056 | player.fla |
| 07/23/2009 09:21p | 51,189 | player.swf |
| 07/23/2009 09:21p | 8,064,427 | wcpo_9-1.flv |
| \multicolumn{3}{c}{Directory of d:\docs\images\buttons} | | |
| 07/05/2009 01:00p | 3,473 | accept.gif |
| 07/05/2009 01:00p | 1,066 | add.gif |
| 07/05/2009 01:00p | 1,561 | addNote.gif |
| 07/05/2009 01:00p | 1,031 | addS.gif |
| 07/05/2009 01:00p | 1,481 | closeM.gif |
| 07/05/2009 01:00p | 1,555 | contractContinue.gif |
| 07/05/2009 01:00p | 1,454 | contractSave.gif |
| 07/05/2009 01:00p | 1,493 | create.gif |
| 07/05/2009 01:00p | 1,359 | createNew.gif |
| 07/05/2009 01:00p | 3,256 | createOffer.gif |
| 07/05/2009 01:00p | 1,463 | createOfferRed.gif |
| 07/05/2009 01:00p | 1,353 | delete.gif |
| 07/05/2009 01:00p | 1,010 | editS.gif |
| 07/05/2009 01:00p | 1,616 | reOpenM.gif |
| 07/05/2009 01:00p | 1,114 | reOpenS.gif |
| 07/05/2009 01:00p | 3,180 | Register.jpg |
| 07/05/2009 01:00p | 1,193 | remove.gif |
| 07/05/2009 01:00p | 1,197 | removeBlue.gif |
| 08/01/2009 06:16p | 1,062 | save.gif |
| 07/05/2009 01:00p | 1,834 | saveProfile.gif |
| 07/05/2009 01:00p | 1,125 | search.gif |
| 07/05/2009 01:00p | 1,981 | searchExisting.gif |
| 07/05/2009 01:00p | 1,085 | select.gif |
| 07/05/2009 01:00p | 1,339 | signIn.jpg |
| 07/05/2009 01:00p | 1,567 | submit.gif |
| 07/05/2009 01:00p | 3,528 | submitOffer.gif |
| 07/05/2009 01:00p | 3,473 | submitOfferSM.gif |
| 07/05/2009 01:00p | 1,010 | viewS.gif |
| 07/05/2009 01:00p | 2,907 | withdrawM.gif |
| 07/05/2009 01:00p | 1,099 | withdrawS.gif |
| \multicolumn{3}{c}{Directory of d:\docs\images\clientPortal\common} | | |
| 07/05/2009 01:00p | 11,686 | tanGradientBG.jpg |
| \multicolumn{3}{c}{Directory of d:\docs\images\clientPortal\common\blue} | | |
| 07/23/2009 09:30a | 662 | checkbox.jpg |
| 07/23/2009 09:30a | 522 | uncheckbox.jpg |
| \multicolumn{3}{c}{Directory of d:\docs\images\clientPortal\common\white} | | |
| 07/23/2009 09:30a | 675 | checkbox.jpg |
| 07/23/2009 09:30a | 540 | uncheckbox.jpg |
| \multicolumn{3}{c}{Directory of d:\docs\images\clientPortal\dashboard} | | |
| 07/05/2009 01:00p | 382 | adsBg.jpg |
| 07/05/2009 01:00p | 1,042 | adsFtr.jpg |
| 07/05/2009 01:00p | 1,083 | adsHdr.jpg |
| 07/05/2009 01:00p | 830 | adsLt.jpg |
| 07/05/2009 01:00p | 830 | adsRt.jpg |
| 07/05/2009 01:00p | 399 | agentBg.jpg |
| 07/05/2009 01:00p | 1,467 | agentFtr.jpg |
| 07/05/2009 01:00p | 1,465 | agentHdr.jpg |
| 07/05/2009 01:00p | 356 | agentLt.jpg |
| 07/05/2009 01:00p | 359 | agentRt.jpg |
| 07/05/2009 01:00p | 2,317 | buttonContact.jpg |
| 07/05/2009 01:00p | 410 | buyingBg.jpg |
| 07/05/2009 01:00p | 1,734 | buyingFtr.jpg |
| 07/05/2009 01:00p | 1,731 | buyingHdr.jpg |

-continued

| Creation | Size | Name |
|---|---|---|
| 07/05/2009 01:00p | 406 | buyingLt.jpg |
| 07/05/2009 01:00p | 405 | buyingRt.jpg |
| 07/05/2009 01:00p | 849 | greenAgent.jpg |
| 07/05/2009 01:00p | 912 | greenHome.jpg |
| 07/05/2009 01:00p | 399 | noticeBg.jpg |
| 07/05/2009 01:00p | 1,467 | noticeFtr.jpg |
| 07/05/2009 01:00p | 1,539 | noticeHdr.jpg |
| 07/05/2009 01:00p | 836 | noticeLt.jpg |
| 07/05/2009 01:00p | 835 | noticeRt.jpg |
| 07/05/2009 01:00p | 2,075 | sampleAgent.jpg |
| 07/05/2009 01:00p | 410 | sellingBg.jpg |
| 07/05/2009 01:00p | 1,734 | sellingFtr.jpg |
| 07/05/2009 01:00p | 1,806 | sellingHdr.jpg |
| 07/05/2009 01:00p | 831 | sellingLt.jpg |
| 07/05/2009 01:00p | 830 | sellingRt.jpg |
| | Directory of d:\docs\images\clientPortal\formList | |
| 07/05/2009 01:00p | 417 | formListBg.jpg |
| 07/05/2009 01:00p | 1,869 | formListFtr.jpg |
| 07/05/2009 01:00p | 2,032 | formListHdr.jpg |
| 07/05/2009 01:00p | 831 | formListLt.jpg |
| 07/05/2009 01:00p | 830 | formListRt.jpg |
| | Directory of d:\docs\images\clientPortal\home | |
| 07/05/2009 01:00p | 39,496 | footerTemp.jpg |
| 07/05/2009 01:00p | 3,999 | headerLeft.jpg |
| 09/10/2009 11:54p | 29,768 | headerRight.jpg |
| 07/05/2009 01:00p | 1,574 | signIn.gif |
| | Directory of d:\docs\images\clientPortal\login | |
| 07/05/2009 01:00p | 4,476 | login_1_1.jpg |
| 07/05/2009 01:00p | 9,264 | login_2_1.jpg |
| 07/05/2009 01:00p | 2,050 | login_2_2.jpg |
| 07/05/2009 01:00p | 6,724 | login_2_3.jpg |
| 07/05/2009 01:00p | 9,007 | login_3_1.jpg |
| 07/05/2009 01:00p | 2,072 | login_3_2.jpg |
| 07/05/2009 01:00p | 7,443 | login_3_3.jpg |
| | Directory of d:\docs\images\clientPortal\notice | |
| 07/05/2009 01:00p | 18,851 | noticeBgWide.jpg |
| 07/05/2009 01:00p | 23,966 | noticeFtrWide.jpg |
| 07/05/2009 01:00p | 24,147 | noticeHdrWide.jpg |
| 07/05/2009 01:00p | 831 | noticeLt.jpg |
| 07/05/2009 01:00p | 830 | noticeRt.jpg |
| | Directory of d:\docs\images\clientPortal\property | |
| 07/05/2009 01:00p | 18,851 | sellingBgWide.jpg |
| 07/05/2009 01:00p | 23,966 | sellingFtrWide.jpg |
| 07/05/2009 01:00p | 24,147 | sellingHdrWide.jpg |
| 07/05/2009 01:00p | 831 | sellingLt.jpg |
| 07/05/2009 01:00p | 830 | sellingRt.jpg |
| | Directory of d:\docs\images\common | |
| 07/05/2009 01:00p | 644 | bgGradient.gif |
| 07/23/2009 09:30a | 442 | blue_nav_tri.jpg |
| 07/05/2009 01:00p | 551 | buttonGreen.gif |
| 07/05/2009 01:00p | 546 | buttonGrey.gif |
| 07/05/2009 01:00p | 551 | buttonRed.gif |
| 07/05/2009 01:00p | 551 | buttonYellow.gif |
| 07/05/2009 01:00p | 127 | calendar.gif |
| 07/05/2009 01:00p | 73 | check_false.gif |
| 07/05/2009 01:00p | 323 | check_true.gif |
| 07/05/2009 01:00p | 497 | cntntBL.gif |
| 07/05/2009 01:00p | 413 | cntntBL.jpg |
| 07/05/2009 01:00p | 70 | cntntBM.gif |
| 07/05/2009 01:00p | 324 | cntntBM.jpg |
| 07/05/2009 01:00p | 497 | cntntBR.gif |
| 07/05/2009 01:00p | 407 | cntntBR.jpg |
| 07/05/2009 01:00p | 68 | cntntCL.gif |
| 07/05/2009 01:00p | 326 | cntntCL.jpg |
| 07/05/2009 01:00p | 68 | cntntCR.gif |
| 07/05/2009 01:00p | 324 | cntntCR.jpg |
| 07/05/2009 01:00p | 297 | cntntTL.gif |
| 07/05/2009 01:00p | 415 | cntntTL.jpg |
| 07/05/2009 01:00p | 69 | cntntTM.gif |
| 07/05/2009 01:00p | 326 | cntntTM.jpg |
| 07/05/2009 01:00p | 497 | cntntTR.gif |

-continued

| Creation | Size | Name |
|---|---|---|
| 07/05/2009 01:00p | 409 | cntntTR.jpg |
| 07/05/2009 01:00p | 672 | edit.gif |
| 09/10/2009 11:54p | 1,071 | footer.jpg |
| 09/10/2009 11:54p | 5,447 | hdrLeft.jpg |
| 09/10/2009 11:54p | 6,398 | hdrRight.jpg |
| 09/10/2009 11:54p | 11,532 | header.jpg |
| 07/05/2009 01:00p | 745 | helpIcon.gif |
| 07/05/2009 01:00p | 669 | historyButton.gif |
| 09/10/2009 11:54p | 308 | ltBgBdr.jpg |
| 07/05/2009 01:00p | 342 | navGradient.jpg |
| 07/05/2009 01:00p | 399 | navGradientLeft.jpg |
| 07/05/2009 01:00p | 1,591 | signOut.gif |
| 07/05/2009 01:00p | 56 | subNavBar.gif |
| 07/05/2009 01:00p | 317 | timegif |
| | | Directory of d:\docs\images\common\list\blue |
| 07/23/2009 09:30a | 662 | checkbox.jpg |
| 07/23/2009 09:30a | 522 | uncheckbox.jpg |
| | | Directory of d:\docs\images\common\list\white |
| 07/23/2009 09:30a | 675 | checkbox.jpg |
| 07/23/2009 09:30a | 540 | uncheckbox.jpg |
| | | Directory of d:\docs\images\common\orangeBox |
| 07/05/2009 01:00p | 64 | cntBC.gif |
| 07/05/2009 01:00p | 282 | cntBL.gif |
| 07/05/2009 01:00p | 282 | cntBR.gif |
| 07/05/2009 01:00p | 64 | cntML.gif |
| 07/05/2009 01:00p | 64 | cntMR.gif |
| 07/05/2009 01:00p | 64 | cntTC.gif |
| 07/05/2009 01:00p | 281 | cntTL.gif |
| 07/05/2009 01:00p | 281 | cntTR.gif |
| | | Directory of d:\docs\images\common\public |
| 09/10/2009 11:54p | 1,071 | footer.jpg |
| 09/10/2009 11:54p | 5,888 | hdrLeft.jpg |
| 09/10/2009 11:54p | 7,171 | hdrLeftBuyerSeller.jpg |
| 09/10/2009 11:54p | 5,703 | hdrRight.jpg |
| 09/10/2009 11:54p | 2,159 | tabBuyersSellers.jpg |
| 09/10/2009 11:54p | 2,313 | tabBuyersSellersSel.jpg |
| 09/10/2009 11:54p | 995 | tabFiller.jpg |
| 09/10/2009 11:54p | 2,021 | tabRealtors.jpg |
| 09/10/2009 11:54p | 2,148 | tabRealtorsSel.jpg |
| 09/10/2009 11:54p | 513 | tabRight.jpg |
| 09/10/2009 11:54p | 313 | tabSpacer.jpg |
| | | Directory of d:\docs\images\contract |
| 07/05/2009 01:00p | 1,356 | alertGradient.jpg |
| 07/05/2009 01:00p | 445 | alertIconLg.gif |
| 07/05/2009 01:00p | 2,170 | btnOption1.gif |
| 07/05/2009 01:00p | 2,099 | btnOption1Disabled.gif |
| 07/05/2009 01:00p | 2,135 | btnOption2.gif |
| | | Directory of d:\docs\images\contract\saveContract |
| 07/05/2009 01:00p | 3,928 | addForms.gif |
| 07/05/2009 01:00p | 3,528 | submitOffer.gif |
| 07/05/2009 01:00p | 4,935 | women.jpg |
| | | Directory of d:\docs\images\contract\workflow\blue |
| 07/28/2009 02:02p | 4,917 | agent-eithers_agent.jpg |
| 07/28/2009 01:40p | 6,505 | all-buyers_agent.jpg |
| 08/04/2009 08:36p | 7,448 | all-either_agent.jpg |
| 07/28/2009 01:38p | 6,526 | all-sellers_agent.jpg |
| 08/04/2009 08:34p | 5,633 | buyer-buyers_agent.jpg |
| 07/28/2009 02:24p | 2,286 | from_agent-to_agent.jpg |
| 07/28/2009 02:22p | 2,513 | from_agent-to_client.jpg |
| 07/28/2009 01:35p | 6,782 | one_side-eithers_agent.jpg |
| 08/04/2009 08:32p | 5,537 | seller-sellers_agent.jpg |
| | | Directory of d:\docs\images\contract\workflow\large-images |
| 07/28/2009 04:55p | 11,986 | all-either_agent.jpg |
| 07/28/2009 04:56p | 9,134 | buyer-buyers_agent.jpg |
| 07/28/2009 04:58p | 12,202 | one_side-eithers_agent.jpg |
| 07/28/2009 04:57p | 8,869 | seller-sellers_agent.jpg |

-continued

| Creation | Size | Name |
|---|---|---|
| Directory of d:\docs\images\contract\workflow\white | | |
| 07/28/2009 02:02p | 5,126 | agent-eithers_agent.jpg |
| 07/28/2009 01:48p | 6,824 | all-buyers_agent.jpg |
| 08/04/2009 08:36p | 7,814 | all-either_agent.jpg |
| 07/28/2009 01:37p | 6,844 | all-sellers_agent.jpg |
| 08/04/2009 08:34p | 6,043 | buyer-buyers_agent.jpg |
| 07/28/2009 02:25p | 2,430 | from_agent-to_agent.jpg |
| 07/28/2009 02:21p | 2,655 | from_agent-to_client.jpg |
| 07/28/2009 01:36p | 6,989 | one_side-eithers_agent.jpg |
| 08/04/2009 08:28p | 5,899 | seller-sellers_agent.jpg |
| Directory of d:\docs\images\email | | |
| 07/05/2009 01:00p | 3,029 | aallison.jpg |
| 07/05/2009 01:00p | 2,213 | btnReview.gif |
| 07/05/2009 01:00p | 243 | contCornerTL.gif |
| 07/05/2009 01:00p | 2,581 | contHeadAgentInfo.gif |
| 07/05/2009 01:00p | 493 | contHeadLeft.gif |
| 07/05/2009 01:00p | 891 | contHeadTL.gif |
| 07/05/2009 01:00p | 794 | contHeadTL50.gif |
| 07/05/2009 01:00p | 4,237 | contHeadWhatsNew.gif |
| 07/05/2009 01:00p | 3,536 | contHeadWhyUse.gif |
| 07/05/2009 01:00p | 691 | contLeft.gif |
| 07/05/2009 01:00p | 412 | contTop.gif |
| 07/05/2009 01:00p | 677 | innerFooter.jpg |
| 07/05/2009 01:00p | 437 | innerLeft.jpg |
| 07/05/2009 01:00p | 318 | innerRight.jpg |
| 07/05/2009 01:00p | 717 | mlsFooter.jpg |
| 07/05/2009 01:00p | 8,848 | mlsHeader.jpg |
| 07/05/2009 01:00p | 514 | sideBg.jpg |
| 07/05/2009 01:00p | 49 | spacer.gif |
| 07/05/2009 01:00p | 427 | topBg.jpg |
| Directory of d:\docs\images\home | | |
| 07/05/2009 01:00p | 32,943 | family.jpg |
| 07/05/2009 01:00p | 917 | headerLeft.jpg |
| 07/05/2009 01:00p | 3,887 | headerRight.jpg |
| 07/05/2009 01:00p | 1,105 | headerTop.jpg |
| Directory of d:\docs\images\home2 | | |
| 09/10/2009 11:54p | 3,161 | featBoxBody.jpg |
| 09/10/2009 11:54p | 1,120 | featBoxHdr.jpg |
| 07/05/2009 01:00p | 22,470 | flashAlt.jpg |
| 07/05/2009 01:00p | 392 | flashBoxBg.jpg |
| 07/05/2009 01:00p | 550 | flashBoxBtm.jpg |
| 07/05/2009 01:00p | 2,264 | flashBoxFtrL.jpg |
| 07/05/2009 01:00p | 2,177 | flashBoxFtrR.jpg |
| 07/05/2009 01:00p | 1,176 | flashBoxHdr.jpg |
| 07/05/2009 01:00p | 372 | greenBullet.gif |
| 07/05/2009 01:00p | 397 | loginBg.jpg |
| 07/05/2009 01:00p | 3,637 | loginBox.jpg |
| 07/05/2009 01:00p | 1,330 | loginFtr.jpg |
| 07/05/2009 01:00p | 1,299 | loginHdr.jpg |
| 07/05/2009 01:00p | 2,353 | registerBox.jpg |
| 07/05/2009 01:00p | 3,278 | registerButton.gif |
| 07/05/2009 01:00p | 1,179 | signInButton.gif |
| Directory of d:\docs\images\register | | |
| 07/05/2009 01:00p | 23,383 | big_realtor_03.jpg |
| 09/14/2009 02:47p | 1,222 | field_bg.jpg |
| Directory of d:\docs\images\timePicker | | |
| 07/05/2009 01:00p | 447 | am1.gif |
| 07/05/2009 01:00p | 482 | am2.gif |
| 07/05/2009 01:00p | 106 | close.gif |
| 07/05/2009 01:00p | 433 | pm1.gif |
| 07/05/2009 01:00p | 470 | pm2.gif |
| 07/05/2009 01:00p | 745 | timepicker.gif |
| 07/05/2009 01:00p | 754 | timepicker2.gif |
| 07/05/2009 01:00p | 107 | titleback.gif |
| Directory of d:\docs\images\user\help | | |
| 07/23/2009 09:30a | 23,851 | big_realtor_02.jpg |
| 07/23/2009 09:30a | 814 | btn_contact_us.gif |
| 07/23/2009 09:30a | 737 | btn_view_now.gif |
| 07/23/2009 09:30a | 889 | btn_view_webinar.gif |
| 07/23/2009 09:30a | 684 | section_footer.jpg |

-continued

| Creation | Size | Name |
|---|---|---|
| 07/23/2009 09:30a | 1,638 | section_gradient.jpg |
| 07/23/2009 09:30a | 903 | section_header.jpg |
| 07/23/2009 09:30a | 348 | shadow-left.jpg |
| 07/23/2009 09:30a | 311 | shadow-mid.jpg |
| 07/23/2009 09:30a | 352 | shadow-right.jpg |
| | | Directory of d:\docs\images\user\help\contact_us |
| 07/23/2009 09:30a | 24,653 | contact_us_right_bg.jpg |
| | | Directory of d:\docs\images\user\help\videos |
| 07/23/2009 09:30a | 350 | main_bg.jpg |
| 07/23/2009 09:30a | 18,324 | player_bg.jpg |
| 07/23/2009 09:30a | 461 | top_left_corner.jpg |
| 07/23/2009 09:30a | 464 | top_right_corner.jpg |
| 07/23/2009 09:30a | 428 | video_bg.jpg |
| 08/10/2009 08:43p | 3,910 | video_support_counter_offer.jpg |
| 08/10/2009 08:43p | 3,919 | video_support_counter_offer_confirmed.jpg |
| 08/10/2009 08:43p | 3,653 | video_support_creating_offer.jpg |
| 08/10/2009 08:43p | 4,179 | video_thumbnail.jpg |
| | | Directory of d:\docs\images\verification |
| 07/05/2009 01:00p | 18,103 | verification-code.jpg |
| | | Directory of d:\docs\jobs |
| 08/05/2009 05:48p | 114 | index.html |
| | | Directory of d:\docs\js |
| 07/05/2009 01:00p | 49,237 | calendar.js |
| 07/05/2009 01:00p | 3,600 | calendar-en.js |
| 07/05/2009 01:00p | 8,853 | calendar-setup.js |
| 09/04/2009 12:35p | 4,120 | calendar-utility.js |
| 09/24/2009 10:35a | 10,581 | common.js |
| 07/05/2009 01:00p | 6,309 | contract.js |
| 08/21/2009 12:53p | 58,931 | dhtmlSuite-calendar.js |
| 08/20/2009 08:16p | 13,907 | dhtmlSuite-common.js |
| 08/20/2009 08:16p | 7,433 | dhtmlSuite-dragDropSimple.js |
| 09/16/2009 08:13p | 5,993 | foundation.js |
| 07/05/2009 01:00p | 17,720 | json2.js |
| 07/20/2009 09:54a | 20,851 | names.js |
| 07/20/2009 09:54a | 2,496 | property.js |
| 07/05/2009 01:00p | 9,759 | swfobject.js |
| 07/20/2009 09:54a | 7,704 | time-picker.js |
| | | Directory of d:\docs\pdf\cincinnati |
| 07/05/2009 01:00p | 139,552 | Agent-Instructions.pdf |
| | | Directory of d:\docs\pdf\jobs |
| 06/17/2009 12:44p | 26,626 | Job-Description-Java-Web-Developer.pdf |
| 07/07/2009 05:43p | 26,501 | Job-Description-Junior-Java-Web-Developer.pdf |
| 08/04/2009 02:36p | 26,692 | Job-Description-Senior-Java-Web-Developer.pdf |
| | | Directory of d:\docs\pdf\marketing |
| 07/05/2009 01:00p | 180,664 | 10Steps.pdf |
| 07/05/2009 01:00p | 76,343 | e-signatures.pdf |
| 07/05/2009 01:00p | 73,780 | e-signatures_homebuyer.pdf |
| 07/05/2009 01:00p | 383,447 | information.pdf |
| 07/05/2009 01:00p | 301,251 | trifold.pdf |
| | | Directory of d:\docs\states\ohio |
| 07/05/2009 01:00p | 7,215 | ohio_eho_logo.jpg |
| 07/05/2009 01:00p | 2,609 | ohio_eho_logoSm.jpg |
| 07/05/2009 01:00p | 10,803 | ohio_seal.jpg |
| 07/05/2009 01:00p | 3,747 | ohio_sealSm.jpg |
| | | Directory of d:\docs\style |
| 07/05/2009 01:00p | 1,279 | clientPortal.css |
| 10/02/2009 10:45a | 15,843 | site.css |
| | | Directory of d:\docs\style\dhtmlcalendar |
| 08/20/2009 08:16p | 9,213 | calendar.css |
| 08/20/2009 08:16p | 60 | calendar-close.gif |
| 08/20/2009 08:16p | 99 | calendar-dropdown-arrow.gif |
| 08/20/2009 08:16p | 49 | calendar-dropdown-down.gif |
| 08/20/2009 08:16p | 49 | calendar-dropdown-up.gif |
| 08/20/2009 08:16p | 21,166 | calendar-dropdown-up.psd |
| 08/20/2009 08:16p | 50 | calendar-next-month.gif |
| 08/20/2009 08:16p | 54 | calendar-next-year.gif |

-continued

| Creation | Size | Name |
|---|---|---|
| 08/20/2009 08:16p | 21,326 | calendar-next-year.psd |
| 08/20/2009 08:16p | 49 | calendar-previous-month.gif |
| 08/20/2009 08:16p | 54 | calendar-previous-year.gif |
| 08/20/2009 08:16p | 185 | calendar_heading.png |

Directory of d:\docs\style\jscal\aqua

| Creation | Size | Name |
|---|---|---|
| 07/05/2009 01:00p | 89 | active-bg.gif |
| 07/05/2009 01:00p | 85 | dark-bg.gif |
| 07/05/2009 01:00p | 89 | hover-bg.gif |
| 07/05/2009 01:00p | 49 | menuarrow.gif |
| 07/05/2009 01:00p | 110 | normal-bg.gif |
| 07/05/2009 01:00p | 110 | rowhover-bg.gif |
| 07/05/2009 01:00p | 116 | status-bg.gif |
| 07/05/2009 01:00p | 5,576 | theme.css |
| 07/05/2009 01:00p | 116 | title-bg.gif |
| 07/05/2009 01:00p | 1,122 | today-bg.gif |

Directory of d:\docs\verify

| Creation | Size | Name |
|---|---|---|
| 07/23/2009 09:30a | 123 | index.html |

Directory of d:\docs\video

| Creation | Size | Name |
|---|---|---|
| 07/23/2009 09:30a | 2,507,222 | MLSC_Overview.swf |
| 07/23/2009 09:30a | 559 | index.html |

Directory of d:\src

| Creation | Size | Name |
|---|---|---|
| 08/01/2009 08:47p | 6,713 | MlsFormsSchema.xsd |
| 09/11/2009 12:03p | 10,284 | admin.xml |
| 08/01/2009 08:47p | 1,616 | agent.xml |
| 08/01/2009 08:47p | 960 | application.properties |
| 09/08/2009 09:34a | 1,537 | apps.xml |
| 08/01/2009 08:47p | 2,118 | client.xml |
| 09/20/2009 10:59a | 6,423 | clientPortal.xml |
| 08/01/2009 08:47p | 685 | codes.properties |
| 08/06/2009 09:08a | 11,522 | contract.xml |
| 09/18/2009 10:38a | 17 | environment.properties |
| 09/18/2009 09:16a | 7,777 | environment.xml |
| 09/13/2009 12:31p | 2,212 | foundation.xml |
| 09/02/2009 09:30a | 355 | log4j.properties |
| 08/27/2009 02:14p | 1,934 | officeManager.xml |
| 08/01/2009 08:47p | 3,437 | property.xml |
| 08/01/2009 08:47p | 8,720 | struts.properties |
| 09/08/2009 09:34a | 2,865 | struts.xml |
| 09/18/2009 09:16a | 7,155 | user.xml |
| 08/01/2009 08:47p | 1,770 | validators.xml |
| 08/01/2009 08:47p | 1,429 | verify.xml |
| 09/02/2009 09:30a | 25,507 | workflow-rules.xml |

Directory of d:\src\com

| Creation | Size | Name |
|---|---|---|
| 09/16/2009 08:13p | 1,272 | package.properties |

Directory of d:\src\com\nbs\general\action

| Creation | Size | Name |
|---|---|---|
| 08/01/2009 08:46p | 239 | ActionDefaultSupport.java |
| 08/01/2009 08:46p | 1,541 | BaseActionSupport.java |
| 08/01/2009 08:46p | 318 | SessionActionSupport.java |

Directory of d:\src\com\nbs\general\data

| Creation | Size | Name |
|---|---|---|
| 08/01/2009 08:46p | 6,399 | BaseQuery.java |
| 08/01/2009 08:46p | 272 | BaseResultBean.java |
| 08/01/2009 08:46p | 1,371 | BaseSql.java |
| 08/01/2009 08:46p | 755 | PageResults.java |
| 08/01/2009 08:46p | 279 | SQLLongMap.java |
| 08/01/2009 08:46p | 200 | SQLRowMapper.java |
| 08/21/2009 01:51p | 378 | StaticConnectionInfo.java |
| 08/01/2009 08:46p | 103 | XmlExportInterface.java |

Directory of d:\src\com\nbs\general\exception

| Creation | Size | Name |
|---|---|---|
| 08/01/2009 08:46p | 601 | AccessDeniedException.java |
| 08/01/2009 08:46p | 425 | BaseException.java |
| 08/01/2009 08:46p | 733 | DBException.java |

Directory of d:\src\com\nbs\general\logic

| Creation | Size | Name |
|---|---|---|
| 08/01/2009 08:46p | 65 | BaseLogic.java |
| 08/16/2009 12:21p | 3,023 | Format.java |
| 08/01/2009 08:46p | 3,370 | GUICalendarFactory.java |
| 08/01/2009 08:46p | 2,507 | PagingFactory.java |

-continued

| Creation | Size | Name |
|---|---|---|
| | | Directory of d:\src\com\nbs\general\other |
| 08/01/2009 08:46p | 496 | GUICalendar.java |
| 08/01/2009 08:46p | 958 | GUICalendarDay.java |
| 08/01/2009 08:46p | 701 | GUICalendarEvent.java |
| 08/01/2009 08:46p | 488 | GUICalendarWeek.java |
| 09/12/2009 06:03p | 810 | GeoArea.java |
| 09/12/2009 04:45p | 399 | GeoPoint.java |
| 08/01/2009 08:46p | 1,423 | PageBean.java |
| 08/01/2009 08:46p | 622 | PageImage.java |
| 08/01/2009 08:46p | 611 | SelectOption.java |
| | | Directory of d:\src\com\nbs\general\tags |
| 08/01/2009 08:47p | 8,281 | PageNumberIteratorTag.java |
| 08/01/2009 08:47p | 1,879 | PageNumberJumpImageTag.java |
| 08/01/2009 08:47p | 3,468 | PageNumberTag.java |
| | | Directory of d:\src\com\nbs\general\test |
| 08/01/2009 08:46p | 413 | EncodeTestMain.java |
| 08/16/2009 12:21p | 253 | FormatNumberMain.java |
| 08/16/2009 12:21p | 362 | FormatTelephoneMain.java |
| 08/01/2009 08:46p | 1,315 | GUICalendarTest.java |
| 09/08/2009 09:34a | 310 | SendTextMain.java |
| 08/01/2009 08:46p | 783 | WorkflowTestMain.java |
| | | Directory of d:\src\com\nbs\general\util |
| 08/01/2009 08:46p | 5,021 | Encryption.java |
| 08/07/2009 10:03a | 5,122 | Environment.java |
| 09/12/2009 06:09p | 1,417 | GeoFunctions.java |
| 08/01/2009 08:46p | 1,428 | HashFile.java |
| 09/13/2009 12:31p | 675 | JSON.java |
| 08/01/2009 08:46p | 699 | Parsing.java |
| | | Directory of d:\src\com\nbs\user\action |
| 08/01/2009 08:47p | 2,439 | CreateUser.java |
| 08/01/2009 08:47p | 1,867 | CreateUser-CreateUser_submit-validation.xml |
| 08/01/2009 08:47p | 3,085 | ForgotPasswordAction.java |
| 08/01/2009 08:47p | 2,910 | ForgotUsernameAction.java |
| 08/01/2009 08:47p | 1,267 | HomeAction.java |
| 09/08/2009 09:34a | 4,174 | Login.java |
| 08/01/2009 08:47p | 972 | Login-Login_submit-validation.xml |
| 08/01/2009 08:47p | 390 | LogoutAction.java |
| 08/01/2009 08:47p | 734 | MailAction.java |
| 08/01/2009 08:47p | 820 | MailListAction.java |
| 09/16/2009 08:13p | 9,104 | MyProfileAction.java |
| 08/01/2009 08:47p | 973 | MyProfileAction-MyProfile_Save-validation.xml |
| 08/01/2009 08:47p | 2,488 | MyProfileContactAction.java |
| 08/01/2009 08:47p | 5,777 | MyProfileCredentialsAction.java |
| 08/01/2009 08:47p | 3,239 | MyProfileCredentialsAction-MyProfileCredentials_Save-validation.xml |
| 08/01/2009 08:47p | 1,209 | MyProfilePictureAction.java |
| 09/20/2009 10:59a | 4,038 | RegisterAction.java |
| 09/14/2009 11:05a | 1,185 | RegisterAction-Register_Save-validation.xml |
| 09/20/2009 10:59a | 8,797 | RegisterAgentAction.java |
| 08/01/2009 08:47p | 3,266 | RegisterAgentAction-RegisterAgent_Save-validation.xml |
| 09/18/2009 03:40p | 3,683 | RegisterAgentListAction.java |
| 09/18/2009 09:16a | 5,382 | RegisterBrokerageAction.java |
| 09/17/2009 09:51a | 1,761 | package.properties |
| | | Directory of d:\src\com\nbs\user\data |
| 09/08/2009 09:34a | 47,410 | SecuritySQL.java |
| 08/01/2009 08:47p | 604 | SecuritySQLMain.java |
| | | Directory of d:\src\com\nbs\user\interceptor |
| 08/01/2009 08:47p | 1,652 | LoggedInInterceptor.java |
| | | Directory of d:\src\com\nbs\user\logic |
| 09/20/2009 10:59a | 2,270 | CreateUserLogic.java |
| 08/01/2009 08:47p | 11,254 | CredentialMasterLogic.java |
| 08/01/2009 08:47p | 2,987 | ForgotAccountLogic.java |
| 09/08/2009 09:34a | 9,328 | LoginLogic.java |
| 08/01/2009 08:47p | 1,770 | MailLogic.java |
| 09/09/2009 07:53p | 748 | PasswordGenerator.java |
| 09/20/2009 10:59a | 11,792 | RegistrationLogic.java |
| 08/01/2009 08:47p | 1,209 | SecretQuestionMasterLogic.java |

-continued

| Creation | Size | Name |
|---|---|---|
| colspan="3" | Directory of d:\src\com\nbs\user\other | |
| 08/01/2009 08:47p | 1,030 | AdministratorMaster.java |
| 08/01/2009 08:47p | 1,020 | AdministratorRole.java |
| 08/01/2009 08:47p | 4,254 | CredentialAgentInfo.java |
| 08/01/2009 08:47p | 1,346 | CredentialEventLog.java |
| 09/08/2009 09:34a | 5,310 | CredentialMaster.java |
| 08/01/2009 08:47p | 788 | CredentialPassword.java |
| 08/01/2009 08:47p | 413 | CredentialSalt.java |
| 08/01/2009 08:47p | 641 | Credentials.java |
| 08/01/2009 08:47p | 406 | CredentialsInUseException.java |
| 08/01/2009 08:47p | 955 | SaltCache.java |
| 08/01/2009 08:47p | 1,392 | SecretQuestionMaster.java |
| 09/08/2009 09:34a | 10,046 | UserToken.java |
| colspan="3" | Directory of d:\src\com\nbs\user\other\exception | |
| 08/01/2009 08:47p | 109 | EmailAddressInUseException.java |
| 08/01/2009 08:47p | 112 | EmailAddressNotFoundException.java |
| 08/01/2009 08:47p | 402 | EnrollmentException.java |
| 08/01/2009 08:47p | 413 | InvalidCredentialsException.java |
| 08/01/2009 08:47p | 103 | InvalidUserException.java |
| 08/01/2009 08:47p | 102 | SaltNotSetException.java |
| 08/01/2009 08:47p | 105 | UsernameInUseException.java |
| colspan="3" | Directory of d:\src\com\opensymphony\xwork2\validator\validators | |
| 08/01/2009 08:47p | 2,336 | LongRangeFieldValidator.java |
| colspan="3" | Directory of d:\src\com\redcs\administration\action | |
| 08/01/2009 08:46p | 307 | ActionDefaultSupport.java |
| 08/02/2009 05:53p | 790 | AgentListAction.java |
| 09/08/2009 09:34a | 2,478 | BaseAdminAction.java |
| 08/02/2009 05:53p | 5,259 | BrokerageAction.java |
| 08/30/2009 02:04p | 364 | BrokerageAgentListAction.java |
| 08/30/2009 02:04p | 362 | BrokerageFormListAction.java |
| 08/25/2009 10:59a | 1,806 | BrokerageListAction.java |
| 08/30/2009 02:04p | 366 | BrokerageOfficeListAction.java |
| 08/02/2009 06:56p | 1,072 | ClientAction.java |
| 08/02/2009 05:38p | 600 | ClientListAction.java |
| 08/02/2009 05:54p | 1,499 | EmailLogAction.java |
| 09/08/2009 09:34a | 1,135 | FormBrokerageAction.java |
| 09/08/2009 09:34a | 1,717 | FormDetailAction.java |
| 09/15/2009 01:50p | 800 | FormFieldAction.java |
| 09/08/2009 09:34a | 875 | FormFieldListAction.java |
| 09/08/2009 09:34a | 636 | FormImportAction.java |
| 09/08/2009 09:34a | 840 | FormListAction.java |
| 09/11/2009 12:25p | 704 | FormMasterMetaListAction.java |
| 09/08/2009 09:34a | 1,026 | FormPageAction.java |
| 09/08/2009 09:34a | 1,411 | FormPageFieldAction.java |
| 09/08/2009 09:34a | 1,396 | FormPageFieldTableDefaultAction.java |
| 09/08/2009 09:34a | 410 | FormPageVerifyAction.java |
| 08/02/2009 05:50p | 667 | HelpAction.java |
| 08/02/2009 05:51p | 662 | HelpListAction.java |
| 08/02/2009 05:51p | 6,804 | OfficeAction.java |
| 08/01/2009 08:46p | 4,025 | OfficeAction-Office_Save-validation.xml |
| 08/02/2009 05:54p | 2,652 | OfficeListAction.java |
| 08/01/2009 08:46p | 716 | ServerStatusAction.java |
| 09/02/2009 09:30a | 1,869 | StatisticsAction.java |
| 08/02/2009 05:32p | 5,460 | UserAction.java |
| 08/02/2009 05:33p | 1,694 | UserAgentAction.java |
| 08/28/2009 10:19a | 2,733 | UserAgentPropertyUploadAction.java |
| 08/02/2009 05:53p | 3,168 | UserListAction.java |
| 08/02/2009 05:52p | 1,750 | UserPasswordAction.java |
| 08/01/2009 08:46p | 524 | WorkflowAction.java |
| 08/01/2009 08:46p | 592 | package.properties |
| colspan="3" | Directory of d:\src\com\redcs\administration\codes\action | |
| 08/01/2009 08:46p | 1,650 | AgentTitleAction.java |
| 08/01/2009 08:46p | 716 | AgentTitleAction-AgentTitle_Save-validation.xml |
| 08/01/2009 08:46p | 810 | AgentTitleListAction.java |
| 08/01/2009 08:46p | 1,687 | PhoneTypeAction.java |
| 08/01/2009 08:46p | 730 | PhoneTypeAction-PhoneType_Save-validation.xml |
| 08/01/2009 08:46p | 796 | PhoneTypeListAction.java |
| colspan="3" | Directory of d:\src\com\redcs\administration\interceptor | |
| 08/29/2009 12:01p | 788 | AdministratorInterceptor.java |

-continued

| Creation | Size | Name |
|---|---|---|
| \multicolumn{3}{c}{Directory of d:\src\com\redcs\administration\logic} | | |
| 08/28/2009 10:38a | 9,281 | AdminAgentLogic.java |
| 08/02/2009 06:22p | 483 | AdminBaseActionLogic.java |
| 08/30/2009 02:04p | 3,255 | AdminBrokerageLogic.java |
| 08/04/2009 06:57p | 9,714 | AdminClientLogic.java |
| 08/01/2009 08:46p | 973 | AdminEmailLogLogic.java |
| 09/08/2009 09:34a | 2,915 | AdminFormFieldLogic.java |
| 09/16/2009 03:24p | 31,039 | AdminFormLogic.java |
| 09/16/2009 08:13p | 16,235 | AdminFormPageVerifyLogic.java |
| 08/01/2009 08:46p | 3,221 | AdminHelpLogic.java |
| 08/30/2009 02:04p | 9,889 | AdminUserLogic.java |
| 09/02/2009 09:30a | 1,609 | AdminWorkflowLogic.java |
| 08/01/2009 08:46p | 1,307 | ServerStatusLogic.java |
| \multicolumn{3}{c}{Directory of d:\src\com\redcs\administration\other} | | |
| 08/28/2009 03:15p | 329 | ErrorCodeDefs.java |
| 08/28/2009 03:15p | 398 | FormFieldError.java |
| 08/28/2009 03:14p | 1,846 | JrxmlField.java |
| 09/03/2009 03:32p | 2,589 | JspField.java |
| 08/28/2009 09:27a | 892 | PropertyMasterContainer.java |
| 09/17/2009 09:51a | 2,697 | VerifyField.java |
| \multicolumn{3}{c}{Directory of d:\src\com\redcs\apps\action} | | |
| 09/08/2009 09:34a | 1,764 | LoginAction.java |
| \multicolumn{3}{c}{Directory of d:\src\com\redcs\clientPortal\action} | | |
| 08/01/2009 08:46p | 4,931 | ClientContractAction.java |
| 09/18/2009 09:16a | 3,522 | ClientContractHistoryAction.java |
| 08/01/2009 08:46p | 4,122 | ClientContractSignaturesAction.java |
| 08/01/2009 08:46p | 1,172 | ClientContractSignedAction.java |
| 08/01/2009 08:46p | 3,527 | ClientContractViewAction.java |
| 08/16/2009 12:21p | 3,029 | ClientCredentialsAction.java |
| 08/01/2009 08:46p | 998 | ClientCredentialsAction-Credentials_Save-validation.xml |
| 08/01/2009 08:46p | 1,244 | ClientEnrollAction.java |
| 08/01/2009 08:46p | 1,449 | ClientEnrollAction-Enroll_Submit-validation.xml |
| 08/01/2009 08:46p | 1,767 | ClientFieldHistoryAction.java |
| 08/01/2009 08:46p | 1,015 | ClientForgotPasswordAction.java |
| 08/01/2009 08:46p | 632 | ClientForgotPasswordAction-ForgotPassword_Submit-validation.xml |
| 08/01/2009 08:46p | 1,638 | ClientForgotPasswordSecurityAction.java |
| 08/01/2009 08:46p | 537 | ClientForgotPasswordSecurityAction-ForgotPasswordSecurity_Submit-validation.xml |
| 08/01/2009 08:46p | 826 | ClientFormListAction.java |
| 08/01/2009 08:46p | 668 | ClientHomeAction.java |
| 09/08/2009 09:34a | 3,438 | ClientLoginAction.java |
| 08/01/2009 08:46p | 991 | ClientLoginAction-Login_Submit-validation.xml |
| 08/01/2009 08:46p | 526 | ClientLogoffAction.java |
| 08/01/2009 08:46p | 931 | ClientNoticeHistoryAction.java |
| 08/01/2009 08:46p | 821 | ClientPropertyListAction.java |
| 09/20/2009 10:59a | 842 | package.properties |
| \multicolumn{3}{c}{Directory of d:\src\com\redcs\clientPortal\interceptor} | | |
| 08/01/2009 08:46p | 1,582 | LoggedInInterceptor.java |
| \multicolumn{3}{c}{Directory of d:\src\com\redcs\clientPortal\logic} | | |
| 08/01/2009 08:46p | 348 | ClientBaseLogic.java |
| 08/01/2009 08:46p | 5,723 | ClientContractLogic.java |
| 09/18/2009 09:16a | 8,480 | ClientContractPrintLogic.java |
| 08/03/2009 08:51a | 19,616 | ClientContractSignatureLogic.java |
| 08/16/2009 12:21p | 3,351 | ClientCredentialsLogic.java |
| 08/03/2009 04:40p | 5,676 | ClientFormLogic.java |
| 08/01/2009 08:46p | 4,534 | ClientLoginLogic.java |
| 08/01/2009 08:46p | 1,821 | ClientNoticeLogic.java |
| 08/03/2009 08:51a | 8,672 | ClientOfferLogic.java |
| 08/01/2009 08:46p | 3,557 | ClientPropertyLogic.java |
| 08/16/2009 12:21p | 9,039 | ClientSecurityLogic.java |
| \multicolumn{3}{c}{Directory of d:\src\com\redcs\clientPortal\other} | | |
| 08/01/2009 08:46p | 1,128 | ClientSignatureStatus.java |
| 08/01/2009 08:46p | 1,466 | ClientToken.java |
| \multicolumn{3}{c}{Directory of d:\src\com\redcs\contract\action} | | |
| 08/01/2009 08:46p | 5,811 | ContractAction.java |
| 08/18/2009 10:15a | 8,011 | ContractAgentListAction.java |
| 08/01/2009 08:46p | 541 | ContractAgentListAction-ContractAgentList_AddBuyer-validation.xml |

-continued

| Creation | Size | Name |
| --- | --- | --- |
| 08/01/2009 08:46p | 542 | ContractAgentListAction-ContractAgentList_AddSeller-validation.xml |
| 08/01/2009 08:46p | 4,826 | ContractAttachmentAction.java |
| 08/01/2009 08:46p | 873 | ContractAttachmentAction-ContractAttachment_Save-validation.xml |
| 08/01/2009 08:46p | 1,175 | ContractAttachmentListAction.java |
| 08/01/2009 08:46p | 7,254 | ContractClientListAction.java |
| 08/01/2009 08:46p | 542 | ContractClientListAction-ContractClientList_AddBuyer-validation.xml |
| 08/01/2009 08:46p | 543 | ContractClientListAction-ContractClientList_AddSeller-validation.xml |
| 09/18/2009 12:26p | 6,749 | ContractHistoryAction.java |
| 08/01/2009 08:46p | 1,176 | ContractListAction.java |
| 08/01/2009 08:46p | 1,611 | ContractNameSearchAction.java |
| 08/01/2009 08:46p | 4,472 | ContractPaymentAction.java |
| 08/01/2009 08:46p | 4,040 | ContractReOpenAction.java |
| 08/01/2009 08:46p | 1,757 | ContractSearchListAction.java |
| 08/01/2009 08:46p | 2,951 | ContractSignatureAction.java |
| 08/01/2009 08:46p | 4,586 | ContractSignatureClientsAction.java |
| 09/18/2009 06:20p | 7,115 | ContractSubmitAction.java |
| 08/01/2009 08:46p | 1,063 | ContractWarningsAction.java |
| 09/02/2009 09:30a | 3,321 | ContractWithdrawAction.java |
| 08/01/2009 08:46p | 11,021 | CreateOfferAction.java |
| 08/01/2009 08:46p | 1,677 | FieldHistoryAction.java |
| 08/01/2009 08:46p | 863 | FormListAction.java |
| 08/01/2009 08:46p | 6,182 | LookupPropertyAction.java |
| 08/01/2009 08:46p | 3,781 | MyContractListAction.java |
| 09/04/2009 09:53a | 10,821 | NewContractAction.java |
| 08/01/2009 08:46p | 3,132 | NewContractAgentAction.java |
| 08/06/2009 06:20p | 5,384 | PrepareSubmitAction.java |
| 08/01/2009 08:46p | 1,556 | UpdateOfferNameAction.java |
| 09/20/2009 10:59a | 3,502 | package.properties |
| | | Directory of d:\src\com\redcs\contract\data |
| 09/04/2009 09:53a | 91,854 | ContractSQL.java |
| 08/01/2009 08:46p | 616 | ContractSQLMain.java |
| 08/01/2009 08:46p | 990 | ContractSearchSQL.java |
| 08/03/2009 03:38p | 13,646 | ContractSubmissionSQL.java |
| 09/16/2009 03:23p | 35,042 | FormSQL.java |
| 08/01/2009 08:46p | 602 | FormSQLMain.java |
| 08/01/2009 08:46p | 8,548 | OfferAttachmentSQL.java |
| | | Directory of d:\src\com\redcs\contract\data\cache |
| 09/02/2009 09:30a | 561 | CacheExpiredException.java |
| 09/02/2009 09:30a | 5,756 | ContractCache.java |
| 09/02/2009 09:30a | 2,446 | ContractCacheContainer.java |
| | | Directory of d:\src\com\redcs\contract\data\map |
| 08/01/2009 08:46p | 1,032 | MapClientContractApproval.java |
| 08/01/2009 08:46p | 826 | MapContractAgentReviewDate.java |
| 08/01/2009 08:46p | 834 | MapContractClientReviewDate.java |
| 08/31/2009 08:45a | 1,891 | MapContractDataAgentName.java |
| 08/01/2009 08:46p | 1,737 | MapContractDataAgentNameId.java |
| 08/01/2009 08:46p | 1,895 | MapContractDataBoolean.java |
| 08/01/2009 08:46p | 1,901 | MapContractDataClientName.java |
| 08/01/2009 08:46p | 1,808 | MapContractDataClientNameId.java |
| 08/01/2009 08:46p | 2,012 | MapContractDataCurrency.java |
| 08/01/2009 08:46p | 2,243 | MapContractDataDate.java |
| 08/01/2009 08:46p | 1,795 | MapContractDataDouble.java |
| 08/01/2009 08:46p | 2,025 | MapContractDataLong.java |
| 08/01/2009 08:46p | 1,801 | MapContractDataText.java |
| 08/01/2009 08:46p | 1,828 | MapContractDataVarchar.java |
| 08/01/2009 08:46p | 998 | MapContractExpirationType.java |
| 09/16/2009 04:39p | 3,686 | MapContractMaster.java |
| 08/01/2009 08:46p | 1,188 | MapContractReopen.java |
| 08/01/2009 08:46p | 1,303 | MapContractSubmission.java |
| 08/01/2009 08:46p | 2,472 | MapContractSubmissionApproval.java |
| 08/01/2009 08:46p | 791 | MapFormAgentField.java |
| 08/01/2009 08:46p | 952 | MapFormBrokerageLink.java |
| 08/01/2009 08:46p | 2,022 | MapFormField.java |
| 08/01/2009 08:46p | 1,041 | MapFormFieldOption.java |
| 08/01/2009 08:46p | 926 | MapFormFieldType.java |
| 09/11/2009 12:42p | 1,787 | MapFormMaster.java |
| 08/30/2009 02:04p | 912 | MapFormMetaLink.java |
| 08/30/2009 02:04p | 978 | MapFormMetaMaster.java |
| 08/01/2009 08:46p | 970 | MapFormPage.java |
| 09/16/2009 11:21a | 1,816 | MapFormPageField.java |

-continued

| Creation | Size | Name |
|---|---|---|
| 08/01/2009 08:46p | 870 | MapFormSupplementalPage.java |
| 08/01/2009 08:46p | 929 | MapFormTypeMaster.java |
| 08/01/2009 08:46p | 1,110 | MapOfferAgent.java |
| 08/01/2009 08:46p | 1,376 | MapOfferAttachmentFile.java |
| 08/01/2009 08:46p | 3,361 | MapOfferAttachmentMaster.java |
| 08/01/2009 08:46p | 1,120 | MapOfferClient.java |
| 08/01/2009 08:46p | 2,773 | MapOfferMaster.java |
| | | Directory of d:\src\com\redcs\contract\data\query |
| 08/31/2009 08:45a | 48,540 | ContractSQLSelectQuery.java |
| 09/04/2009 09:53a | 37,106 | ContractSQLUpdateQuery.java |
| 08/01/2009 08:46p | 2,854 | ContractSearchSQLSelectQuery.java |
| 08/03/2009 03:38p | 3,752 | ContractSubmissionSQLSelectQuery.java |
| 08/01/2009 08:46p | 5,204 | ContractSubmissionSQLUpdateQuery.java |
| 09/08/2009 09:34a | 15,077 | FormSQLSelectQuery.java |
| 09/16/2009 03:22p | 18,436 | FormSQLUpdateQuery.java |
| 08/01/2009 08:46p | 8,482 | OfferAttachmentSQLSelectQuery.java |
| 08/01/2009 08:46p | 4,728 | OfferAttachmentSQLUpdateQuery.java |
| | | Directory of d:\src\com\redcs\contract\exception |
| 08/01/2009 08:46p | 517 | FormValidationException.java |
| 08/01/2009 08:46p | 529 | InvalidContractAgentException.java |
| 08/01/2009 08:46p | 166 | InvalidContractException.java |
| | | Directory of d:\src\com\redcs\contract\logic |
| 09/02/2009 09:30a | 7,306 | ContractAgentListLogic.java |
| 08/01/2009 08:46p | 8,727 | ContractAttachmentLogic.java |
| 09/02/2009 09:30a | 7,174 | ContractClientListLogic.java |
| 09/08/2009 10:27p | 35,065 | ContractFactory.java |
| 08/01/2009 08:46p | 5,105 | ContractHistoryLogic.java |
| 09/04/2009 09:53a | 62,690 | ContractLogic.java |
| 08/01/2009 08:46p | 10,887 | ContractOfferLogic.java |
| 08/01/2009 08:46p | 1,621 | ContractPaymentLogic.java |
| 09/20/2009 10:59a | 14,962 | ContractPrintLogic.java |
| 09/02/2009 09:30a | 8,343 | ContractReOpenLogic.java |
| 08/01/2009 08:46p | 1,014 | ContractSearchLogic.java |
| 09/02/2009 09:30a | 7,841 | ContractSignatureClientsLogic.java |
| 09/02/2009 09:30a | 19,140 | ContractSignatureLogic.java |
| 08/01/2009 08:46p | 14,220 | ContractWarningsLogic.java |
| 09/08/2009 09:11p | 1,551 | FormFactory.java |
| 08/11/2009 06:44p | 10,930 | FormLogic.java |
| 08/16/2009 12:21p | 11,274 | PrepareSubmitLogic.java |
| 08/01/2009 08:46p | 1,139 | SignatureHash.java |
| 09/18/2009 06:20p | 16,349 | SubmitContractLogic.java |
| | | Directory of d:\src\com\redcs\contract\logic\workflow |
| 08/01/2009 08:46p | 1,930 | AcceptContractTask.java |
| 08/01/2009 08:46p | 979 | ClearSubmitContractTask.java |
| 08/01/2009 08:46p | 1,165 | QueueEmailTask.java |
| 08/01/2009 08:46p | 778 | SendEmailTask.java |
| 08/01/2009 08:46p | 3,207 | SubmitContractTask.java |
| 08/01/2009 08:46p | 2,740 | UpdateContractAccessTask.java |
| 08/01/2009 08:46p | 3,078 | UpdateContractStatusTask.java |
| 08/01/2009 08:46p | 4,115 | UpdateOfferStatusTask.java |
| 09/02/2009 09:30a | 3,738 | WithdrawContractTask.java |
| 08/01/2009 08:46p | 382 | WorkflowExPlanTask.java |
| 08/01/2009 08:46p | 3,157 | WorkflowManager.java |
| | | Directory of d:\src\com\redcs\contract\main |
| 08/01/2009 08:46p | 3,046 | UpdateExpiredContractsMain.java |
| | | Directory of d:\src\com\redcs\contract\other |
| 08/01/2009 08:46p | 993 | BaseContractData.java |
| 08/01/2009 08:46p | 1,262 | ClientContractApproval.java |
| 08/01/2009 08:46p | 957 | ContractAgentReviewDate.java |
| 08/01/2009 08:46p | 599 | ContractClientReviewDate.java |
| 08/01/2009 08:46p | 4,395 | ContractDataAgentName.java |
| 08/01/2009 08:46p | 1,260 | ContractDataAgentNameId.java |
| 08/01/2009 08:46p | 3,315 | ContractDataBoolean.java |
| 08/01/2009 08:46p | 4,416 | ContractDataClientName.java |
| 08/01/2009 08:46p | 1,452 | ContractDataClientNameId.java |
| 09/03/2009 04:46p | 3,422 | ContractDataCurrency.java |
| 08/01/2009 08:46p | 4,460 | ContractDataDate.java |
| 08/01/2009 08:46p | 383 | ContractDataDateComparator.java |
| 08/01/2009 08:46p | 3,424 | ContractDataDouble.java |
| 08/01/2009 08:46p | 1,337 | ContractDataInterface.java |
| 08/01/2009 08:46p | 3,376 | ContractDataLong.java |

| Creation | Size | Name |
|---|---|---|
| 08/01/2009 08:46p | 2,953 | ContractDataText.java |
| 08/01/2009 08:46p | 3,302 | ContractDataVarchar.java |
| 08/01/2009 08:46p | 1,285 | ContractExpirationType.java |
| 09/04/2009 12:16p | 31,302 | ContractMaster.java |
| 08/01/2009 08:46p | 1,919 | ContractReopen.java |
| 08/01/2009 08:46p | 733 | ContractSession.java |
| 08/19/2009 10:56a | 2,281 | ContractSubmission.java |
| 08/19/2009 10:55a | 3,380 | ContractSubmissionApproval.java |
| 08/01/2009 08:46p | 1,211 | FormAgentField.java |
| 08/01/2009 08:46p | 1,069 | FormBrokerageLink.java |
| 08/01/2009 08:46p | 2,608 | FormField.java |
| 08/01/2009 08:46p | 905 | FormFieldError.java |
| 08/01/2009 08:46p | 1,355 | FormFieldOption.java |
| 08/01/2009 08:46p | 2,414 | FormFieldType.java |
| 09/11/2009 12:38p | 12,537 | FormMaster.java |
| 08/30/2009 02:04p | 1,029 | FormMetaLink.java |
| 08/30/2009 02:04p | 1,344 | FormMetaMaster.java |
| 08/30/2009 02:04p | 210 | FormMetaTypeMaster.java |
| 08/01/2009 08:46p | 5,144 | FormPage.java |
| 08/01/2009 08:46p | 335 | FormPageComparator.java |
| 09/16/2009 03:28p | 6,157 | FormPageField.java |
| 08/01/2009 08:46p | 1,359 | FormTypeMaster.java |
| 08/01/2009 08:46p | 170 | InvalidFormException.java |
| 08/01/2009 08:46p | 1,362 | OfferAgent.java |
| 08/01/2009 08:46p | 2,259 | OfferAttachmentFile.java |
| 08/01/2009 08:46p | 5,034 | OfferAttachmentMaster.java |
| 08/01/2009 08:46p | 1,370 | OfferClient.java |
| 08/01/2009 08:46p | 8,718 | OfferMaster.java |
| 08/01/2009 08:46p | 634 | PropertyMasterOfferDateComparator.java |
| 08/01/2009 08:46p | 1,660 | ValidationException.java |
| | | Directory of d:\src\com\redcs\contract\other\workflow |
| 08/01/2009 08:46p | 1,936 | Workflow.java |
| 08/01/2009 08:46p | 695 | WorkflowConstants.java |
| 08/01/2009 08:46p | 2,682 | WorkflowExPlan.java |
| 08/01/2009 08:46p | 1,243 | WorkflowRule.java |
| 08/01/2009 08:46p | 1,514 | WorkflowScenario.java |
| | | Directory of d:\src\com\redcs\contract\tags |
| 09/08/2009 09:34a | 5,175 | AgentTextboxTag.java |
| 09/15/2009 01:22p | 8,094 | BaseHtmlFormTag.java |
| 09/08/2009 09:34a | 2,616 | CheckboxTag.java |
| 09/30/2009 09:40a | 4,229 | ClientSignatureTag.java |
| 09/08/2009 09:34a | 5,271 | ClientTextboxTag.java |
| 09/08/2009 09:34a | 3,278 | DateTextboxTag.java |
| 08/01/2009 08:46p | 3,589 | PageIteratorTag.java |
| 09/08/2009 09:34a | 3,535 | RadioButtonTag.java |
| 09/04/2009 09:53a | 1,330 | StaticTextTag.java |
| 09/16/2009 06:01p | 3,644 | TextareaTag.java |
| 09/16/2009 06:01p | 3,303 | TextboxTag.java |
| 09/08/2009 09:34a | 3,232 | TimeTextboxTag.java |
| 08/01/2009 08:46p | 2,723 | ValueIteratorTag.java |
| 08/01/2009 08:46p | 1,035 | WriteEnteredDateTag.java |
| 08/01/2009 08:46p | 2,912 | WriteValueTag.java |
| | | Directory of d:\src\com\redcs\email\data |
| 08/01/2009 08:46p | 8,115 | EmailSQL.java |
| 08/01/2009 08:46p | 604 | EmailSQLMain.java |
| | | Directory of d:\src\com\redcs\email\data\map |
| 08/01/2009 08:46p | 1,026 | MapEmailInhibitLog.java |
| 08/01/2009 08:46p | 1,280 | MapEmailLog.java |
| 08/01/2009 08:46p | 939 | MapEmailStatusMaster.java |
| | | Directory of d:\src\com\redcs\email\data\query |
| 08/01/2009 08:46p | 2,931 | EmailSQLSelectQuery.java |
| 08/01/2009 08:46p | 4,590 | EmailSQLUpdateQuery.java |
| | | Directory of d:\src\com\redcs\email\logic |
| 08/01/2009 08:46p | 2,680 | AcceptContractByAgentToClientEmail.java |
| 08/01/2009 08:46p | 2,460 | AcceptContractByClientToAgentEmail.java |
| 08/01/2009 08:46p | 2,679 | AcceptContractByClientToClientEmail.java |
| 08/01/2009 08:46p | 1,802 | BaseEmailThread.java |
| 08/01/2009 08:46p | 2,364 | BypassContractClientsByAgentEmail.java |
| 08/01/2009 08:46p | 9,679 | EmailLogic.java |
| 08/01/2009 08:46p | 1,598 | ExceptionEmail.java |
| 08/01/2009 08:46p | 1,824 | FeedbackEmail.java |

-continued

| Creation | Size | Name |
|---|---|---|
| 08/01/2009 08:46p | 1,940 | LoginEmail.java |
| 08/01/2009 08:46p | 1,642 | NewAgentEmail.java |
| 08/01/2009 08:46p | 1,855 | NewAgentPropertyEmail.java |
| 08/01/2009 08:46p | 2,047 | NewClientEmail.java |
| 08/01/2009 08:46p | 1,841 | NewPropertyEmail.java |
| 08/01/2009 08:46p | 2,415 | ReOpenContractCompleteEmail.java |
| 08/01/2009 08:46p | 2,735 | ReOpenContractEmail.java |
| 08/01/2009 08:46p | 1,518 | RetrieveClientPasswordEmail.java |
| 08/01/2009 08:46p | 1,454 | RetrievePasswordEmail.java |
| 08/01/2009 08:46p | 1,454 | RetrieveUsernameEmail.java |
| 08/01/2009 08:46p | 2,429 | SubmitContractByAgentToAgentEmail.java |
| 09/18/2009 06:20p | 2,738 | SubmitContractByAgentToClientEmail.java |
| 08/01/2009 08:46p | 2,365 | SubmitContractByClientToAgentEmail.java |
| 09/08/2009 09:34a | 4,953 | TextLogic.java |
| 08/01/2009 08:46p | 1,985 | UpdateAgentMasterEmail.java |
| 08/01/2009 08:46p | 1,580 | UpdateUserProfileEmail.java |
| 08/01/2009 08:46p | 2,392 | WithdrawContractEmail.java |
| | | Directory of d:\src\com\redcs\email\main |
| 08/01/2009 08:46p | 15,558 | SendSampleEmailMain.java |
| | | Directory of d:\src\com\redcs\email\other |
| 08/01/2009 08:46p | 1,274 | EmailInhibitLog.java |
| 08/01/2009 08:46p | 2,179 | EmailLog.java |
| 08/01/2009 08:46p | 608 | EmailMessageSource.java |
| 08/01/2009 08:46p | 206 | EmailPropertyInterface.java |
| 08/01/2009 08:46p | 1,175 | EmailStatusMaster.java |
| 08/01/2009 08:46p | 933 | EmailStringHolder.java |
| 08/01/2009 08:46p | 2,182 | EmailTemplateMaster.java |
| 08/01/2009 08:46p | 196 | PropertyInterface.java |
| | | Directory of d:\src\com\redcs\foundation\action |
| 08/01/2009 08:46p | 1,130 | AgentAction.java |
| 08/01/2009 08:46p | 2,760 | AgentListAction.java |
| 09/14/2009 11:05a | 2,744 | BrokerageListAction.java |
| 09/18/2009 06:20p | 9,260 | ClientAction.java |
| 08/01/2009 08:46p | 3,734 | ClientAction-Client_Save-validation.xml |
| 09/24/2009 10:35a | 2,070 | ClientListAction.java |
| 08/01/2009 08:46p | 4,042 | ClientNotesAction.java |
| 08/01/2009 08:46p | 958 | ClientNotesAction-ClientNotes_Save-validation.xml |
| 08/01/2009 08:46p | 2,198 | ClientOffersAction.java |
| 08/01/2009 08:46p | 1,957 | ContactUsAction.java |
| 08/01/2009 08:46p | 4,764 | MyPropertyListAction.java |
| 08/01/2009 08:46p | 2,943 | NewPropertyAction-NewProperty_Save-validation.xml |
| 08/01/2009 08:46p | 1,649 | OfficeListAction.java |
| 08/01/2009 08:46p | 299 | PopupHelpAction.java |
| 08/01/2009 08:46p | 8,425 | PropertyAction.java |
| 08/01/2009 08:46p | 3,837 | PropertyAction-Property_Save-validation.xml |
| 08/01/2009 08:46p | 3,489 | PropertyAgentListAction.java |
| 08/01/2009 08:46p | 610 | PropertyAgentListAction-PropertyAgentList_Add-validation.xml |
| 08/01/2009 08:46p | 2,988 | PropertyClientListAction.java |
| 08/01/2009 08:46p | 5,210 | PropertyListAction.java |
| 08/01/2009 08:46p | 1,257 | PropertyOfferListAction.java |
| 08/01/2009 08:46p | 1,888 | StatusAction.java |
| 08/01/2009 08:46p | 1,747 | UnsubscribeAction.java |
| 08/01/2009 08:46p | 1,241 | package.properties |
| | | Directory of d:\src\com\redcs\foundation\data |
| 08/01/2009 08:46p | 4,745 | AdSQL.java |
| 09/14/2009 05:54p | 22,526 | AgentSQL.java |
| 08/16/2009 01:55p | 860 | AgentSQLMain.java |
| 08/01/2009 08:46p | 8,168 | AttachmentSQL.java |
| 08/16/2009 12:21p | 23,517 | ClientSQL.java |
| 08/01/2009 08:46p | 612 | ClientSQLMain.java |
| 08/01/2009 08:46p | 3,261 | CodeCache.java |
| 08/01/2009 08:46p | 17,164 | CodesSQL.java |
| 08/01/2009 08:46p | 5,120 | ContactUsSQL.java |
| 08/01/2009 08:46p | 5,441 | ContractApprovalSQL.java |
| 08/03/2009 08:51a | 15,397 | FormDefaultSQL.java |
| 09/18/2009 09:16a | 11,426 | FoundationSQL.java |
| 08/16/2009 01:55p | 798 | FoundationSQLMain.java |
| 08/01/2009 08:46p | 17,148 | HelpSQL.java |
| 08/01/2009 08:46p | 21,266 | OfficeSQL.java |
| 08/16/2009 01:55p | 786 | OfficeSQLMain.java |
| 08/23/2009 01:12p | 16,075 | PropertySQL.java |
| 08/23/2009 01:12p | 862 | PropertySQLMain.java |

-continued

| Creation | Size | Name |
|---|---|---|
| 08/01/2009 08:46p | 10,980 | TipSQL.java |
| 08/01/2009 08:46p | 5,999 | UnsubscribeSQL.java |
| 08/01/2009 08:46p | 627 | UnsubscribeSQLMain.java |
| | | Directory of d:\src\com\redcs\foundation\data\map |
| 08/01/2009 08:46p | 1,155 | MapAdMaster.java |
| 08/01/2009 08:46p | 910 | MapAdTypeMaster.java |
| 08/01/2009 08:46p | 875 | MapAgentEmailMaster.java |
| 08/21/2009 01:31p | 3,127 | MapAgentMaster.java |
| 08/01/2009 08:46p | 920 | MapAgentPhoneMaster.java |
| 08/01/2009 08:46p | 876 | MapAgentWebsiteMaster.java |
| 08/01/2009 08:46p | 1,557 | MapBrokerage.java |
| 09/14/2009 11:05a | 1,416 | MapBrokerageRequest.java |
| 08/16/2009 12:21p | 1,291 | MapClientCredentials.java |
| 08/01/2009 08:46p | 2,545 | MapClientMaster.java |
| 08/01/2009 08:46p | 975 | MapClientNote.java |
| 08/01/2009 08:46p | 932 | MapClientNotice.java |
| 08/01/2009 08:46p | 938 | MapClientNoticeType.java |
| 08/01/2009 08:46p | 1,122 | MapContactUsMaster.java |
| 08/01/2009 08:46p | 997 | MapContactUsType.java |
| 08/01/2009 08:46p | 995 | MapContractApprovalStatus.java |
| 08/01/2009 08:46p | 979 | MapContractApproverType.java |
| 08/01/2009 08:46p | 1,127 | MapEmailUnsubscribeMaster.java |
| 08/01/2009 08:46p | 1,020 | MapEmailUnsubscribeTypeMaster.java |
| 08/01/2009 08:46p | 1,202 | MapFileLocationMaster.java |
| 08/01/2009 08:46p | 952 | MapFileStatusMaster.java |
| 08/01/2009 08:46p | 1,053 | MapFileTypeMaster.java |
| 08/01/2009 08:46p | 1,053 | MapFormAgentDefault.java |
| 08/01/2009 08:46p | 1,059 | MapFormClientDefault.java |
| 08/01/2009 08:46p | 1,476 | MapFormFieldFormDefault.java |
| 08/01/2009 08:46p | 1,167 | MapFormFieldTableDefault.java |
| 08/01/2009 08:46p | 1,140 | MapPropertyAgent.java |
| 08/01/2009 08:46p | 1,148 | MapPropertyClient.java |
| 08/01/2009 08:46p | 1,802 | MapPropertyMaster.java |
| 08/01/2009 08:46p | 758 | MapPropertyStatusMaster.java |
| 09/13/2009 12:31p | 945 | MapZipcodeMaster.java |
| | | Directory of d:\src\com\redcs\foundation\data\query |
| 08/01/2009 08:46p | 1,651 | AdSqlSelectQuery.java |
| 08/01/2009 08:46p | 2,784 | AdSqlUpdateQuery.java |
| 09/14/2009 05:53p | 21,973 | AgentSQLSelectQuery.java |
| 08/21/2009 12:52p | 10,114 | AgentSQLUpdateQuery.java |
| 08/01/2009 08:46p | 2,996 | AttachmentSQLSelectQuery.java |
| 08/01/2009 08:46p | 4,204 | AttachmentSQLUpdateQuery.java |
| 08/02/2009 04:46p | 15,128 | ClientSQLSelectQuery.java |
| 08/16/2009 12:21p | 12,293 | ClientSQLUpdateQuery.java |
| 08/01/2009 08:46p | 1,809 | ContactUsSQLSelectQuery.java |
| 08/01/2009 08:46p | 2,916 | ContactUsSQLUpdateQuery.java |
| 08/01/2009 08:46p | 2,113 | ContractApprovalSQLSelectQuery.java |
| 08/01/2009 08:46p | 2,630 | ContractApprovalSQLUpdateQuery.java |
| 08/03/2009 08:51a | 11,067 | FormDefaultSQLSelectQuery.java |
| 08/01/2009 08:46p | 5,954 | FormDefaultSQLUpdateQuery.java |
| 09/14/2009 11:05a | 5,285 | FoundationSQLSelectQuery.java |
| 09/14/2009 11:05a | 8,651 | FoundationSQLUpdateQuery.java |
| 08/01/2009 08:46p | 10,661 | PropertySQLSelectQuery.java |
| 08/23/2009 01:12p | 6,157 | PropertySQLUpdateQuery.java |
| 08/01/2009 08:46p | 2,483 | UnsubscribeSQLSelectQuery.java |
| 08/01/2009 08:46p | 2,955 | UnsubscribeSQLUpdateQuery.java |
| | | Directory of d:\src\com\redcs\foundation\exception |
| 08/01/2009 08:46p | 110 | InsufficientRightsException.java |
| 08/01/2009 08:46p | 103 | InvalidNameException.java |
| 08/01/2009 08:46p | 98 | UnpaidException.java |
| | | Directory of d:\src\com\redcs\foundation\logic |
| 08/01/2009 08:46p | 2,078 | AgentListLogic.java |
| 08/01/2009 08:46p | 2,662 | AgentLogic.java |
| 08/01/2009 08:46p | 1,454 | AgentTitleLogic.java |
| 09/14/2009 11:05a | 3,488 | BrokerageLogic.java |
| 09/24/2009 10:35a | 4,169 | ClientListLogic.java |
| 08/17/2009 09:45a | 9,139 | ClientLogic.java |
| 08/01/2009 08:46p | 1,148 | ContactUsLogic.java |
| 08/01/2009 08:46p | 955 | HelpLogic.java |
| 08/01/2009 08:46p | 2,205 | OfficeMasterLogic.java |
| 08/01/2009 08:46p | 1,459 | PhoneTypeLogic.java |
| 08/01/2009 08:46p | 2,744 | PropertyAgentLogic.java |
| 08/01/2009 08:46p | 2,353 | PropertyClientLogic.java |

| Creation | Size | Name |
|---|---|---|
| 08/01/2009 08:46p | 5,024 | PropertyMasterLogic.java |
| 08/01/2009 08:46p | 1,669 | PropertyOfferLogic.java |
| 08/01/2009 08:46p | 1,619 | PropertyStatusMasterLogic.java |
| 08/01/2009 08:46p | 632 | StatusLogic.java |
| 08/01/2009 08:46p | 1,524 | TipCache.java |
| 08/01/2009 08:46p | 5,195 | UnsubscribeLogic.java |
| | | Directory of d:\src\com\redcs\foundation\other |
| 08/01/2009 08:46p | 1,772 | AdMaster.java |
| 08/01/2009 08:46p | 1,107 | AdTypeMaster.java |
| 08/01/2009 08:46p | 1,622 | AgentEmailMaster.java |
| 09/14/2009 05:23p | 8,210 | AgentMaster.java |
| 09/14/2009 06:11p | 556 | AgentMasterSourceComparator.java |
| 09/14/2009 05:45p | 621 | AgentMasterSourceWrap.java |
| 08/01/2009 08:46p | 2,225 | AgentPhoneMaster.java |
| 08/01/2009 08:46p | 1,132 | AgentStatus.java |
| 08/01/2009 08:46p | 1,034 | AgentTitleMaster.java |
| 08/01/2009 08:46p | 1,184 | AgentTypeMaster.java |
| 08/01/2009 08:46p | 1,598 | AgentWebsiteMaster.java |
| 09/13/2009 12:31p | 4,476 | BrokerageMaster.java |
| 08/01/2009 08:46p | 2,425 | BrokerageRequest.java |
| 08/16/2009 12:21p | 2,780 | ClientCredentials.java |
| 08/05/2009 12:54p | 8,323 | ClientMaster.java |
| 08/01/2009 08:46p | 1,201 | ClientNote.java |
| 08/01/2009 08:46p | 1,069 | ClientNotice.java |
| 08/01/2009 08:46p | 1,157 | ClientNoticeType.java |
| 08/01/2009 08:46p | 311 | ClientStatusMaster.java |
| 08/01/2009 08:46p | 1,585 | ContactUsMaster.java |
| 08/01/2009 08:46p | 1,259 | ContactUsType.java |
| 08/01/2009 08:46p | 1,031 | ContractAgentType.java |
| 08/01/2009 08:46p | 1,321 | ContractApprovalStatus.java |
| 08/01/2009 08:46p | 1,168 | ContractApproverType.java |
| 08/01/2009 08:46p | 799 | ContractStatusMaster.java |
| 08/01/2009 08:46p | 166 | ContractWithdrawType.java |
| 08/01/2009 08:46p | 1,498 | EmailUnsubscribeMaster.java |
| 08/01/2009 08:46p | 1,263 | EmailUnsubscribeTypeMaster.java |
| 08/01/2009 08:46p | 1,773 | FileLocationMaster.java |
| 08/01/2009 08:46p | 1,209 | FileStatusMaster.java |
| 08/01/2009 08:46p | 1,397 | FileTypeMaster.java |
| 08/01/2009 08:46p | 1,357 | FormAgentDefault.java |
| 08/01/2009 08:46p | 1,358 | FormClientDefault.java |
| 08/01/2009 08:46p | 2,213 | FormFieldFormDefault.java |
| 08/01/2009 08:46p | 1,620 | FormFieldTableDefault.java |
| 08/01/2009 08:46p | 1,079 | HelpCategory.java |
| 08/01/2009 08:46p | 1,972 | HelpText.java |
| 08/01/2009 08:46p | 1,196 | HelpTopic.java |
| 08/01/2009 08:46p | 1,108 | NamePrefixMaster.java |
| 08/01/2009 08:46p | 958 | NameRange.java |
| 08/01/2009 08:46p | 1,108 | NameSuffixMaster.java |
| 08/01/2009 08:46p | 1,236 | OfferPaymentStatusMaster.java |
| 08/01/2009 08:46p | 422 | OfferStatusMaster.java |
| 08/01/2009 08:46p | 1,051 | OfficeAgent.java |
| 08/01/2009 08:46p | 1,188 | OfficeManagerLink.java |
| 08/27/2009 01:03p | 1,168 | OfficeManagerRole.java |
| 08/01/2009 08:46p | 3,323 | OfficeMaster.java |
| 08/01/2009 08:46p | 1,189 | PhoneTypeMaster.java |
| 08/01/2009 08:46p | 1,387 | PropertyAgent.java |
| 08/01/2009 08:46p | 1,396 | PropertyClient.java |
| 08/01/2009 08:46p | 5,668 | PropertyMaster.java |
| 08/01/2009 08:46p | 1,456 | PropertyStatusMaster.java |
| 08/01/2009 08:46p | 1,479 | TipText.java |
| 08/01/2009 08:46p | 1,195 | TipTopic.java |
| 08/02/2009 01:04p | 1,223 | WorkflowTypeMaster.java |
| 09/13/2009 12:31p | 1,075 | ZipcodeMaster.java |
| | | Directory of d:\src\com\redcs\foundation\tags |
| 08/01/2009 08:46p | 714 | TipTag.java |
| 08/01/2009 08:46p | 597 | TipTextTag.java |
| 08/01/2009 08:46p | 599 | TipTitleTag.java |
| | | Directory of d:\src\com\redcs\logging\action |
| 08/01/2009 08:46p | 2,012 | ErrorReportAction.java |
| 08/01/2009 08:46p | 4,478 | ExceptionAction.java |
| 08/01/2009 08:46p | 961 | FeedbackAction.java |

-continued

| Creation | Size | Name |
|---|---|---|
| | | Directory of d:\src\com\redcs\logging\data |
| 08/01/2009 08:46p | 5,369 | ExceptionSQL.java |
| 08/01/2009 08:46p | 4,090 | RequestSQL.java |
| | | Directory of d:\src\com\redcs\logging\data\map |
| 08/01/2009 08:46p | 1,358 | MapExceptionLog.java |
| 08/01/2009 08:46p | 1,134 | MapRequestLog.java |
| | | Directory of d:\src\com\redcs\logging\data\query |
| 08/01/2009 08:46p | 1,059 | ExceptionSQLSelectQuery.java |
| 08/01/2009 08:46p | 3,333 | ExceptionSQLUpdateQuery.java |
| 08/01/2009 08:46p | 1,225 | RequestSQLSelectQuery.java |
| 08/01/2009 08:46p | 1,984 | RequestSQLUpdateQuery.java |
| | | Directory of d:\src\com\redcs\logging\interceptor |
| 08/01/2009 08:46p | 497 | ExceptionInterceptor.java |
| 08/01/2009 08:46p | 2,493 | LogRequestInterceptor.java |
| | | Directory of d:\src\com\redcs\logging\logic |
| 08/01/2009 08:46p | 1,482 | ExceptionLogger.java |
| 08/01/2009 08:46p | 945 | FeedbackLogic.java |
| 08/01/2009 08:46p | 651 | RequestLogger.java |
| | | Directory of d:\src\com\redcs\logging\other |
| 08/01/2009 08:46p | 768 | ExceptionBean.java |
| 08/01/2009 08:46p | 2,349 | ExceptionLog.java |
| 08/01/2009 08:46p | 940 | FeedbackBean.java |
| 08/01/2009 08:46p | 1,008 | MLSCLogger.java |
| 08/01/2009 08:46p | 1,700 | RequestLog.java |
| | | Directory of d:\src\com\redcs\migration\main |
| 08/04/2009 06:54p | 2,339 | AgentsToExcel.java |
| 08/11/2009 02:32p | 4,648 | CleanedAgentInfoExcelConversionMain.java |
| 08/05/2009 05:49p | 2,639 | GetAgencyList.java |
| 08/11/2009 02:32p | 1,866 | KYAgentInfoCleanerMain.java |
| 08/05/2009 05:49p | 1,484 | KYAgentsMain.java |
| 08/11/2009 02:32p | 1,541 | KYExcelRealtorMatcherMain.java |
| 08/17/2009 10:22a | 7,665 | LoadAgentsMain.java |
| 08/11/2009 02:32p | 2,304 | LoadKYAgentInfoMain.java |
| 08/01/2009 08:46p | 7,656 | NKYExcelConversionMain.java |
| 08/01/2009 08:46p | 1,587 | ParseKYAgentsMain.java |
| 08/05/2009 05:49p | 1,930 | ProfileIntoURLGrabberMain.java |
| | | Directory of d:\src\com\redcs\officeManager\action |
| 08/27/2009 01:23p | 870 | ManagerControlAgentAction.java |
| 08/27/2009 02:32p | 374 | ManagerHomeAction.java |
| | | Directory of d:\src\com\redcs\officeManager\interceptor |
| 08/27/2009 01:20p | 828 | ManagerInterceptor.java |
| | | Directory of d:\src\com\redcs\officeManager\logic |
| 08/27/2009 02:31p | 4,568 | ManagerActionLogic.java |
| | | Directory of d:\src\com\redcs\payment\data |
| 08/01/2009 08:46p | 8,431 | PaymentSQL.java |
| | | Directory of d:\src\com\redcs\payment\data\map |
| 08/01/2009 08:46p | 1,460 | MapPaymentMaster.java |
| 08/01/2009 08:46p | 968 | MapPaymentMethodMaster.java |
| 08/01/2009 08:46p | 952 | MapPaymentTypeMaster.java |
| | | Directory of d:\src\com\redcs\payment\data\query |
| 08/01/2009 08:46p | 2,726 | PaymentSQLSelectQuery.java |
| 08/01/2009 08:46p | 5,244 | PaymentSQLUpdateQuery.java |
| | | Directory of d:\src\com\redcs\payment\logic |
| 08/01/2009 08:46p | 6,270 | BasePaymentLogic.java |
| | | Directory of d:\src\com\redcs\payment\other |
| 08/01/2009 08:46p | 2,967 | PaymentMaster.java |
| 08/01/2009 08:46p | 1,194 | PaymentMethodMaster.java |
| 08/01/2009 08:46p | 1,274 | PaymentStatusMaster.java |
| 08/01/2009 08:46p | 1,167 | PaymentTypeMaster.java |

-continued

| Creation | Size | Name |
|---|---|---|
| | | Directory of d:\src\com\redcs\verification\action |
| 08/01/2009 08:46p | 867 | VerifyAction.java |
| 08/01/2009 08:46p | 847 | VerifyCodeAction.java |
| 08/01/2009 08:46p | 296 | package.properties |
| | | Directory of d:\src\com\redcs\verification\logic |
| 08/01/2009 08:46p | 5,896 | VerificationLogic.java |
| | | Directory of d:\src\com\redcs\verification\other |
| 08/01/2009 08:46p | 413 | VerificationException.java |
| | | Directory of d:\src\contract\contracts\PDF Template |
| 09/24/2009 10:35a | 26,594 | Page_01.jrxml |
| | | Directory of d:\src\contract\contracts\Practice_form |
| 10/02/2009 10:45a | 28,803 | Practice_Form.jasper |
| 10/02/2009 10:45a | 16,485 | Practice_Form.jrxml |
| 10/02/2009 10:45a | 67,402 | Practice_Form.pdf |
| | | Directory of d:\src\contract\contracts\kentucky\Lexington_Board\Addendum |
| 09/01/2009 06:37p | 31,947 | Page_01.jasper |
| 09/01/2009 06:37p | 19,044 | Page_01.jrxml |
| | | Directory of d:\src\contract\contracts\kentucky\Lexington_Board\Addendum_To_Offer_To_Purchase |
| 08/28/2009 09:08a | 50,388 | Page_01.jasper |
| 08/28/2009 09:08a | 36,904 | Page_01.jrxml |
| | | Directory of d:\src\contract\contracts\kentucky\Lexington_Board\Additional_Work_Authorization |
| 10/02/2009 10:45a | 41,279 | Page_01.jasper |
| 10/02/2009 10:45a | 31,817 | Page_01.jrxml |
| | | Directory of d:\src\contract\contracts\kentucky\Lexington_Board\Advertising_Disclosure |
| 08/17/2009 09:39a | 24,106 | Page_01.jasper |
| 08/17/2009 09:39a | 11,238 | Page_01.jrxml |
| | | Directory of d:\src\contract\contracts\kentucky\Lexington_Board\Arbitrate_Request_Agreement |
| 09/28/2009 12:41p | 25,947 | Page_01.jasper |
| 09/28/2009 12:41p | 15,372 | Page_01.jrxml |
| | | Directory of d:\src\contract\contracts\kentucky\Lexington_Board\Business_Input_Sheet |
| 09/30/2009 09:31a | 119,590 | Business_Input_sheet_01.jasper |
| 09/30/2009 09:31a | 89,969 | Business_Input_sheet_01.jrxml |
| | | Directory of d:\src\contract\contracts\kentucky\Lexington_Board\Buyer_Representation_Agreement |
| 09/28/2009 12:41p | 53,431 | Page_01.jasper |
| 09/28/2009 12:41p | 40,625 | Page_01.jrxml |
| | | Directory of d:\src\contract\contracts\kentucky\Lexington_Board\Commercial_Agreement_To_Lease |
| 09/30/2009 09:31a | 48,778 | Page_01.jasper |
| 09/30/2009 09:31a | 31,352 | Page_01.jrxml |
| 09/30/2009 09:31a | 40,210 | Page_02.jasper |
| 09/30/2009 09:31a | 28,059 | Page_02.jrxml |
| | | Directory of d:\src\contract\contracts\kentucky\Lexington_Board\Commercial_Exclusive_Right_To_Sell |
| 09/28/2009 12:41p | 55,107 | Page_01.jasper |
| 09/28/2009 12:41p | 39,777 | Page_01.jrxml |
| 09/28/2009 12:41p | 17,876 | Page_02.jasper |
| 09/28/2009 12:41p | 3,923 | Page_02.jrxml |
| | | Directory of d:\src\contract\contracts\kentucky\Lexington_Board\Commercial_Input_Sheet_07_08 |
| 09/03/2009 03:31p | 87,523 | Page_01.jasper |
| 09/03/2009 03:31p | 64,756 | Page_01.jrxml |
| 09/03/2009 03:31p | 234,498 | Page_02.jasper |
| 09/03/2009 03:31p | 150,837 | Page_02.jrxml |
| | | Directory of d:\src\contract\contracts\kentucky\Lexington_Board\Commercial_Land_Input_Sheet |
| 09/04/2009 05:17p | 174,973 | Page_01.jasper |
| 09/04/2009 05:17p | 126,267 | Page_01.jrxml |

-continued

| Creation | Size | Name |
|---|---|---|
| colspan=3 | Directory of d:\src\contract\contracts\kentucky\Lexington_Board\Commercial_Offer_To_Purchase | |
| 10/02/2009 10:45a | 37,612 | Page_01.jasper |
| 10/02/2009 10:45a | 24,101 | Page_01.jrxml |
| 10/02/2009 10:45a | 36,490 | Page_02.jasper |
| 10/02/2009 10:45a | 23,753 | Page_02.jrxml |
| 10/02/2009 10:45a | 41,410 | Page_03.jasper |
| 10/02/2009 10:45a | 28,862 | Page_03.jrxml |
| 10/02/2009 10:45a | 18,718 | Page_04.jasper |
| 10/02/2009 10:45a | 4,731 | Page_04.jrxml |
| colspan=3 | Directory of d:\src\contract\contracts\kentucky\Lexington_Board\Conditional_Land_Sale_Clause | |
| 10/02/2009 10:45a | 42,271 | Page_01.jasper |
| 10/02/2009 10:45a | 31,103 | Page_01.jrxml |
| colspan=3 | Directory of d:\src\contract\contracts\kentucky\Lexington_Board\Confidentiality_Agreement | |
| 09/24/2009 10:35a | 37,617 | Page_01.jasper |
| 09/24/2009 10:35a | 23,870 | Page_01.jrxml |
| colspan=3 | Directory of d:\src\contract\contracts\kentucky\Lexington_Board\Cooperation_Compensation_Agreement | |
| 09/28/2009 12:41p | 32,961 | Page_01.jasper |
| 09/28/2009 12:41p | 19,717 | Page_01.jrxml |
| colspan=3 | Directory of d:\src\contract\contracts\kentucky\Lexington_Board\Estimated_Seller_Proceeds | |
| 10/02/2009 10:45a | 68,224 | Page_01.jasper |
| 10/02/2009 10:45a | 62,749 | Page_01.jrxml |
| colspan=3 | Directory of d:\src\contract\contracts\kentucky\Lexington_Board\Exclusive_Right_To_Rent | |
| 09/28/2009 12:41p | 45,760 | Page_01.jasper |
| 09/28/2009 12:41p | 34,969 | Page_01.jrxml |
| colspan=3 | Directory of d:\src\contract\contracts\kentucky\Lexington_Board\Exclusive_Right_To_Sell | |
| 09/30/2009 09:31a | 39,095 | Page_01.jasper |
| 09/30/2009 09:31a | 29,305 | Page_01.jrxml |
| 09/30/2009 09:31a | 36,070 | Page_02.jasper |
| 09/30/2009 09:31a | 26,103 | Page_02.jrxml |
| colspan=3 | Directory of d:\src\contract\contracts\kentucky\Lexington_Board\Farm_Offer_Purchase_Check | |
| 10/02/2009 10:45a | 45,477 | Page_01.jasper |
| 10/02/2009 10:45a | 25,568 | Page_01.jrxml |
| colspan=3 | Directory of d:\src\contract\contracts\kentucky\Lexington_Board\Google_Base_Opt_Out | |
| 09/28/2009 12:41p | 23,179 | Page_01.jasper |
| 09/28/2009 12:41p | 11,366 | Page_01.jrxml |
| colspan=3 | Directory of d:\src\contract\contracts\kentucky\Lexington_Board\Inducements_Rebate_Disclosure\Buyer | |
| 08/27/2009 02:17p | 28,578 | Page_01.jasper |
| 08/27/2009 02:17p | 15,512 | Page_01.jrxml |
| colspan=3 | Directory of d:\src\contract\contracts\kentucky\Lexington_Board\Inducements_Rebate_Disclosure\Seller | |
| 09/01/2009 06:37p | 28,565 | Page_01.jasper |
| 09/01/2009 06:37p | 15,374 | Page_01.jrxml |
| colspan=3 | Directory of d:\src\contract\contracts\kentucky\Lexington_Board\Intent_To_Sell | |
| 09/28/2009 12:41p | 28,437 | Page_01.jasper |
| 09/28/2009 12:41p | 16,991 | Page_01.jrxml |
| colspan=3 | Directory of d:\src\contract\contracts\kentucky\Lexington_Board\Kickout_Right_Of_Refusal | |
| 10/02/2009 10:45a | 57,156 | Page_01.jasper |
| 10/02/2009 10:45a | 43,155 | Page_01.jrxml |
| colspan=3 | Directory of d:\src\contract\contracts\kentucky\Lexington_Board\Lead_Based_Paint_Acknowledgement | |
| 08/31/2009 05:00p | 52,670 | Page_01.jasper |
| 08/31/2009 05:00p | 38,691 | Page_01.jrxml |

-continued

| Creation | Size | Name |
|---|---|---|
| Directory of d:\src\contract\contracts\kentucky\Lexington_Board\Listing_Agent_Check | | |
| 09/30/2009 09:31a | 56,221 | Page_01.jasper |
| 09/30/2009 09:31a | 32,676 | Page_01.jrxml |
| 09/30/2009 09:31a | 54,340 | Page_02.jasper |
| 09/30/2009 09:31a | 34,746 | Page_02.jrxml |
| Directory of d:\src\contract\contracts\kentucky\Lexington_Board\Loan_Assumption_Addendum | | |
| 10/02/2009 10:45a | 40,866 | Page_01.jasper |
| 10/02/2009 10:45a | 25,008 | Page_01.jrxml |
| Directory of d:\src\contract\contracts\kentucky\Lexington_Board\MLS_Farm_Input_Sheet | | |
| 09/01/2009 06:37p | 117,385 | Page_01.jasper |
| 09/01/2009 06:37p | 96,798 | Page_01.jrxml |
| 09/03/2009 03:31p | 233,819 | Page_02.jasper |
| 09/03/2009 03:31p | 134,602 | Page_02.jrxml |
| Directory of d:\src\contract\contracts\kentucky\Lexington_Board\MLS_Multi_Housing_Input_Sheet | | |
| 09/08/2009 08:48p | 98,308 | Page_01.jasper |
| 09/08/2009 08:48p | 74,760 | Page_01.jrxml |
| 09/08/2009 08:48p | 172,798 | Page_02.jasper |
| 09/08/2009 08:48p | 107,071 | Page_02.jrxml |
| 09/08/2009 08:48p | 235,572 | Page_03.jasper |
| 09/08/2009 08:48p | 135,797 | Page_03.jrxml |
| Directory of d:\src\contract\contracts\kentucky\Lexington_Board\MLS_Rent_Input_Sheet | | |
| 09/03/2009 03:31p | 68,376 | Page_01.jasper |
| 09/03/2009 03:31p | 48,646 | Page_01.jrxml |
| 09/03/2009 03:31p | 441,395 | Page_02.jasper |
| 09/03/2009 03:31p | 274,307 | Page_02.jrxml |
| Directory of d:\src\contract\contracts\kentucky\Lexington_Board\MLS_Residential_Input_Sheet | | |
| 09/04/2009 09:53a | 104,433 | Page_01.jasper |
| 09/04/2009 09:53a | 81,924 | Page_01.jrxml |
| 09/03/2009 03:31p | 449,531 | Page_02.jasper |
| 09/03/2009 03:31p | 269,823 | Page_02.jrxml |
| Directory of d:\src\contract\contracts\kentucky\Lexington_Board\New_Construction_Offer_To_Purchase | | |
| 10/02/2009 10:45a | 58,901 | Page_01.jasper |
| 10/02/2009 10:45a | 47,250 | Page_01.jrxml |
| 10/02/2009 10:45a | 51,864 | Page_02.jasper |
| 10/02/2009 10:45a | 40,985 | Page_02.jrxml |
| 10/02/2009 10:45a | 41,825 | Page_03.jasper |
| 10/02/2009 10:45a | 33,012 | Page_03.jrxml |
| 10/02/2009 10:45a | 37,618 | Page_04.jasper |
| 10/02/2009 10:45a | 28,396 | Page_04.jrxml |
| 10/02/2009 10:45a | 50,030 | Page_05.jasper |
| 10/02/2009 10:45a | 43,196 | Page_05.jrxml |
| 10/02/2009 10:45a | 32,477 | Page_06.jasper |
| 10/02/2009 10:45a | 21,785 | Page_06.jrxml |
| 10/02/2009 10:45a | 47,215 | Page_07.jasper |
| 10/02/2009 10:45a | 37,844 | Page_07.jrxml |
| Directory of d:\src\contract\contracts\kentucky\Lexington_Board\Offer_To_Purchase | | |
| 09/30/2009 09:31a | 71,797 | Page_01.jasper |
| 09/30/2009 09:31a | 55,145 | Page_01.jrxml |
| 09/01/2009 06:37p | 39,050 | Page_02.jasper |
| 09/03/2009 03:31p | 26,337 | Page_02.jrxml |
| 09/01/2009 06:37p | 62,566 | Page_03.jasper |
| 09/01/2009 06:37p | 39,769 | Page_03.jrxml |
| 09/30/2009 09:31a | 35,925 | Page_04.jasper |
| 09/30/2009 09:31a | 26,390 | Page_04.jrxml |
| 09/01/2009 06:37p | 47,359 | Page_05.jasper |
| 09/01/2009 06:37p | 37,347 | Page_05.jrxml |
| Directory of d:\src\contract\contracts\kentucky\Lexington_Board\Post_Closing_Agreement | | |
| 09/28/2009 12:41p | 40,428 | Page_01.jasper |
| 09/28/2009 12:41p | 28,126 | Page_01.jrxml |

-continued

| Creation | Size | Name |
|---|---|---|
| | | Directory of d:\src\contract\contracts\kentucky\Lexington_Board\Pre_Closing_Agreement |
| 09/28/2009 12:41p | 44,446 | Page_01.jasper |
| 09/28/2009 12:41p | 31,933 | Page_01.jrxml |
| | | Directory of d:\src\contract\contracts\kentucky\Lexington_Board\Recommended_Contract_Phrases |
| 09/30/2009 09:31a | 47,787 | Contract_To_Purchase_01.jasper |
| 09/30/2009 09:31a | 39,445 | Contract_To_Purchase_01.jrxml |
| 09/30/2009 09:31a | 50,534 | Contract_To_Purchase_02.jasper |
| 09/30/2009 09:31a | 41,696 | Contract_To_Purchase_02.jrxml |
| 09/30/2009 09:31a | 38,553 | Contract_To_Purchase_03.jasper |
| 09/30/2009 09:31a | 27,044 | Contract_To_Purchase_03.jrxml |
| 09/30/2009 09:31a | 29,428 | Contract_To_Purchase_04.jasper |
| 09/30/2009 09:31a | 16,681 | Contract_To_Purchase_04.jrxml |
| | | Directory of d:\src\contract\contracts\kentucky\Lexington_Board\Referral_Office_Certification |
| 09/28/2009 12:41p | 25,837 | Page_01.jasper |
| 09/28/2009 12:41p | 12,772 | Page_01.jrxml |
| | | Directory of d:\src\contract\contracts\kentucky\Lexington_Board\Release_Agreement |
| 09/30/2009 09:31a | 35,283 | Page_01.jasper |
| 09/30/2009 09:31a | 22,043 | Page_01.jrxml |
| | | Directory of d:\src\contract\contracts\kentucky\Lexington_Board\Release_Contingency |
| 09/30/2009 09:31a | 31,422 | Page_01.jasper |
| 09/30/2009 09:31a | 18,859 | Page_01.jrxml |
| | | Directory of d:\src\contract\contracts\kentucky\Lexington_Board\Release_Of_Exclusive_Right_To_Sell |
| 08/27/2009 02:17p | 31,529 | Page_01.jasper |
| 08/27/2009 02:17p | 18,333 | Page_01.jrxml |
| | | Directory of d:\src\contract\contracts\kentucky\Lexington_Board\Release_Right_Of_Refusal |
| 10/02/2009 10:45a | 41,750 | Page_01.jasper |
| 10/02/2009 10:45a | 28,332 | Page_01.jrxml |
| | | Directory of d:\src\contract\contracts\kentucky\Lexington_Board\Rental_Lead_Based_Disclosure |
| 10/02/2009 10:45a | 50,811 | Page_01.jasper |
| 10/02/2009 10:45a | 36,913 | Page_01.jrxml |
| | | Directory of d:\src\contract\contracts\kentucky\Lexington_Board\Right_Of_Refusal |
| 10/02/2009 10:45a | 36,757 | Page_01.jasper |
| 10/02/2009 10:45a | 25,211 | Page_01.jrxml |
| | | Directory of d:\src\contract\contracts\kentucky\Lexington_Board\Right_To_Sell_Commission |
| 09/30/2009 09:31a | 32,952 | Page_01.jasper |
| 09/30/2009 09:31a | 21,567 | Page_01.jrxml |
| | | Directory of d:\src\contract\contracts\kentucky\Lexington_Board\Sanitary_Sewer_Info |
| 09/30/2009 09:31a | 45,993 | Page_01.jasper |
| 09/30/2009 09:31a | 24,937 | Page_01.jrxml |
| | | Directory of d:\src\contract\contracts\kentucky\Lexington_Board\Sellers_Mortgage_Info |
| 09/28/2009 12:41p | 43,656 | Page_01.jasper |
| 09/28/2009 12:41p | 28,925 | Page_01.jrxml |
| | | Directory of d:\src\contract\contracts\kentucky\Lexington_Board\Settlement_Statement |
| 10/02/2009 10:45a | 162,146 | Page_01.jasper |
| 10/02/2009 10:45a | 167,690 | Page_01.jrxml |
| 10/02/2009 10:45a | 178,452 | Page_02.jasper |
| 10/02/2009 10:45a | 183,329 | Page_02.jrxml |
| | | Directory of d:\src\contract\contracts\kentucky\Lexington_Board\Status_Change_Worksheet |
| 08/26/2009 08:57p | 80,293 | Page_01.jasper |
| 08/26/2009 08:57p | 48,808 | Page_01.jrxml |
| | | Directory of d:\src\contract\contracts\kentucky\Lexington_Board\Utilities_Info_Letter |
| 10/02/2009 10:45a | 31,633 | Page_01.jasper |
| 10/02/2009 10:45a | 21,113 | Page_01.jrxml |

-continued

| Creation | Size | Name |
|---|---|---|
| | | Directory of d:\src\contract\contracts\kentucky\Lexington_Board\Withdrawal_Of_Exclusive_Right_To_Sell |
| 09/01/2009 06:37p | 30,667 | Page_01.jasper |
| 09/01/2009 06:37p | 17,459 | Page_01.jrxml |
| | | Directory of d:\src\contract\contracts\kentucky\brokers\Cave_Run\Addendum |
| 09/30/2009 09:31a | 31,919 | Page_01.jasper |
| 09/30/2009 09:31a | 19,011 | Page_01.jrxml |
| | | Directory of d:\src\contract\contracts\kentucky\brokers\Cave_Run\Addendum_To_Offer_To_Purchase |
| 09/30/2009 09:31a | 50,355 | Page_01.jasper |
| 09/30/2009 09:31a | 36,871 | Page_01.jrxml |
| | | Directory of d:\src\contract\contracts\kentucky\brokers\Cave_Run\Advertising_Disclosure |
| 09/30/2009 09:31a | 24,084 | Page_01.jasper |
| 09/30/2009 09:31a | 11,216 | Page_01.jrxml |
| | | Directory of d:\src\contract\contracts\kentucky\brokers\Cave_Run\Business_Input_Sheet |
| 09/30/2009 09:31a | 119,569 | Business_Input_sheet_01.jasper |
| 09/30/2009 09:31a | 89,940 | Business_Input_sheet_01.jrxml |
| | | Directory of d:\src\contract\contracts\kentucky\brokers\Cave_Run\Buyer_Consumer_Guide_To_Agency_Relationships |
| 09/08/2009 08:48p | 22,237 | Page_01.jasper |
| 09/08/2009 08:48p | 9,000 | Page_01.jrxml |
| 09/08/2009 08:48p | 22,318 | Page_02.jasper |
| 09/08/2009 08:48p | 10,286 | Page_02.jrxml |
| 09/08/2009 08:48p | 22,511 | Page_03.jasper |
| 09/08/2009 08:48p | 10,313 | Page_03.jrxml |
| | | Directory of d:\src\contract\contracts\kentucky\brokers\Cave_Run\Commercial_Input_Sheet_07_08 |
| 09/30/2009 09:31a | 87,511 | Page_01.jasper |
| 09/30/2009 09:31a | 64,744 | Page_01.jrxml |
| 09/30/2009 09:31a | 234,487 | Page_02.jasper |
| 09/30/2009 09:31a | 150,826 | Page_02.jrxml |
| | | Directory of d:\src\contract\contracts\kentucky\brokers\Cave_Run\Commercial_Land_Input_Sheet |
| 09/30/2009 09:31a | 174,964 | Page_01.jasper |
| 09/30/2009 09:31a | 126,244 | Page_01.jrxml |
| | | Directory of d:\src\contract\contracts\kentucky\brokers\Cave_Run\Conditional_Land_Sale_Clause |
| 10/02/2009 10:45a | 41,976 | Page_01.jasper |
| 10/02/2009 10:45a | 30,747 | Page_01.jrxml |
| | | Directory of d:\src\contract\contracts\kentucky\brokers\Cave_Run\Exclusive_Right_To_Sell |
| 09/17/2009 07:29p | 39,095 | Page_01.jasper |
| 09/17/2009 07:29p | 29,305 | Page_01.jrxml |
| 09/17/2009 07:29p | 35,992 | Page_02.jasper |
| 09/17/2009 07:29p | 25,997 | Page_02.jrxml |
| | | Directory of d:\src\contract\contracts\kentucky\brokers\Cave_Run\Inducements_Rebate_Disclosure\Buyer |
| 09/30/2009 09:31a | 28,556 | Page_01.jasper |
| 09/30/2009 09:31a | 15,490 | Page_01.jrxml |
| | | Directory of d:\src\contract\contracts\kentucky\brokers\Cave_Run\Inducements_Rebate_Disclosure\Seller |
| 09/30/2009 09:31a | 28,545 | Page_01.jasper |
| 09/30/2009 09:31a | 15,352 | Page_01.jrxml |
| | | Directory of d:\src\contract\contracts\kentucky\brokers\Cave_Run\Lead_Based_Paint_Acknowledgement |
| 09/30/2009 09:31a | 52,637 | Page_01.jasper |
| 09/30/2009 09:31a | 38,658 | Page_01.jrxml |

-continued

| Creation | Size | Name |
|---|---|---|
| | | Directory of d:\src\contract\contracts\kentucky\brokers\Cave_Run\Loan_Assumption_Addendum |
| 10/02/2009 10:45a | 40,557 | Page_01.jasper |
| 10/02/2009 10:45a | 24,661 | Page_01.jrxml |
| | | Directory of d:\src\contract\contracts\kentucky\brokers\Cave_Run\MLS_Farm_Input_Sheet |
| 09/30/2009 09:31a | 117,375 | Page_01.jasper |
| 09/30/2009 09:31a | 96,786 | Page_01.jrxml |
| 09/30/2009 09:31a | 233,806 | Page_02.jasper |
| 09/30/2009 09:31a | 134,591 | Page_02.jrxml |
| | | Directory of d:\src\contract\contracts\kentucky\brokers\Cave_Run\MLS_Multi_Housing_Input_Sheet |
| 09/30/2009 09:31a | 98,324 | Page_01.jasper |
| 09/30/2009 09:31a | 74,748 | Page_01.jrxml |
| 09/30/2009 09:31a | 172,798 | Page_02.jasper |
| 09/30/2009 09:31a | 107,071 | Page_02.jrxml |
| 09/30/2009 09:31a | 235,575 | Page_03.jasper |
| 09/30/2009 09:31a | 135,786 | Page_03.jrxml |
| | | Directory of d:\src\contract\contracts\kentucky\brokers\Cave_Run\MLS_Rent_Input_Sheet |
| 09/30/2009 09:31a | 68,364 | Page_01.jasper |
| 09/30/2009 09:31a | 48,634 | Page_01.jrxml |
| 09/30/2009 09:31a | 441,384 | Page_02.jasper |
| 09/30/2009 09:31a | 274,296 | Page_02.jrxml |
| | | Directory of d:\src\contract\contracts\kentucky\brokers\Cave_Run\MLS_Residential_Input_Sheet |
| 09/30/2009 09:31a | 104,561 | Page_01.jasper |
| 09/30/2009 09:31a | 81,912 | Page_01.jrxml |
| 09/30/2009 09:31a | 449,520 | Page_02.jasper |
| 09/30/2009 09:31a | 269,812 | Page_02.jrxml |
| | | Directory of d:\src\contract\contracts\kentucky\brokers\Cave_Run\Offer_To_Purchase |
| 09/17/2009 07:29p | 73,413 | Page_01.jasper |
| 09/17/2009 07:29p | 56,741 | Page_01.jrxml |
| 09/17/2009 07:29p | 39,050 | Page_02.jasper |
| 09/17/2009 07:29p | 26,337 | Page_02.jrxml |
| 09/17/2009 07:29p | 62,587 | Page_03.jasper |
| 09/17/2009 07:29p | 39,774 | Page_03.jrxml |
| 09/17/2009 07:29p | 36,038 | Page_04.jasper |
| 09/17/2009 07:29p | 26,503 | Page_04.jrxml |
| 09/17/2009 07:29p | 47,261 | Page_05.jasper |
| 09/17/2009 07:29p | 37,249 | Page_05.jrxml |
| | | Directory of d:\src\contract\contracts\kentucky\brokers\Cave_Run\Release_Of_Exclusive_Right_To_Sell |
| 09/30/2009 09:31a | 31,507 | Page_01.jasper |
| 09/30/2009 09:31a | 18,311 | Page_01.jrxml |
| | | Directory of d:\src\contract\contracts\kentucky\brokers\Cave_Run\Seller_Consumer_Guide_To_Agency_Relationships |
| 09/08/2009 08:48p | 22,235 | Page_01.jasper |
| 09/08/2009 08:48p | 9,000 | Page_01.jrxml |
| 09/08/2009 08:48p | 22,318 | Page_02.jasper |
| 09/08/2009 08:48p | 10,286 | Page_02.jrxml |
| 09/08/2009 08:48p | 22,535 | Page_03.jasper |
| 09/08/2009 08:48p | 10,325 | Page_03.jrxml |
| | | Directory of d:\src\contract\contracts\kentucky\brokers\Cave_Run\Status_Change_Worksheet |
| 09/30/2009 09:31a | 80,381 | Page_01.jasper |
| 09/30/2009 09:31a | 48,786 | Page_01.jrxml |
| | | Directory of d:\src\contract\contracts\kentucky\brokers\Cave_Run\Vacant_Land_Disclosure_Statement |
| 09/04/2009 12:31p | 106,796 | Page_01.jasper |
| 09/04/2009 12:31p | 73,159 | Page_01.jrxml |
| 09/08/2009 08:48p | 124,634 | Page_02.jasper |
| 09/08/2009 08:48p | 83,977 | Page_02.jrxml |
| 09/04/2009 05:17p | 23,037 | Page_03.jasper |
| 09/04/2009 05:17p | 10,091 | Page_03.jrxml |

-continued

| Creation | Size | Name |
|---|---|---|
| | | Directory of d:\src\contract\contracts\kentucky\brokers\Cave_Run\Withdrawal_Of_Exclusive_Right_To_Sell |
| 09/30/2009 09:31a | 30,645 | Page_01.jasper |
| 09/30/2009 09:31a | 17,437 | Page_01.jrxml |
| | | Directory of d:\src\contract\contracts\kentucky\nkar\Addendum_To_Exclusive_Right_To_Sell |
| 09/17/2009 07:29p | 32,186 | Addendum_To_Exclusive_Right_To_Sell_01.jasper |
| 09/17/2009 07:29p | 20,203 | Addendum_To_Exclusive_Right_To_Sell_01.jrxml |
| | | Directory of d:\src\contract\contracts\kentucky\nkar\Consumer_Guide_To_Agency_Relationships |
| 08/13/2009 03:51p | 21,797 | Consumer_Guide_To_Agency_Relationships_01.jasper |
| 08/13/2009 03:51p | 8,463 | Consumer_Guide_To_Agency_Relationships_01.jrxml |
| 08/13/2009 03:51p | 21,610 | Consumer_Guide_To_Agency_Relationships_02.jasper |
| 08/13/2009 03:51p | 9,500 | Consumer_Guide_To_Agency_Relationships_02.jrxml |
| 08/13/2009 03:51p | 22,748 | Consumer_Guide_To_Agency_Relationships_03.jasper |
| 08/13/2009 03:51p | 10,772 | Consumer_Guide_To_Agency_Relationships_03.jrxml |
| | | Directory of d:\src\contract\contracts\kentucky\nkar\Consumer_Guide_To_Dual_Agency_Relationships |
| 08/10/2009 08:43p | 22,100 | Consumer_Guide_To_Agency_Relationships_01.jasper |
| 08/10/2009 08:43p | 8,872 | Consumer_Guide_To_Agency_Relationships_01.jrxml |
| 08/10/2009 08:43p | 21,643 | Consumer_Guide_To_Agency_Relationships_02.jasper |
| 08/10/2009 08:43p | 9,494 | Consumer_Guide_To_Agency_Relationships_02.jrxml |
| 08/10/2009 08:43p | 19,939 | Consumer_Guide_To_Agency_Relationships_03.jasper |
| 08/10/2009 08:43p | 6,836 | Consumer_Guide_To_Agency_Relationships_03.jrxml |
| | | Directory of d:\src\contract\contracts\kentucky\nkar\Contract_To_Purchase |
| 08/19/2009 11:34a | 63,121 | Contract_To_Purchase_01.jasper |
| 08/19/2009 11:33a | 42,742 | Contract_To_Purchase_01.jrxml |
| 08/19/2009 11:34a | 42,324 | Contract_To_Purchase_02.jasper |
| 08/19/2009 11:33a | 28,630 | Contract_To_Purchase_02.jrxml |
| 08/15/2009 06:39p | 54,969 | Contract_To_Purchase_03.jasper |
| 08/15/2009 06:39p | 34,330 | Contract_To_Purchase_03.jrxml |
| 08/15/2009 06:39p | 47,988 | Contract_To_Purchase_04.jasper |
| 08/15/2009 06:39p | 33,939 | Contract_To_Purchase_04.jrxml |
| 08/17/2009 11:40a | 38,640 | Contract_To_Purchase_05.jasper |
| 08/17/2009 11:40a | 26,028 | Contract_To_Purchase_05.jrxml |
| 08/19/2009 11:34a | 39,770 | Contract_To_Purchase_06.jasper |
| 08/19/2009 11:33a | 29,886 | Contract_To_Purchase_06.jrxml |
| 08/14/2009 02:37p | 38,919 | Contract_To_Purchase_07.jasper |
| 08/14/2009 02:37p | 23,158 | Contract_To_Purchase_07.jrxml |
| | | Directory of d:\src\contract\contracts\kentucky\nkar\Contract_To_Purchase_Addendum |
| 09/30/2009 09:31a | 38,619 | Contract_To_Purchase_Addendum_01.jasper |
| 09/30/2009 09:31a | 25,547 | Contract_To_Purchase_Addendum_01.jrxml |
| | | Directory of d:\src\contract\contracts\kentucky\nkar\Contract_To_Purchase_Counter_Offer |
| 09/17/2009 07:29p | 51,329 | Page_01.jasper |
| 09/17/2009 07:29p | 37,051 | Page_01.jrxml |
| | | Directory of d:\src\contract\contracts\kentucky\nkar\Disclosure_Of_Property_Condition |
| 09/17/2009 07:29p | 80,799 | Disclosure_Of_Property_Condition_01.jasper |
| 09/17/2009 07:29p | 45,800 | Disclosure_Of_Property_Condition_01.jrxml |
| 09/17/2009 07:29p | 111,173 | Disclosure_Of_Property_Condition_02.jasper |
| 09/16/2009 08:13p | 62,200 | Disclosure_Of_Property_Condition_02.jrxml |
| 09/17/2009 07:29p | 101,466 | Disclosure_Of_Property_Condition_03.jasper |
| 09/17/2009 07:29p | 59,985 | Disclosure_Of_Property_Condition_03.jrxml |
| | | Directory of d:\src\contract\contracts\kentucky\nkar\Exclusive_Right_To_Sell |
| 09/18/2009 03:26p | 49,268 | Exclusive_Right_To_Sell_01.jasper |
| 09/17/2009 07:29p | 34,804 | Exclusive_Right_To_Sell_01.jrxml |
| 09/17/2009 07:29p | 50,100 | Exclusive_Right_To_Sell_02.jasper |
| 09/17/2009 07:29p | 33,226 | Exclusive_Right_To_Sell_02.jrxml |
| 09/17/2009 07:29p | 47,502 | Exclusive_Right_To_Sell_03.jasper |
| 09/17/2009 07:29p | 33,786 | Exclusive_Right_To_Sell_03.jrxml |
| 09/17/2009 07:29p | 36,853 | Exclusive_Right_To_Sell_04.jasper |
| 09/18/2009 03:26p | 25,653 | Exclusive_Right_To_Sell_04.jrxml |
| | | Directory of d:\src\contract\contracts\kentucky\nkar\Exclusive_Right_To_Sell_Withdrawl |
| 09/17/2009 07:29p | 32,289 | Exclusive_Right_To_Sell_Withdrawl_01.jasper |
| 09/17/2009 07:29p | 19,105 | Exclusive_Right_To_Sell_Withdrawl_01.jrxml |

-continued

| Creation | Size | Name |
|---|---|---|
| colspan="3" | Directory of d:\src\contract\contracts\kentucky\nkar\Explanation_Of_New_Agency_Forms | |
| 10/02/2009 10:45a | 20,450 | Page_01.jasper |
| 10/02/2009 10:45a | 6,488 | Page_01.jrxml |
| 10/02/2009 10:45a | 17,826 | Page_02.jasper |
| 10/02/2009 10:45a | 3,775 | Page_02.jrxml |
| colspan="3" | Directory of d:\src\contract\contracts\kentucky\nkar\Lead_Based_Paint_Disclosure | |
| 09/17/2009 07:29p | 50,831 | Lead_Based_Paint_Disclosure_01.jasper |
| 09/17/2009 07:29p | 35,661 | Lead_Based_Paint_Disclosure_01.jrxml |
| colspan="3" | Directory of d:\src\contract\contracts\kentucky\nkar\MLS_Residential_Worksheet | |
| 09/30/2009 09:31a | 135,812 | Page_01.jasper |
| 09/30/2009 09:31a | 110,817 | Page_01.jrxml |
| 10/02/2009 10:45a | 659,170 | Page_02.jasper |
| 10/02/2009 10:45a | 408,754 | Page_02.jrxml |
| colspan="3" | Directory of d:\src\contract\contracts\kentucky\nkar\Mutual_Release_Form | |
| 10/02/2009 10:45a | 47,376 | Page_01.jasper |
| 10/02/2009 10:45a | 34,514 | Page_01.jrxml |
| colspan="3" | Directory of d:\src\contract\contracts\kentucky\nkar\Termination_Of_Purchase_Contract | |
| 09/30/2009 09:31a | 39,066 | Termination_Of_Purchase_Contract_01.jasper |
| 09/30/2009 09:31a | 28,590 | Termination_Of_Purchase_Contract_01.jrxml |
| colspan="3" | Directory of d:\src\contract\contracts\kentucky\state\Buyer_Agency_Disclosure_Statement | |
| 09/30/2009 09:31a | 49,029 | Buyer_Agency_Disclosure_Statement_01.jasper |
| 09/30/2009 09:31a | 34,422 | Buyer_Agency_Disclosure_Statement_01.jrxml |
| 09/30/2009 09:31a | 22,002 | Buyer_Agency_Disclosure_Statement_02.jasper |
| 09/30/2009 09:31a | 9,512 | Buyer_Agency_Disclosure_Statement_02.jrxml |
| colspan="3" | Directory of d:\src\contract\contracts\kentucky\state\Buyer_Consumer_Guide_To_Agency_Relationships | |
| 09/08/2009 08:48p | 23,347 | Page_01.jasper |
| 09/08/2009 08:48p | 9,101 | Page_01.jrxml |
| 09/04/2009 09:53p | 33,187 | Page_02.jasper |
| 09/04/2009 09:53p | 22,625 | Page_02.jrxml |
| 09/04/2009 09:53p | 22,438 | Page_03.jasper |
| 09/04/2009 09:53p | 10,312 | Page_03.jrxml |
| colspan="3" | Directory of d:\src\contract\contracts\kentucky\state\Release_Of_Earnest_Money_Deposit | |
| 09/03/2009 03:31p | 28,694 | Page_01.jasper |
| 09/03/2009 03:31p | 15,560 | Page_01.jrxml |
| colspan="3" | Directory of d:\src\contract\contracts\kentucky\state\Residential_One_Time_Showing_Agreement | |
| 09/04/2009 12:31p | 34,739 | Page_01.jasper |
| 09/04/2009 12:31p | 22,448 | Page_01.jrxml |
| colspan="3" | Directory of d:\src\contract\contracts\kentucky\state\Seller_Agency_Disclosure_Statement | |
| 09/30/2009 09:31a | 49,951 | Seller_Agency_Disclosure_Statement_01.jasper |
| 09/30/2009 09:31a | 37,408 | Seller_Agency_Disclosure_Statement_01.jrxml |
| 09/30/2009 09:31a | 24,958 | Seller_Agency_Disclosure_Statement_02.jasper |
| 09/30/2009 09:31a | 11,038 | Seller_Agency_Disclosure_Statement_02.jrxml |
| colspan="3" | Directory of d:\src\contract\contracts\kentucky\state\Seller_Consumer_Guide_To_Agency_Relationships | |
| 09/04/2009 09:53p | 24,220 | Page_01.jasper |
| 09/04/2009 09:53p | 11,202 | Page_01.jrxml |
| 09/04/2009 09:53p | 33,187 | Page_02.jasper |
| 09/04/2009 09:53p | 22,625 | Page_02.jrxml |
| 09/04/2009 09:53p | 22,531 | Page_03.jasper |
| 09/04/2009 09:53p | 10,324 | Page_03.jrxml |
| colspan="3" | Directory of d:\src\contract\contracts\mls_contracts\Default_Purchase_Contract | |
| 08/01/2009 08:46p | 69,774 | Default_Purchase_Contract_01.jasper |
| 08/01/2009 08:46p | 46,895 | Default_Purchase_Contract_01.jrxml |
| 08/01/2009 08:46p | 66,235 | Default_Purchase_Contract_02.jasper |
| 08/01/2009 08:46p | 42,870 | Default_Purchase_Contract_02.jrxml |
| 08/01/2009 08:46p | 70,882 | Default_Purchase_Contract_03.jasper |
| 08/01/2009 08:46p | 48,480 | Default_Purchase_Contract_03.jrxml |
| 08/01/2009 08:46p | 47,883 | Default_Purchase_Contract_04.jasper |
| 08/01/2009 08:46p | 37,673 | Default_Purchase_Contract_04.jrxml |

-continued

| Creation | Size | Name |
|---|---|---|
| \multicolumn{3}{c}{Directory of d:\src\contract\contracts\ohio\brokers\group_realty\Consumer_Guide_To_Agency_Relationships} | | |
| 08/11/2009 06:45p | 22,232 | Consumer_Guide_To_Agency_Relationships_01.jasper |
| 08/11/2009 06:45p | 8,577 | Consumer_Guide_To_Agency_Relationships_01.jrxml |
| 08/11/2009 06:45p | 21,855 | Consumer_Guide_To_Agency_Relationships_02.jasper |
| 08/11/2009 06:45p | 9,661 | Consumer_Guide_To_Agency_Relationships_02.jrxml |
| 08/11/2009 06:45p | 27,169 | Consumer_Guide_To_Agency_Relationships_03.jasper |
| 08/11/2009 06:45p | 13,659 | Consumer_Guide_To_Agency_Relationships_03.jrxml |
| | | Directory of d:\src\contract\contracts\ohio\brokers\group_realty\Listing_Report |
| 08/11/2009 06:45p | 38,521 | Page_01.jasper |
| 08/11/2009 06:45p | 21,993 | Page_01.jrxml |
| | | Directory of d:\src\contract\contracts\ohio\brokers\hhb_partners\Buyer_Consumer_Guide_To_Agency_Relationships |
| 09/18/2009 09:16a | 24,948 | Page_01.jasper |
| 09/18/2009 09:16a | 10,832 | Page_01.jrxml |
| 09/12/2009 04:45p | 28,744 | Page_02.jasper |
| 09/12/2009 04:45p | 17,239 | Page_02.jrxml |
| | | Directory of d:\src\contract\contracts\ohio\brokers\hhb_partners\Seller_Consumer_Guide_To_Agency_Relationships |
| 09/18/2009 09:16a | 24,948 | Page_01.jasper |
| 09/18/2009 09:16a | 10,832 | Page_01.jrxml |
| 09/11/2009 02:03p | 28,756 | Page_02.jasper |
| 09/11/2009 02:03p | 17,238 | Page_02.jrxml |
| | | Directory of d:\src\contract\contracts\ohio\brokers\huff_realty\Addendum_To_Contract_To_Purchase |
| 09/08/2009 08:48p | 38,990 | Page_01.jasper |
| 09/08/2009 08:48p | 25,742 | Page_01.jrxml |
| | | Directory of d:\src\contract\contracts\ohio\brokers\huff_realty\Affiliated_Business_Disclosure |
| 09/08/2009 08:48p | 34,794 | Page_01.jasper |
| 09/08/2009 08:48p | 23,087 | Page_01.jrxml |
| 09/08/2009 08:48p | 48,899 | Page_02.jasper |
| 09/08/2009 08:48p | 42,812 | Page_02.jrxml |
| | | Directory of d:\src\contract\contracts\ohio\brokers\huff_realty\Consumer_Guide_To_Agency_Relationships_Buyer |
| 09/08/2009 08:48p | 26,575 | Page_01.jasper |
| 09/08/2009 08:48p | 12,553 | Page_01.jrxml |
| 09/08/2009 08:48p | 28,541 | Page_02.jasper |
| 09/08/2009 08:48p | 14,463 | Page_02.jrxml |
| | | Directory of d:\src\contract\contracts\ohio\brokers\huff_realty\Consumer_Guide_To_Agency_Relationships_Seller |
| 09/08/2009 08:48p | 26,575 | Page_01.jasper |
| 09/08/2009 08:48p | 12,553 | Page_01.jrxml |
| 09/08/2009 08:48p | 28,439 | Page_02.jasper |
| 09/08/2009 08:48p | 14,421 | Page_02.jrxml |
| | | Directory of d:\src\contract\contracts\ohio\brokers\huff_realty\Contingency_Removal |
| 09/08/2009 08:48p | 42,692 | Page_01.jasper |
| 09/08/2009 08:48p | 31,167 | Page_01.jrxml |
| | | Directory of d:\src\contract\contracts\ohio\brokers\huff_realty\Contract_To_Purchase |
| 09/08/2009 08:48p | 78,794 | Page_01.jasper |
| 09/08/2009 08:48p | 57,520 | Page_01.jrxml |
| 09/08/2009 08:48p | 76,423 | Page_02.jasper |
| 09/08/2009 08:48p | 61,240 | Page_02.jrxml |
| 09/08/2009 08:48p | 64,030 | Page_03.jasper |
| 09/08/2009 08:48p | 44,037 | Page_03.jrxml |
| 09/08/2009 08:48p | 53,941 | Page_04.jasper |
| 09/08/2009 08:48p | 41,281 | Page_04.jrxml |
| 09/08/2009 08:48p | 71,199 | Page_05.jasper |
| 09/08/2009 08:48p | 61,369 | Page_05.jrxml |

-continued

| Creation | Size | Name |
|---|---|---|
| Directory of d:\src\contract\contracts\ohio\brokers\huff_realty\Exclusive_Right_to_Sell | | |
| 09/09/2009 07:57p | 78,573 | Page_01.jasper |
| 09/09/2009 07:57p | 55,658 | Page_01.jrxml |
| 09/09/2009 07:57p | 52,335 | Page_02.jasper |
| 09/09/2009 07:57p | 36,773 | Page_02.jrxml |
| 09/08/2009 09:15p | 52,360 | Page_03.jasper |
| 09/08/2009 09:15p | 42,924 | Page_03.jrxml |
| Directory of d:\src\contract\contracts\ohio\brokers\huff_realty\Inspection_Form | | |
| 09/08/2009 08:48p | 77,292 | Page_01.jasper |
| 09/08/2009 08:48p | 69,171 | Page_01.jrxml |
| Directory of d:\src\contract\contracts\ohio\brokers\huff_realty\Release_Of_Earnest_Money | | |
| 09/08/2009 08:48p | 49,512 | Page_01.jasper |
| 09/08/2009 08:48p | 38,128 | Page_01.jrxml |
| Directory of d:\src\contract\contracts\ohio\cabr\Consumer_Guide_To_Agency_Relationships | | |
| 09/18/2009 09:16a | 23,402 | Page_01.jasper |
| 09/18/2009 09:16a | 8,987 | Page_01.jrxml |
| 09/18/2009 09:16a | 26,116 | Page_02.jasper |
| 09/18/2009 09:16a | 10,073 | Page_02.jrxml |
| 09/18/2009 09:16a | 27,723 | Page_03.jasper |
| 09/18/2009 09:16a | 14,015 | Page_03.jrxml |
| Directory of d:\src\contract\contracts\ohio\cabr\Contract_Addendum | | |
| 09/15/2009 05:23p | 32,626 | Page_01.jasper |
| 09/15/2009 05:23p | 18,161 | Page_01.jrxml |
| Directory of d:\src\contract\contracts\ohio\cabr\Contract_To_Purchase | | |
| 09/24/2009 10:35a | 76,562 | Contract_To_Purchase_01.jasper |
| 09/24/2009 10:35a | 54,267 | Contract_To_Purchase_01.jrxml |
| 09/24/2009 10:35a | 72,933 | Contract_To_Purchase_02.jasper |
| 09/24/2009 10:35a | 55,738 | Contract_To_Purchase_02.jrxml |
| 09/24/2009 10:35a | 53,691 | Contract_To_Purchase_03.jasper |
| 09/24/2009 10:35a | 39,911 | Contract_To_Purchase_03.jrxml |
| 09/24/2009 10:35a | 57,730 | Contract_To_Purchase_04.jasper |
| 09/24/2009 10:35a | 44,953 | Contract_To_Purchase_04.jrxml |
| 09/28/2009 12:41p | 71,000 | Contract_To_Purchase_05.jasper |
| 09/28/2009 12:41p | 60,459 | Contract_To_Purchase_05.jrxml |
| Directory of d:\src\contract\contracts\ohio\cabr\Contract_To_Purchase_Commercial | | |
| 09/15/2009 09:42a | 54,697 | Page_01.jasper |
| 09/15/2009 09:43a | 41,326 | Page_01.jrxml |
| 09/15/2009 09:42a | 46,211 | Page_02.jasper |
| 09/15/2009 09:43a | 27,811 | Page_02.jrxml |
| 09/15/2009 05:23p | 47,158 | Page_03.jasper |
| 09/15/2009 05:23p | 30,943 | Page_03.jrxml |
| Directory of d:\src\contract\contracts\ohio\cabr\Exclusive_Buyer_Agency_Contract | | |
| 09/15/2009 09:42a | 40,326 | Page_01.jasper |
| 09/15/2009 09:42a | 33,842 | Page_01.jrxml |
| 09/14/2009 11:05a | 45,807 | Page_02.jasper |
| 09/14/2009 11:05a | 38,262 | Page_02.jrxml |
| 09/12/2009 04:45p | 40,702 | Page_03.jasper |
| 09/12/2009 04:45p | 31,765 | Page_03.jrxml |
| Directory of d:\src\contract\contracts\ohio\cabr\Exclusive_Right_To_Sell | | |
| 09/16/2009 08:13p | 79,160 | Exclusive_Right_To_Sell_01.jasper |
| 09/16/2009 08:13p | 55,863 | Exclusive_Right_To_Sell_01.jrxml |
| 09/14/2009 02:16p | 54,829 | Exclusive_Right_To_Sell_02.jasper |
| 09/14/2009 02:16p | 37,668 | Exclusive_Right_To_Sell_02.jrxml |
| 09/14/2009 02:16p | 45,255 | Exclusive_Right_To_Sell_03.jasper |
| 09/14/2009 02:16p | 34,515 | Exclusive_Right_To_Sell_03.jrxml |
| Directory of d:\src\contract\contracts\ohio\cabr\Exclusive_Right_To_Sell_Commercial | | |
| 09/24/2009 10:35a | 54,302 | Page_01.jasper |
| 09/24/2009 10:35a | 38,406 | Page_01.jrxml |
| 09/15/2009 09:42a | 50,402 | Page_02.jasper |
| 09/15/2009 09:42a | 34,862 | Page_02.jrxml |
| 09/15/2009 09:42a | 33,372 | Page_03.jasper |
| 09/15/2009 09:42a | 17,923 | Page_03.jrxml |

-continued

| Creation | Size | Name |
|---|---|---|
| | | Directory of d:\src\contract\contracts\ohio\cabr\Lead_Based_Paint_Disclosure_Housing_Sales |
| 09/16/2009 08:13p | 50,479 | Page_01.jasper |
| 09/15/2009 05:23p | 32,289 | Page_01.jrxml |
| | | Directory of d:\src\contract\contracts\ohio\cabr\Lead_Based_Paint_Inspection_Addendum |
| 09/15/2009 09:42a | 42,596 | Page_01.jasper |
| 09/15/2009 09:42a | 30,813 | Page_01.jrxml |
| | | Directory of d:\src\contract\contracts\ohio\cabr\Listing_Report |
| 09/11/2009 02:03p | 40,188 | Page_01.jasper |
| 09/11/2009 02:03p | 23,849 | Page_01.jrxml |
| | | Directory of d:\src\contract\contracts\ohio\cabr\MLS_Commercial_Worksheet |
| 09/16/2009 08:13p | 96,265 | Page_01.jasper |
| 09/24/2009 10:35a | 91,589 | Page_01.jrxml |
| 09/16/2009 08:13p | 196,056 | Page_02.jasper |
| 10/02/2009 10:45a | 142,822 | Page_02.jrxml |
| | | Directory of d:\src\contract\contracts\ohio\cabr\MLS_Conditional_Withdrawal_Worksheet |
| 09/24/2009 10:35a | 41,061 | Page_01.jasper |
| 09/24/2009 10:35a | 28,712 | Page_01.jrxml |
| | | Directory of d:\src\contract\contracts\ohio\cabr\MLS_Land_Worksheet |
| 09/10/2009 04:30p | 96,265 | Page_01.jasper |
| 09/10/2009 04:30p | 77,574 | Page_01.jrxml |
| 09/15/2009 05:23p | 196,056 | Page_02.jasper |
| 09/15/2009 05:23p | 115,925 | Page_02.jrxml |
| | | Directory of d:\src\contract\contracts\ohio\cabr\MLS_Listing_Amendment_Worksheet |
| 10/02/2009 10:45a | 45,338 | Page_01.jasper |
| 10/02/2009 10:45a | 29,759 | Page_01.jrxml |
| | | Directory of d:\src\contract\contracts\ohio\cabr\Post_Inspection_Agreement |
| 09/15/2009 05:23p | 32,286 | Page_01.jasper |
| 09/15/2009 05:23p | 17,330 | Page_01.jrxml |
| | | Directory of d:\src\contract\contracts\ohio\cabr\Sale_Pending_Report |
| 09/16/2009 08:13p | 65,772 | Page_01.jasper |
| 09/16/2009 08:13p | 53,619 | Page_01.jrxml |
| | | Directory of d:\src\contract\contracts\ohio\cabr\Short_Sale_Addendum |
| 09/30/2009 09:31a | 48,046 | Page_01.jasper |
| 09/30/2009 09:31a | 36,100 | Page_01.jrxml |
| | | Directory of d:\src\contract\contracts\ohio\dabr\Contract_To_Purchase_Inspection_Addendum |
| 08/28/2009 04:21p | 49,097 | Contract_To_Purchase_Inspection_Addendum_01.jasper |
| 08/28/2009 04:21p | 27,120 | Contract_To_Purchase_Inspection_Addendum_01.jrxml |
| 08/19/2009 09:30a | 32,733 | Contract_To_Purchase_Inspection_Addendum_02.jasper |
| 08/19/2009 09:30a | 18,651 | Contract_To_Purchase_Inspection_Addendum_02.jrxml |
| | | Directory of d:\src\contract\contracts\ohio\dabr\Contract_To_Purchase_Real_Estate |
| 08/28/2009 04:21p | 66,932 | Contract_To_Purchase_Real_Estate_01.jasper |
| 08/28/2009 04:21p | 55,730 | Contract_To_Purchase_Real_Estate_01.jrxml |
| 09/09/2009 07:57p | 68,654 | Contract_To_Purchase_Real_Estate_02.jasper |
| 09/09/2009 07:57p | 58,345 | Contract_To_Purchase_Real_Estate_02.jrxml |
| | | Directory of d:\src\contract\contracts\ohio\dabr\Post_Inspection_Agreement |
| 09/15/2009 09:43a | 36,225 | Post_Inspection_Agreement_01.jasper |
| 09/15/2009 09:43a | 23,295 | Post_Inspection_Agreement_01.jrxml |
| | | Directory of d:\src\contract\contracts\ohio\dabr\Property_Change_Report |
| 09/18/2009 06:20p | 53,380 | Page_01.jasper |
| 09/16/2009 08:13p | 34,403 | Page_01.jrxml |
| | | Directory of d:\src\contract\contracts\ohio\state\Agency_Disclosure |
| 09/17/2009 07:29p | 55,656 | Agency_Disclosure_01.jasper |
| 09/17/2009 07:29p | 39,349 | Agency_Disclosure_01.jrxml |
| 09/17/2009 07:29p | 28,754 | Agency_Disclosure_02.jasper |
| 09/17/2009 07:29p | 13,882 | Agency_Disclosure_02.jrxml |
| | | Directory of d:\src\contract\contracts\ohio\state\Consumer_Guide_To_Agency_Relationships |
| 09/14/2009 11:05a | 23,497 | Page_01.jasper |
| 09/14/2009 11:05a | 9,046 | Page_01.jrxml |
| 09/14/2009 11:05a | 26,766 | Page_02.jasper |
| 09/14/2009 11:05a | 11,244 | Page_02.jrxml |
| 09/09/2009 07:57p | 28,891 | Page_03.jasper |

-continued

| Creation | Size | Name |
| --- | --- | --- |
| 09/09/2009 07:57p | 15,518 | Page_03.jrxml |
| Directory of d:\src\contract\contracts\ohio\state\Residential_Property_Disclosure_Form | | |
| 09/14/2009 11:05a | 53,780 | Page_01.jasper |
| 09/14/2009 11:05a | 34,340 | Page_01.jrxml |
| 09/09/2009 07:57p | 104,175 | Page_02.jasper |
| 09/09/2009 07:57p | 64,812 | Page_02.jrxml |
| 09/09/2009 07:57p | 70,749 | Page_03.jasper |
| 09/09/2009 07:57p | 44,856 | Page_03.jrxml |
| 09/09/2009 07:57p | 52,227 | Page_04.jasper |
| 09/09/2009 07:57p | 33,873 | Page_04.jrxml |
| Directory of d:\src\contract\contracts\remax_preferred\Agency_Disclosure | | |
| 09/15/2009 05:23p | 57,483 | Agency_Disclosure_01.jasper |
| 09/15/2009 05:23p | 43,238 | Agency_Disclosure_01.jrxml |
| 09/15/2009 05:23p | 28,422 | Agency_Disclosure_02.jasper |
| 09/15/2009 05:23p | 13,513 | Agency_Disclosure_02.jrxml |
| Directory of d:\src\contract\contracts\remax_preferred\Consumer_Guide_To_Agency_Relationships | | |
| 09/30/2009 09:31a | 29,834 | Consumer_Guide_To_Agency_Relationships_01.jasper |
| 09/30/2009 09:31a | 15,616 | Consumer_Guide_To_Agency_Relationships_01.jrxml |
| 09/30/2009 09:31a | 23,766 | Consumer_Guide_To_Agency_Relationships_02.jasper |
| 09/30/2009 09:31a | 11,636 | Consumer_Guide_To_Agency_Relationships_02.jrxml |
| Directory of d:\src\contract\contracts\remax_preferred\Contract_Addendum | | |
| 10/02/2009 10:45a | 40,011 | Contract_Addendum_01.jasper |
| 10/02/2009 10:45a | 23,624 | Contract_Addendum_01.jrxml |
| Directory of d:\src\contract\contracts\remax_preferred\Contract_To_Purchase | | |
| 09/16/2009 08:13p | 83,041 | Contract_To_Purchase_01.jasper |
| 09/16/2009 08:13p | 59,523 | Contract_To_Purchase_01.jrxml |
| 09/16/2009 08:13p | 70,496 | Contract_To_Purchase_02.jasper |
| 09/16/2009 08:13p | 53,369 | Contract_To_Purchase_02.jrxml |
| 09/16/2009 08:13p | 52,015 | Contract_To_Purchase_03.jasper |
| 09/16/2009 08:13p | 39,232 | Contract_To_Purchase_03.jrxml |
| 09/16/2009 08:13p | 53,217 | Contract_To_Purchase_04.jasper |
| 09/16/2009 08:13p | 39,347 | Contract_To_Purchase_04.jrxml |
| 09/16/2009 08:13p | 70,580 | Contract_To_Purchase_05.jasper |
| 09/16/2009 08:13p | 61,968 | Contract_To_Purchase_05.jrxml |
| Directory of d:\src\contract\contracts\remax_preferred\Post_Inspection_Agreement | | |
| 09/15/2009 05:23p | 37,784 | Post_Inspection_Agreement_01.jasper |
| 09/17/2009 07:29p | 20,868 | Post_Inspection_Agreement_01.jrxml |
| Directory of d:\src\contract\contracts\remax_resources\Buyer_Agency_Exclusive_Right_To_Represent | | |
| 09/16/2009 08:13p | 41,627 | Page_01.jasper |
| 09/16/2009 08:13p | 28,193 | Page_01.jrxml |
| 09/16/2009 08:13p | 31,268 | Page_02.jasper |
| 09/16/2009 08:13p | 17,057 | Page_02.jrxml |
| Directory of d:\src\contract\contracts\remax_resources\Consumer_Guide_To_Agency_Relationships | | |
| 09/10/2009 04:30p | 22,275 | Consumer_Guide_To_Agency_Relationships_01.jasper |
| 09/10/2009 04:30p | 8,750 | Consumer_Guide_To_Agency_Relationships_01.jrxml |
| 09/10/2009 04:30p | 21,941 | Consumer_Guide_To_Agency Relationships_02.jasper |
| 09/10/2009 04:30p | 9,899 | Consumer_Guide_To_Agency_Relationships_02.jrxml |
| 08/17/2009 07:56p | 27,221 | Consumer_Guide_To_Agency_Relationships_03.jasper |
| 08/17/2009 07:56p | 13,940 | Consumer_Guide_To_Agency_Relationships_03.jrxml |
| Directory of d:\src\contract\contracts\remax_resources\Exclusive_Agency_Contract | | |
| 09/30/2009 09:31a | 45,845 | Exclusive_Agency_Contract_01.jasper |
| 09/30/2009 09:31a | 30,908 | Exclusive_Agency_Contract_01.jrxml |
| 09/30/2009 09:31a | 34,101 | Exclusive_Agency_Contract_02.jasper |
| 09/30/2009 09:31a | 23,757 | Exclusive_Agency_Contract_02.jrxml |
| Directory of d:\src\contract\contracts\remax_resources\Exclusive_Right_To_Sell | | |
| 09/12/2009 04:45p | 45,920 | Exclusive_Right_To_Sell_01.jasper |
| 09/12/2009 04:45p | 30,784 | Exclusive_Right_To_Sell_01.jrxml |
| 09/12/2009 04:45p | 38,238 | Exclusive_Right_To_Sell_02.jasper |
| 09/12/2009 04:45p | 25,063 | Exclusive_Right_To_Sell_02.jrxml |
| Directory of d:\src\contract\contracts\remax_resources\LeadPaint_Disclosure_Form | | |
| 09/16/2009 08:13p | 46,804 | LeadPaint_Disclosure_Form_01.jasper |
| 09/16/2009 08:13p | 30,524 | LeadPaint_Disclosure_Form_01.jrxml |

-continued

| Creation | Size | Name |
|---|---|---|
| Directory of d:\src\contract\contracts\remax_resources\Listing_Change_Report | | |
| 09/16/2009 08:13p | 53,429 | Listing_Change_Report_01.jasper |
| 09/16/2009 08:13p | 35,006 | Listing_Change_Report_01.jrxml |
| Directory of d:\src\contract\contracts\remax_resources\Listing_Report | | |
| 08/17/2009 07:56p | 38,574 | Listing_Report_01.jasper |
| 08/17/2009 07:56p | 22,264 | Listing_Report_01.jrxml |
| Directory of d:\src\contract\contracts\remax_resources\Purchase_Agreement_Addendum | | |
| 08/13/2009 09:50p | 64,110 | Page_01.jasper |
| 08/13/2009 09:50p | 53,401 | Page_01.jrxml |
| Directory of d:\src\contract\contracts\remax_resources\property_disclosure | | |
| 09/14/2009 02:16p | 53,780 | Property_Disclosure_01.jasper |
| 09/14/2009 02:16p | 34,340 | Property_Disclosure_01.jrxml |
| 09/14/2009 02:16p | 104,175 | Property_Disclosure_02.jasper |
| 09/14/2009 02:16p | 64,812 | Property_Disclosure_02.jrxml |
| 09/14/2009 02:16p | 70,749 | Property_Disclosure_03.jasper |
| 09/14/2009 02:16p | 44,856 | Property_Disclosure_03.jrxml |
| 09/14/2009 02:16p | 52,227 | Property_Disclosure_04.jasper |
| 09/14/2009 02:16p | 33,873 | Property_Disclosure_04.jrxml |
| Directory of d:\src\contract\contracts\remax_unlimited\Affiliated_Business_Arrangement_Disclosure | | |
| 08/01/2009 08:45p | 33,147 | Affiliated_Business_Arrangement_Disclosure_01.jasper |
| 08/01/2009 08:45p | 20,535 | Affiliated_Business_Arrangement_Disclosure_01.jrxml |
| Directory of d:\src\contract\contracts\remax_unlimited\Affiliated_Business_Arrangement_Disclosure(ND) | | |
| 08/05/2009 05:49p | 34,618 | Affiliated_Business_Arrangement_Disclosure(ND)_01.jasper |
| 08/05/2009 05:49p | 21,478 | Affiliated_Business_Arrangement_Disclosure(ND)01.jrxml |
| Directory of d:\src\contract\contracts\remax_unlimited\Amendment_To_The_Listing_Agreement | | |
| 09/14/2009 02:16p | 43,366 | Amendment_To_The_Listing_Agreement_01.jasper |
| 09/14/2009 02:16p | 27,712 | Amendment_To_The_Listing_Agreement_01.jrxml |
| Directory of d:\src\contract\contracts\remax_unlimited\Cancellation_Of_Listing_Agreement | | |
| 08/12/2009 04:32p | 32,424 | Cancellation_Of_Listing_Agreement_01.jasper |
| 08/12/2009 04:32p | 19,961 | Cancellation_Of_Listing_Agreement_01.jrxml |
| Directory of d:\src\contract\contracts\remax_unlimited\Consumer_Guide_To_Agency_Relationships | | |
| 08/01/2009 08:45p | 21,946 | Consumer_Guide_To_Agency_Relationships_01.jasper |
| 08/01/2009 08:45p | 10,453 | Consumer_Guide_To_Agency_Relationships_01.jrxml |
| 08/19/2009 01:27p | 30,278 | Consumer_Guide_To_Agency_Relationships_02.jasper |
| 08/19/2009 01:27p | 16,440 | Consumer_Guide_To_Agency_Relationships_02.jrxml |
| Directory of d:\src\contract\contracts\remax_unlimited\Contract_Addendum | | |
| 09/08/2009 08:48p | 32,793 | Contract_Addendum_01.jasper |
| 09/08/2009 08:48p | 17,673 | Contract_Addendum_01.jrxml |
| Directory of d:\src\contract\contracts\remax_unlimited\Contract_To_Purchase | | |
| 09/24/2009 10:35a | 76,562 | Page_01.jasper |
| 09/24/2009 10:35a | 54,270 | Page_01.jrxml |
| 09/24/2009 10:35a | 74,967 | Page_02.jasper |
| 09/24/2009 10:35a | 58,538 | Page_02.jrxml |
| 09/24/2009 10:35a | 52,092 | Page_03.jasper |
| 09/24/2009 10:35a | 38,526 | Page_03.jrxml |
| 09/24/2009 10:35a | 53,569 | Page_04.jasper |
| 09/24/2009 10:35a | 39,507 | Page_04.jrxml |
| 09/24/2009 10:35a | 70,681 | Page_05.jasper |
| 09/24/2009 10:35a | 60,060 | Page_05.jrxml |
| Directory of d:\src\contract\contracts\remax_unlimited\Lead_Based_Paint_Disclosure_Housing_Sales | | |
| 09/04/2009 05:17p | 49,853 | Lead_Based_Paint_Disclosure_Housing_Sales_01.jasper |
| 09/04/2009 05:17p | 31,339 | Lead_Based_Paint_Disclosure_Housing_Sales_01.jrxml |
| Directory of d:\src\contract\contracts\remax_unlimited\Non_Disclosure_and_Confidentiality_Agreement | | |
| 09/04/2009 05:17p | 33,998 | Non_Disclosure_and_Confidentiality_Agreement_01.jasper |
| 09/04/2009 05:17p | 21,609 | Non_Disclosure_and_Confidentiality_Agreement_01.jrxml |

-continued

| Creation | Size | Name |
|---|---|---|
| Directory of d:\src\contract\contracts\remax_unlimited\Post_Inspection_Agreement | | |
| 08/13/2009 03:26p | 32,151 | Post_Inspection_Agreement_01.jasper |
| 08/13/2009 03:26p | 17,045 | Post_Inspection_Agreement_01.jrxml |
| Directory of d:\src\contract\contracts\remax_unlimited\Residential_Property_Disclosure_Form | | |
| 09/09/2009 07:57p | 53,790 | Residential_Property_Disclosure_Form_01.jasper |
| 09/09/2009 07:57p | 34,351 | Residential_Property_Disclosure_Form_01.jrxml |
| 09/09/2009 07:57p | 104,171 | Residential_Property_Disclosure_Form_02.jasper |
| 09/09/2009 07:57p | 64,812 | Residential_Property_Disclosure_Form_02.jrxml |
| 09/09/2009 07:57p | 70,749 | Residential_Property_Disclosure_Form_03.jasper |
| 09/09/2009 07:57p | 44,856 | Residential_Property_Disclosure_Form_03.jrxml |
| 09/09/2009 07:57p | 52,227 | Residential_Property_Disclosure_Form_04.jasper |
| 09/09/2009 07:57p | 33,873 | Residential_Property_Disclosure_Form_04.jrxml |
| Directory of d:\src\contract\contracts\remax_unlimited\Short_Sale_Addendum | | |
| 09/04/2009 05:17p | 48,370 | Short_Sale_Addendum_01.jasper |
| 09/04/2009 05:17p | 36,093 | Short_Sale_Addendum_01.jrxml |
| Directory of d:\src\contract\contracts\remax_unlimited\Understanding_Short_Sales | | |
| 09/08/2009 08:48p | 36,396 | Understanding_Short_Sales_01.jasper |
| 09/08/2009 08:48p | 23,708 | Understanding_Short_Sales_01.jrxml |
| Directory of d:\src\contract\contracts\sibcy_cline\Agency_Disclosure | | |
| 09/16/2009 08:13p | 55,553 | Agency_Disclosure_01.jasper |
| 09/16/2009 08:13p | 39,323 | Agency_Disclosure_01.jrxml |
| 09/16/2009 08:13p | 28,243 | Agency_Disclosure_02.jasper |
| 09/16/2009 08:13p | 13,263 | Agency_Disclosure_02.jrxml |
| Directory of d:\src\contract\contracts\sibcy_cline\Default_Purchase_Contract | | |
| 08/01/2009 08:45p | 68,394 | Default_Purchase_Contract_01.jasper |
| 08/01/2009 08:45p | 45,691 | Default_Purchase_Contract_01.jrxml |
| 08/01/2009 08:45p | 65,423 | Default_Purchase_Contract_02.jasper |
| 08/01/2009 08:45p | 41,801 | Default_Purchase_Contract_02.jrxml |
| 08/01/2009 08:45p | 70,110 | Default_Purchase_Contract_03.jasper |
| 08/01/2009 08:45p | 45,735 | Default_Purchase_Contract_03.jrxml |
| 08/01/2009 08:45p | 47,688 | Default_Purchase_Contract_04.jasper |
| 08/01/2009 08:45p | 36,725 | Default_Purchase_Contract_04.jrxml |
| Directory of d:\src\contract\contracts\test | | |
| 09/04/2009 09:52a | 16,332 | Page_01.jasper |
| 09/04/2009 09:52a | 3,376 | Page_01.jrxml |
| Directory of d:\src\fonts | | |
| 08/01/2009 08:45p | 83,644 | helr045w.ttf |
| 08/01/2009 08:45p | 83,980 | helr65w.ttf |
| Directory of d:\src\template\simple | | |
| 08/01/2009 08:45p | 1,242 | actionerror.ftl |
| 08/01/2009 08:45p | 1,256 | actionmessage.ftl |
| 08/01/2009 08:45p | 2,476 | fielderror.ftl | on the compact disc submitted herewith, and the computer program which is represented by their combination. Two identical discs, each containing the files listed above are submitted herewith.

FIELD

Aspects of this disclosure can be implemented in the field performing and managing negotiations.

BACKGROUND

Much of the business world has shifted toward online business practices. However, existing methods of performing and managing negotiations do not make effective use of the potential of online practices, and are generally unsatisfactory. An example of this is the current state of the art for managing and performing real estate negotiations. Currently, real estate negotiations generally entail agents drafting contracts by filling out a standard form, which is then transmitted via email or fax to the listing agent. Upon receipt, the listing agent prints and reviews the document with the seller, and makes any changes to the terms of the printed document that he or she desires. Once the changes are made, the listing agent may submit a counter-offer to the buyer's agent in a similar fashion; this process typically repeats itself three to five times until a transaction is fully negotiated. This process is costly, unsecure, inefficient, and generally results in a final document which is both messy and difficult to interpret, thereby exposing the parties and their agents to unnecessary risk of dispute and litigation. Additionally, this process does not scale well, and can make it very difficult to manage multiple ongoing or potential negotiations. To address this difficulty, some entities, such as banks which may own (and wish to dispose of) billions of dollars in real estate, have turned to hiring specialized asset management companies which can serve as intermediaries for real estate brokers. However, rather than simplifying the process of managing negotiations, the use of these asset management companies simply shuffles the burden to another entity, creating an additional layer of potential miscommunication, delay and expense in the process. The same or similar problems also exist in other contexts, such as sales, construction, service contexts and the like. Accordingly, there is a long felt but unmet need in the art for technology which can address one or more of the drawbacks of presently existing techniques for performing and managing negotiations.

SUMMARY

Disclosed herein are techniques which can be used in a variety of settings, including performing and managing real estate negotiations. Various aspects of this disclosure can be implemented in the form of computer readable medium storing data operable to configure a computer to perform tasks such as receiving requests to view documents, and displaying interfaces in response to receiving the requests, where the interfaces may be composed of form portions and data elements from a data warehouse. The users who are participating in the negotiation may pass authorizations to modify information between each other, and the modifications may also be stored in the data warehouse. Other computer readable media which could be implemented based on this disclosure include those with data operable to configure a computer to perform tasks such as receiving and storing a set of real property information, comparing that set of real property information against a set of pre-existing information, and automatically generating an output based on that comparison. Of course, the teachings of this disclosure can also be used in processes, machines, articles of manufacture in addition to computer readable media such as described above. Accordingly, the protection afforded by the claims set forth in this document (or in other documents which claim the benefit of this document) should not be limited to data or particular tasks as set forth above.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

Aspects of this disclosure can be used to implement an online tool that allows negotiation and execution of an agreement by parties using electronic or digital signatures. Physical signatures may be replaced with electronic signatures per the Electronic Signatures in Global National Commerce Act ("E-SIGN") and the Uniform Electronic Transactions Act ("UETA"). Information exchanged during negotiation can be stored in a centralized location (e.g., a data warehouse) and accessed through a variety of virtual forms. Additionally, the data warehouse can be used to provide raw material for a variety of analytics, management and even automated negotiation tools. For the purpose of illustration, the inventors' technology is disclosed herein in terms of possible applications for performing and managing real estate negotiations. It should be understood that various aspects of the disclosed technology could also be susceptible to applications in different areas, and that the potential applications set forth herein should be understood as being illustrative only, and not limiting.

Figure 1:
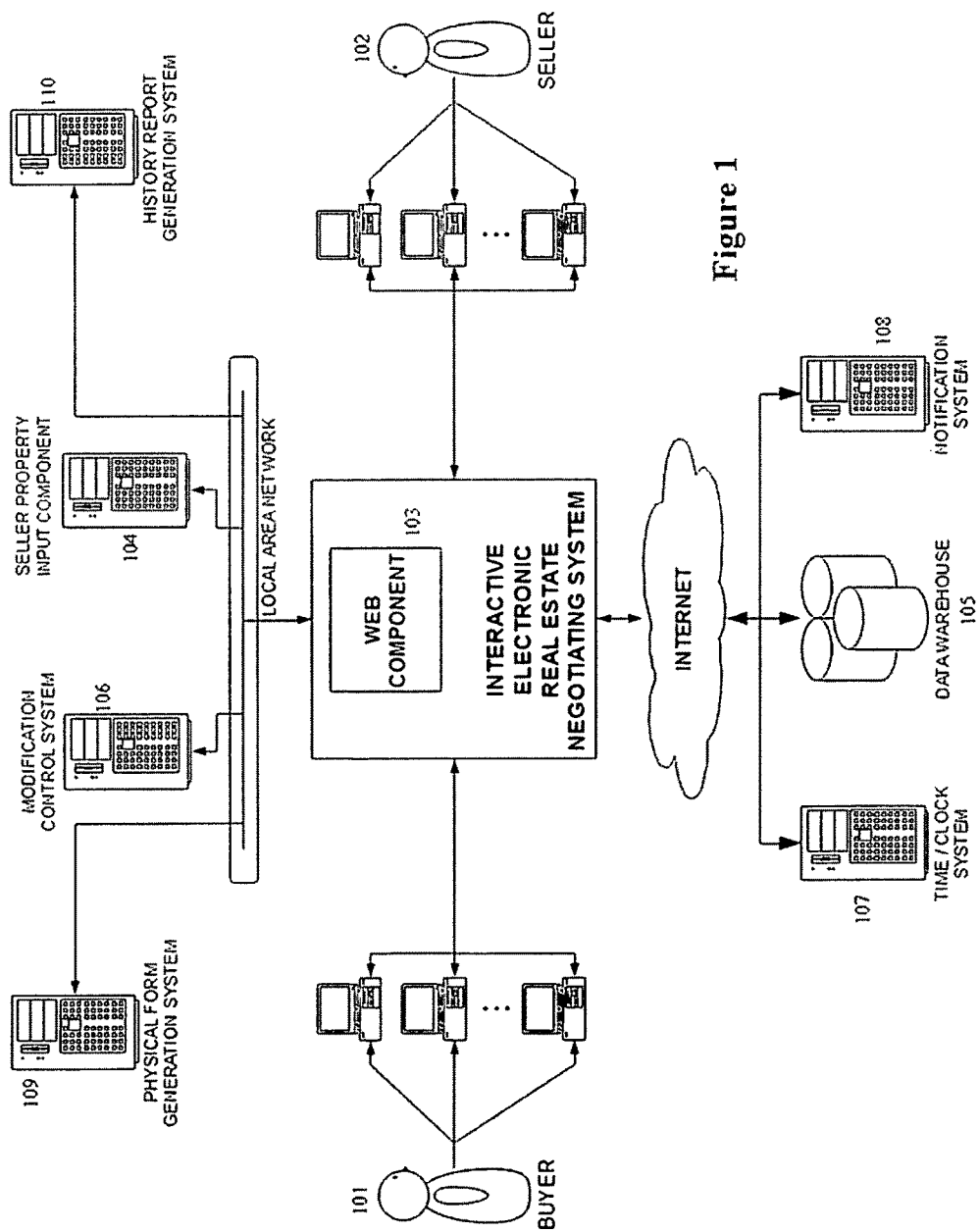
FIG. 1 depicts a system in which a buyer and a seller can interact with one another through a web component supported by a variety of distributed systems.
Figure 2A:
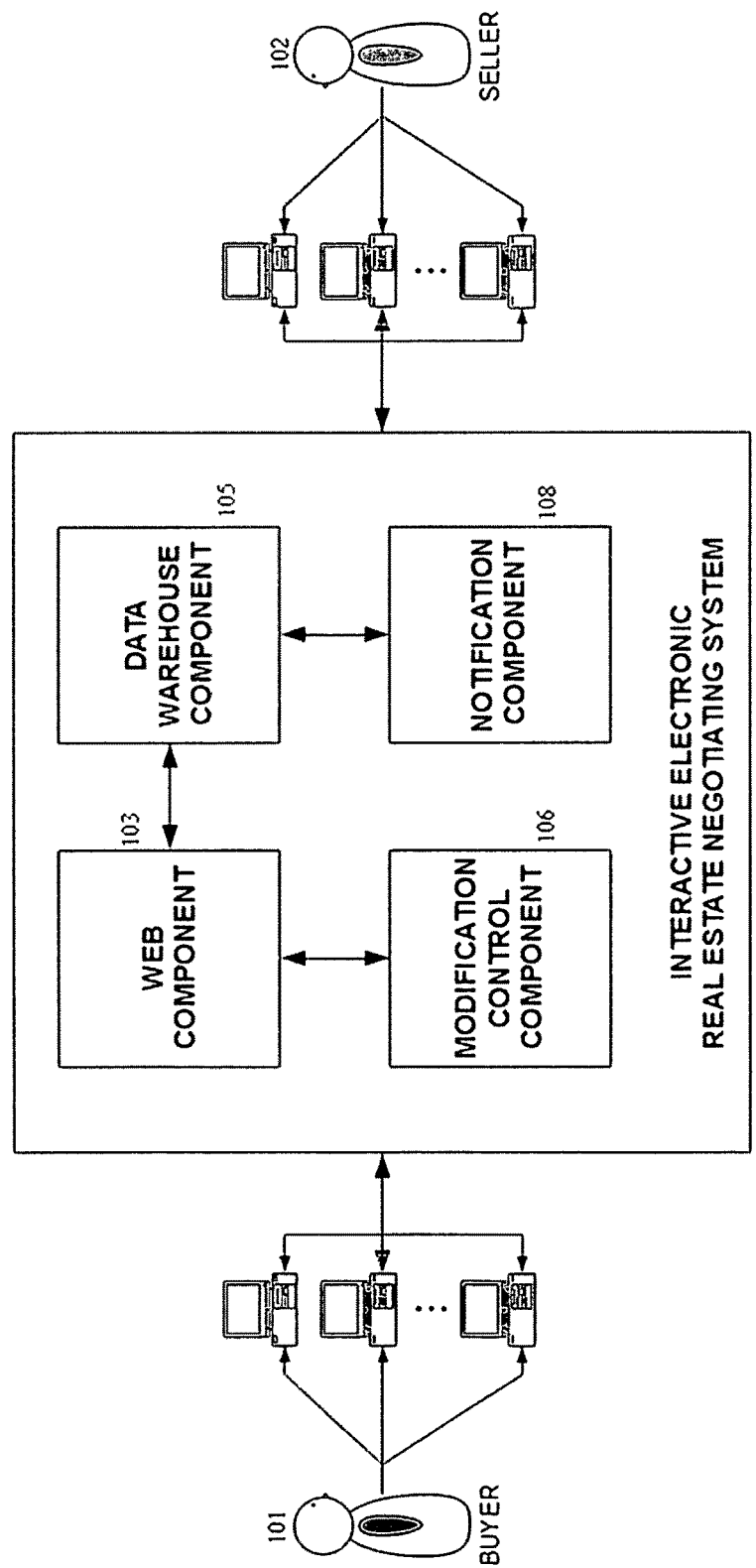
FIGS. 2a-2e depict architectures which utilize various levels of combination and centralization.
Figure 2B:
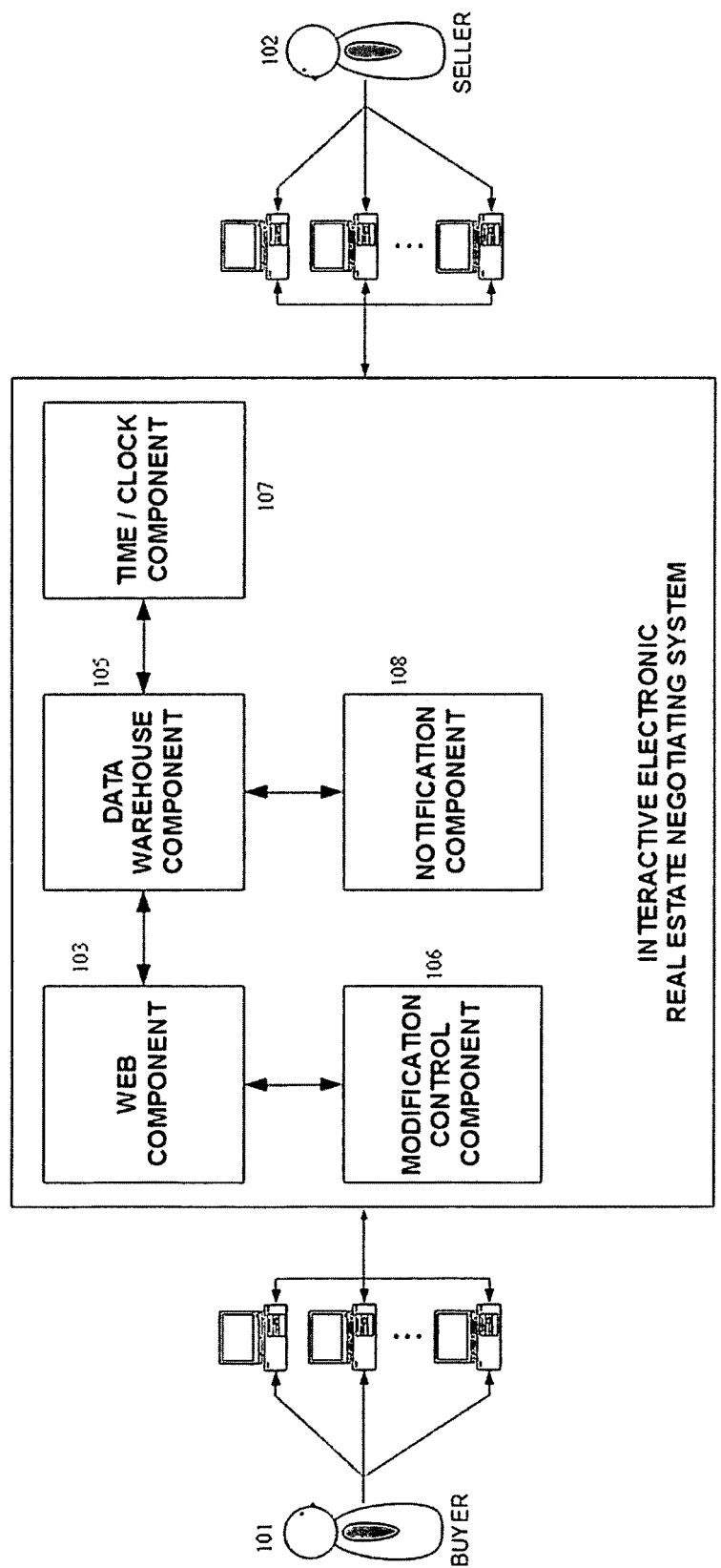
Figure 2C:
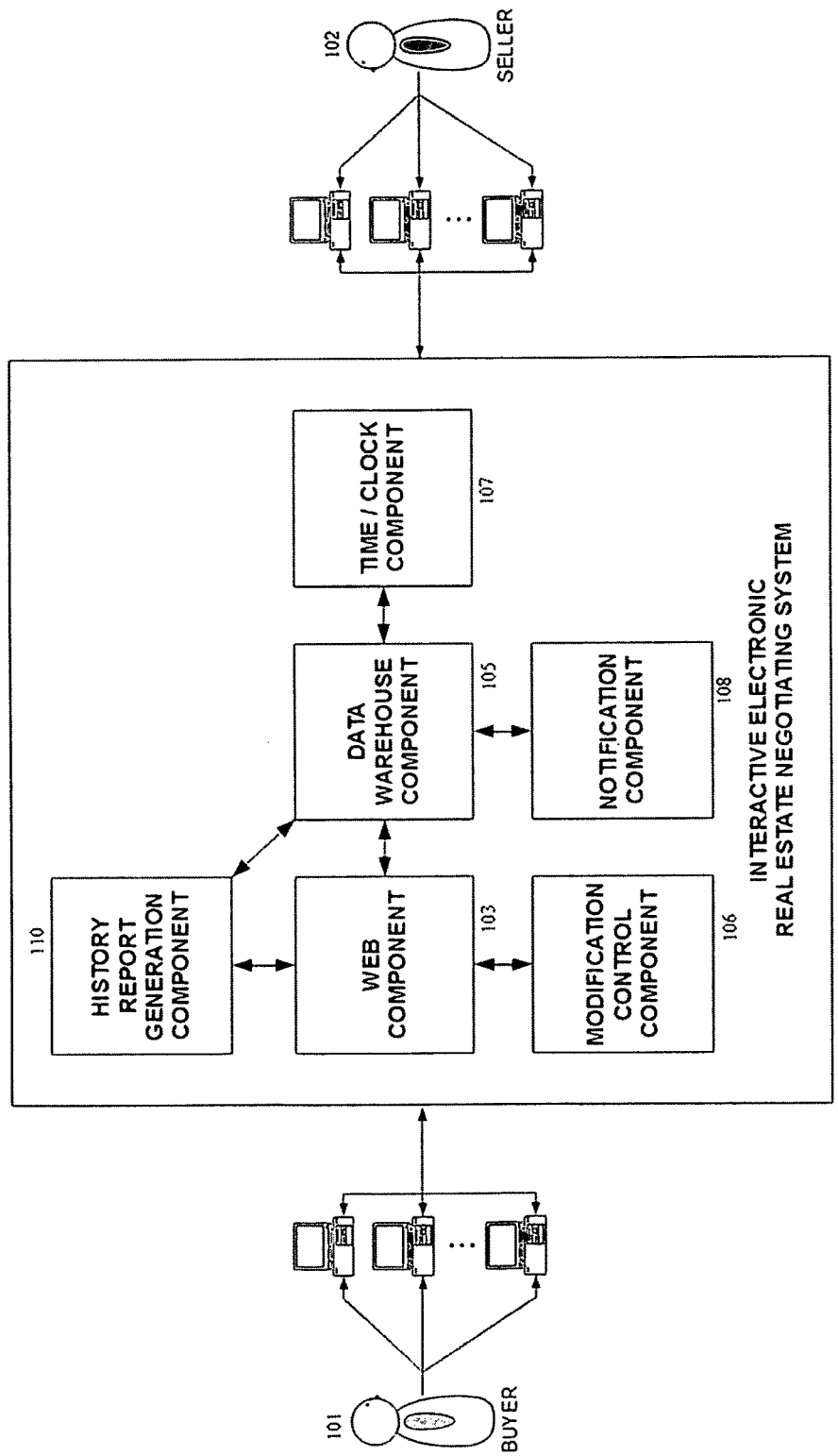
Figure 2D:
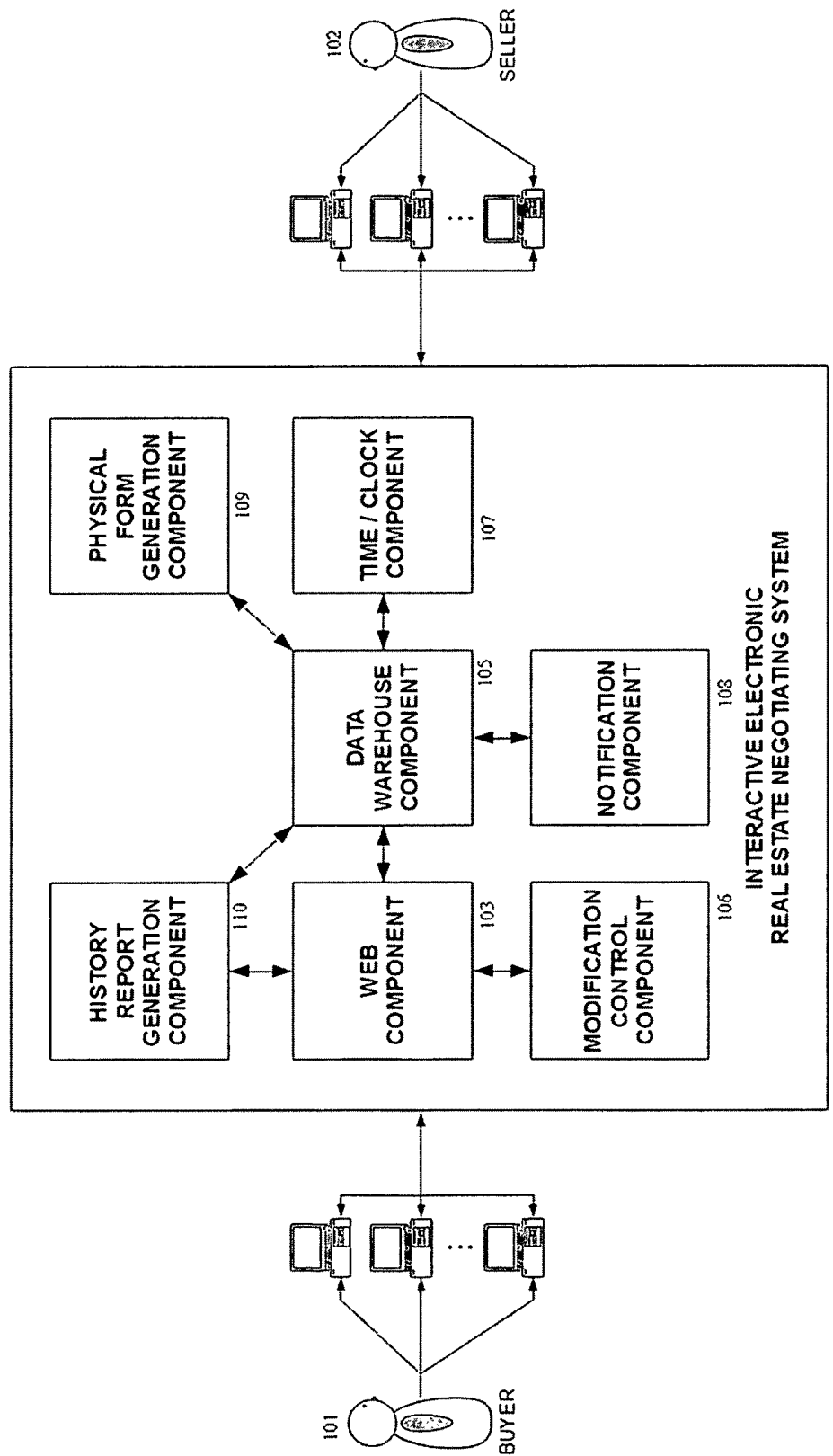
Figure 2E:
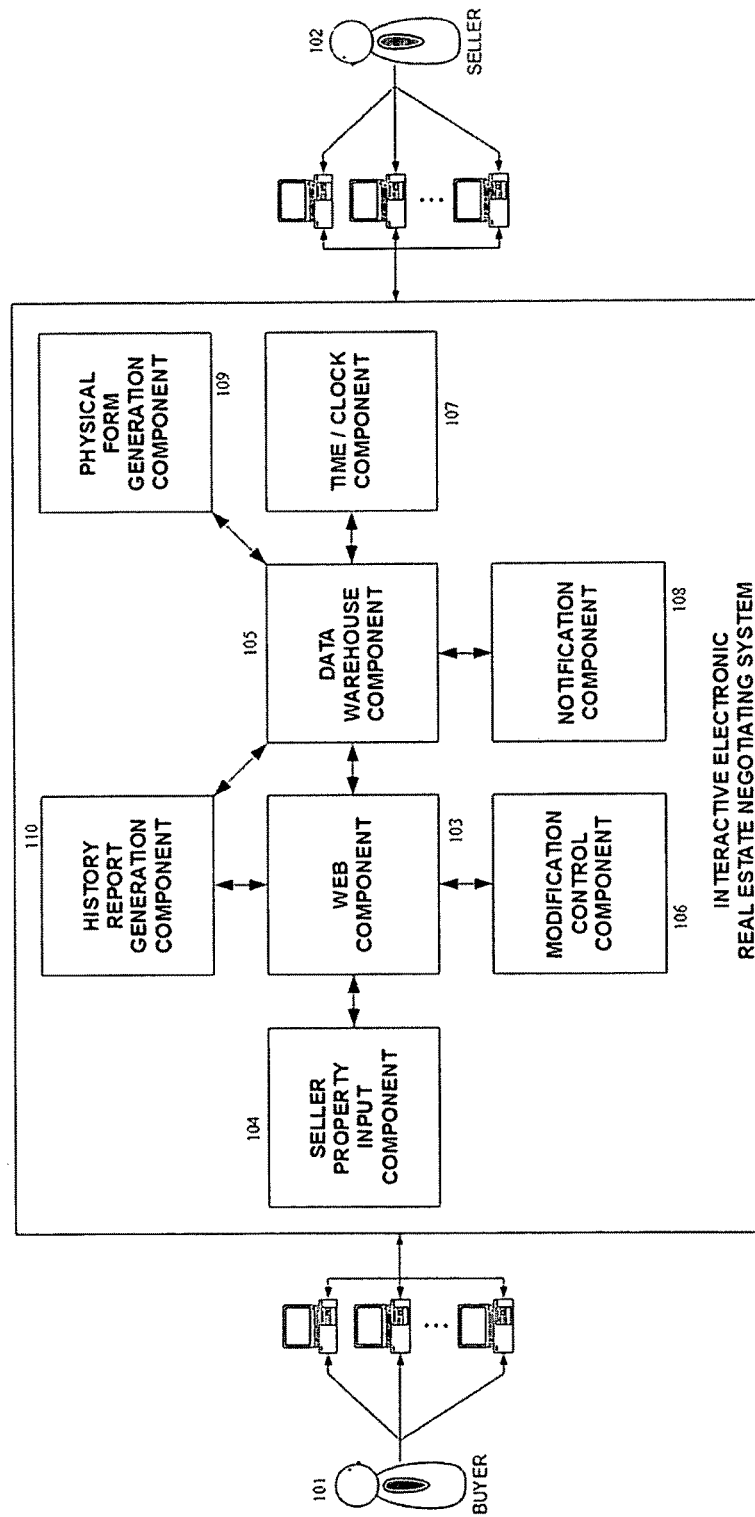

Turning now to the figures, FIG. 1 depicts an architecture which can be used to allow parties to a real estate transaction, such as a buyer [101] and a seller [102], to interact with one another to complete the transaction. In this type of implementation, a web component [103] can provide interfaces for, and mediate communications between, a real estate buyer [101] and a real estate seller [102]. These communications can include the seller [102] adding information about properties, a buyer [101] viewing information about properties, both the buyer [101] and seller [102] exchanging terms related to the sale of a property, and the buyer [101] and seller [102] entering into a contract to purchase the property. The web interface [103] can be supported by software on a server which would communicate with other systems to provide additional functionality which is relevant to the transaction between the buyer [101] and the seller [102]. This type of additional functionality could include authenticating the communications of the buyer [101] and the seller [102] as they use the system, maintaining records of offer and counter-offer terms proposed by both the buyer [101] and the seller [102], and generating a final agreed document or an audit trail of negotiations. Other functionality is also possible. For example, a system implemented according to FIG. 1 could be implemented to allow the buyer [101] or seller [102] to withdraw previously made (but not yet accepted) offers, to allow buyers [101] and sellers [102] to search for properties or manage portfolios of properties or clients, or to obtain information related to their (or other entities') use of the system.

To provide functionality such as described (or other functionality as may be appropriate in a given context) the components illustrated in FIG. 1 could be implemented in a variety of ways. For example, a seller property input component [104] could be implemented as a server configured to receive information about properties from a seller [102], such as might be provided by the seller [102] through an electronic feed (e.g., a binary data feed, a markup language feed such as RSS, or some other type of data transfer technology), or manually, such as by entering data into forms provided by the web component [103] or the seller property input component [104]. Once information about a property had been received, the seller property input component [104] could communicate with a data warehouse [105] to store the information. The data warehouse [105] could store the information provided by a seller [102], along with a timestamp showing when the information was provided, and a unique ID which could be used for later tracking and retrieving the information. Subsequently, when a buyer [101] requests information related to a property through the web component [103], that information could be retrieved from the data warehouse [105] and displayed to the buyer [101].

Once the buyer [101] selects a property and the information related to that property is retrieved from the data warehouse [105], the web component [103] could be configured to allow the buyer [101] to suggest changes to the information (e.g., a propose a counter-offer with a lower price than suggested previously by the seller [102]), or to allow the buyer [101] to provide new information of his or her own (e.g., if a buyer's agent hadn't been added by the seller, this information could be added by the buyer). Once this new information had been provided, a system such as shown in FIG. 1 could use a modification control system [106] to validate the buyer's, identify (e.g., by asking the buyer [101] to enter a unique password) and to prepare the information for insertion into the data warehouse [105]. This preparation for insertion could include steps such as communicating with external systems (e.g., a time/clock system [107]) to retrieve a timestamp for the information, assembling the information provided by the buyer [101] along with the buyer's identify and timestamp into a data record, and sending that data record to the data warehouse [105].

The data record could then be stored in the data warehouse [105] in a variety of manners. For example, in some implementations, when new data is added to the data warehouse [105], instead of overwriting the previously stored data (e.g., overwriting a price term in an offer with a new price term from a counter-offer), a new data record would be created with the new terms, and the previous data record would be kept as an archive. Similarly, some implementations, rather than storing all data for a document each time any of the data in that document is changed, might only store the changed data, thereby reducing the amount of space necessary to track the course of the transaction. Of course other variations, such as where a data warehouse [105] stores not only data entered by a buyer [101] or seller [102], but actually stores complete documents (e.g., PDFs) showing the steps along a negotiation, are also possible.

Of course, alternatives are also possible. For example, in some implementations, rather than communicating with separate systems, a modification control system [106] could refer to an internal clock to create a timestamp. Alternatively, a modification control system [106] might simply send data entered by the buyer [101] to the data warehouse [105], and the data warehouse [105] would be responsible for assembling the information provided into a data record. As another alternative, some implementations might include a modification control system [106] which is configured to perform fewer acts than described above, such as by creating a data record without a timestamp, or by relying on some pre-existing validation for the buyer's identity, rather than validating the buyer's identity when a change is to be made. Additional variations could also be implemented based on this disclosure, and will be immediately apparent to those of ordinary skill in the art. Accordingly, the above disclosure should be understood as being illustrative only, and not limiting.

Potential variations notwithstanding, once the new information had been added to the data warehouse [105], a system implemented according to the architecture shown in FIG. 1 could utilize a notification system [108] to notify the seller [102] of the buyer's changes. This notification could take place in a variety of manners. For example, the notification system [108] can generate and transmit one or more email messages notifying the seller [102] (and potentially also the buyer [101]) of the existence of the changes made by the buyer [101]. The email can contain an active link which, when activated, could cause a browser to automatically load a virtual form comprising one or more virtual fields having data representative of the current information with the changes made by the buyer [101]. Additionally, the notification system [108] could be configured to automatically generate a summary of the information added by the buyer [101] (e.g., "The buyer changed the price term from $100,000 to $80,000. No other changes were made") and might include that summary in the notification. Of course, notifications other than email, such as by phone, fax, instant message, or some other communication medium are also possible. Once the notification had been received, the seller [102] could accept the buyer's changes, or propose changes of his or her own and send them back to the buyer [101]. Also, in some implementations, a seller [102] could request to see a history of the negotiations, which could cause the history report generation system [110] to generate a markup showing 1) the current terms in the document(s) being negotiated; 2) changes made to those terms during the course of the negotiations; 3) when those changes were made; and 4) who made the changes. If the seller [102] chooses to accept the buyer's changes, and the information submitted by the buyer [101] (potentially combined with other pre-existing information from the data warehouse [105]) fully specified a real estate transaction, then a final and binding real estate purchase contract could be created.

Once a real estate purchase contract had been created, a system such as shown in FIG. 1 could use a physical form generation system [109] to create a physical embodiment of the purchase contract. This could take place, for example, by the physical form generation system [109] retrieving the most recent information about the property from the data warehouse [105], combining it with standard forms (e.g., agency disclosure forms, a contract to purchase, etc) and dynamically creating documents which could be printed and mailed to the buyer [101] and the seller [102]. In such a case, it is possible that a system such as shown in FIG. 1 could be used to allow a real estate purchase transaction to be completed without the buyer [101] and seller [102] ever meeting one another or exchanging a physical document. Further, in the event that there was a subsequent dispute about the negotiation or its final terms, the system as shown could use the functionality of the history report generation system [110] to create a markup showing how the negotiation had progressed, when the disputed terms were proposed, who proposed them, and when they were accepted, thereby saving substantial resources in potential litigation and/or other forms of dispute resolution.

Further, in addition to facilitating and creating records for a negotiation, a system implemented following the architecture of FIG. 1 could also be used to manage ongoing or potential transactions and negotiations. To illustrate, consider a case where the architecture of FIG. 1 is implemented so that a broker is able to enter multiple properties (e.g., through a seller property input component [104]) which are then sold through actual negotiations performed by various agents. In such a case, there could be support provided (e.g., by instructions incorporated into a central server, or by a dedicated distributed system) for functions which would allow the broker to manage the sales of the listed properties. For instance, an interface could be provided which would allow the broker to request a report on his or her properties. In response to such a request, data related to those properties could be retrieved from the data warehouse [105] and assembled into a report which would allow the broker to see data such as: average time to sale for properties in various areas at different price points, average closing versus asking prices for various agents, price and sales trends in different markets, or other information as might be appropriate or beneficial in a particular case. Using such information, the broker could potentially identify and address trouble spots before they became serious. For example, the broker could request to see his or her properties sorted by close rates of listing agents, so that the broker could work with agents who were not successfully making sales to try and improve performance. Similarly, in some variations, there could be software which automatically generates potential trouble reports, by scanning the data warehouse for patterns associated with problems (e.g., low close rate) and proactively bringing them to the broker's attention.

Of course, it should be understood that reporting and analytics functions based on information from the data warehouse [105] are not the only types of management functions which could be supported in systems implemented according to this disclosure. For example, data from the data warehouse [105] could be used to automatically evaluate offers (or counter-offers) for properties in a particular entity's (e.g., a bank's) portfolio by performing functions such as comparing those offers or counter offers to average prices in a particular market, evaluating time to sale at various price points versus carrying cost for the property, examining trends in prices in different regions, or other functions as might be appropriate in a particular case. This automatic evaluation could then be forwarded to the entity responsible for approving an offer or counter-offer, thereby vastly simplifying the process of disposing of real estate inventory. Similarly, in some cases there could be an option presented for a user to allow offers or counter-offers to be automatically accepted or rejected based on the evaluation performed using information from the data warehouse [105], or even to allow form offers to be automatically created in the same way. In some cases, there could even be special portals created which would support individual entities (or classes of entities, such as banks who have unwillingly become the owners of foreclosed properties). Other variations, such as providing tools (e.g., a scripting environment) which would allow entities to create their own rules for automatically evaluating/accepting/rejecting/creating offers could also be implemented and will be immediately apparent to those of ordinary skill in the art in light of this disclosure. Accordingly the discussion above should be understood as being illustrative only, and not limiting.

As another example of a type of management function which could be supported in some implementations of the disclosed technology, consider situations where support is provided for organizing and manipulating form portions of documents used in negotiation. For example, there might be different forms (or sets of forms, in a case where multiple documents are associated with a particular type of transaction) associated with individual users of the system (e.g., brokers) to allow those users to customize their documents to meet their particular preferences (such customization might be performed through a WYSIWYG editor, document uploads, modification of templates, or other techniques known to those of ordinary skill in the art). In a case where forms are susceptible to change, a data warehouse [105] could maintain archive versions of forms in a manner similar to that described above with recording terms, allowing both tracking of changes to forms over time, as well as association of terms entered into a form before a modification with the proper (archived) version of that form. Forms could also be organized according to other attributes, such as jurisdiction (e.g., different states might have different laws, so there could be different forms for different states which would automatically be used for transactions in the relevant states), type of transaction (e.g., purchase, lease, sale and lease back, property exchange, sales by owner, etc) and type of property (e.g., commercial real estate, residential with easements, residential with known defects (e.g., asbestos roofs), etc).

In some cases, these types of organization for form management functions could be leveraged to allow easy modification in response to changed circumstances. For example, if a new law was enacted in a particular jurisdiction, some implementations might allow a user to pull up the standard forms for that jurisdiction, and make changes in response to the new law, allowing the user to have access to up to date forms without requiring making modifications for the forms for every transaction. Of course, similar approaches could also be taken with terms, rather than being restricted to forms. For example, in the case where a seller [102] has multiple offers outstanding with terms based on a first economic assumption, if he or she learns that that assumption was incorrect, a system could provide an option where all offers with terms based on the first assumption would be automatically revised (after being withdrawn, if necessary) to take into account the changed circumstances. Accordingly, the disclosure set forth above should be understood as being illustrative only, and not limiting.

While the above disclosure described a variety of modifications and variations on the uses and implementations of the architecture of FIG. 1, it should be understood that the technology disclosed herein is not limited to the architecture of FIG. 1, and that other types of organizations are also contemplated by the inventors and will be immediately apparent to those of ordinary skill in the art in light of this disclosure. For example, in some cases, a system could be implemented with entirely different architectures than depicted in FIG. 1, such as architectures where functionality of different components shown in FIG. 1 could be combined in a centralized server. Examples of architectures which utilize various levels of combination and centralization are set forth in FIGS. 2a-2e. Other types of variation are also possible. For example, FIG. 1 depicts various components communicating with one another over a local area network (LAN) connection, and other components communicating over the Internet. However, it is possible that components could communicate over different types of networks entirely (e.g., storage networks, wireless networks, etc), or could be organized so that different combinations of components communicate with one another over different types of networks than depicted. Similarly, in some implementations, certain components might be omitted entirely, or might be combined with other components depicted (e.g., a modification control system [106] could be integrated with a data warehouse [105]). Accordingly, both FIG. 1 and the accompanying disclosure should be understood as being illustrative only, and not limiting.

Figure 3A:
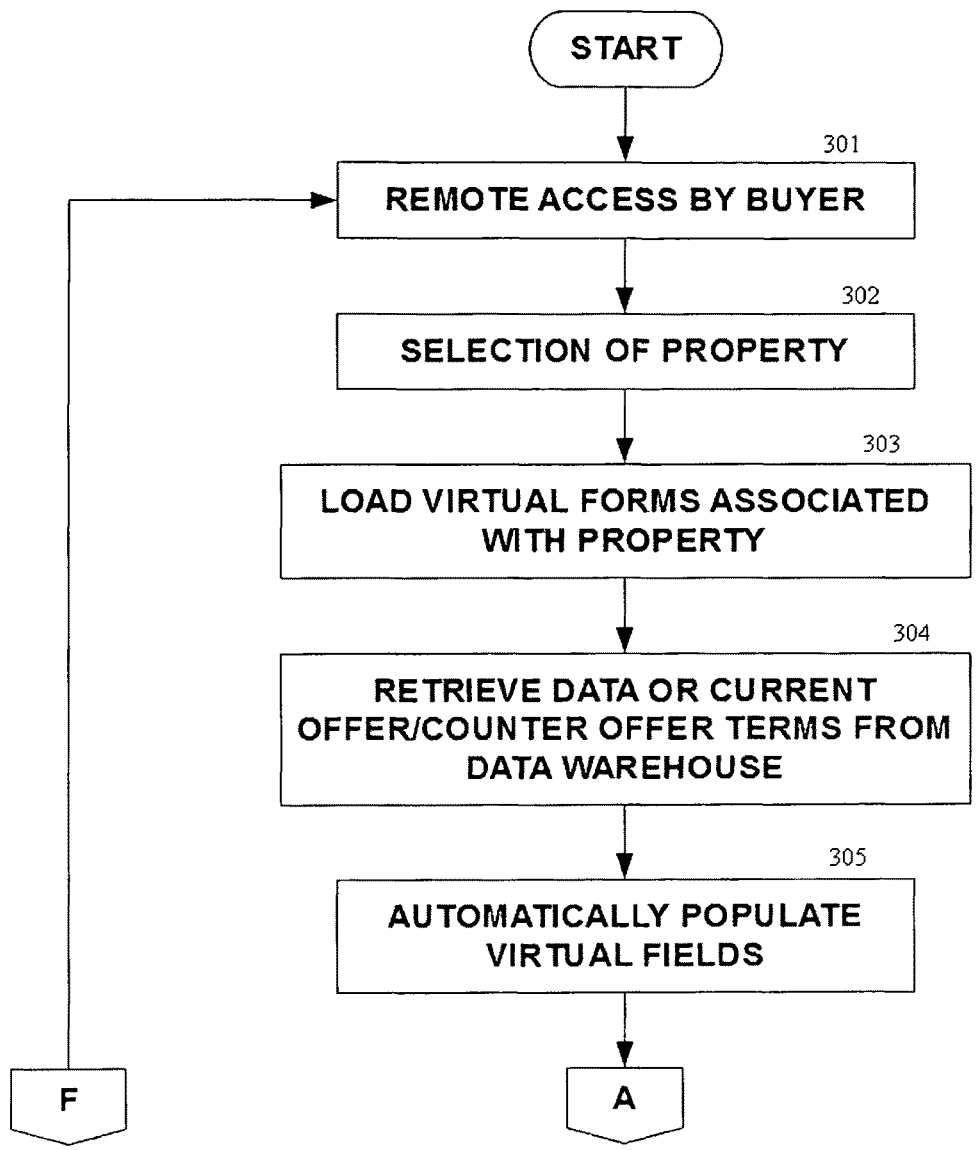
FIGS. 3a-3f depict potential sequences of events for a negotiation between a buyer and a seller.
Figure 3B:
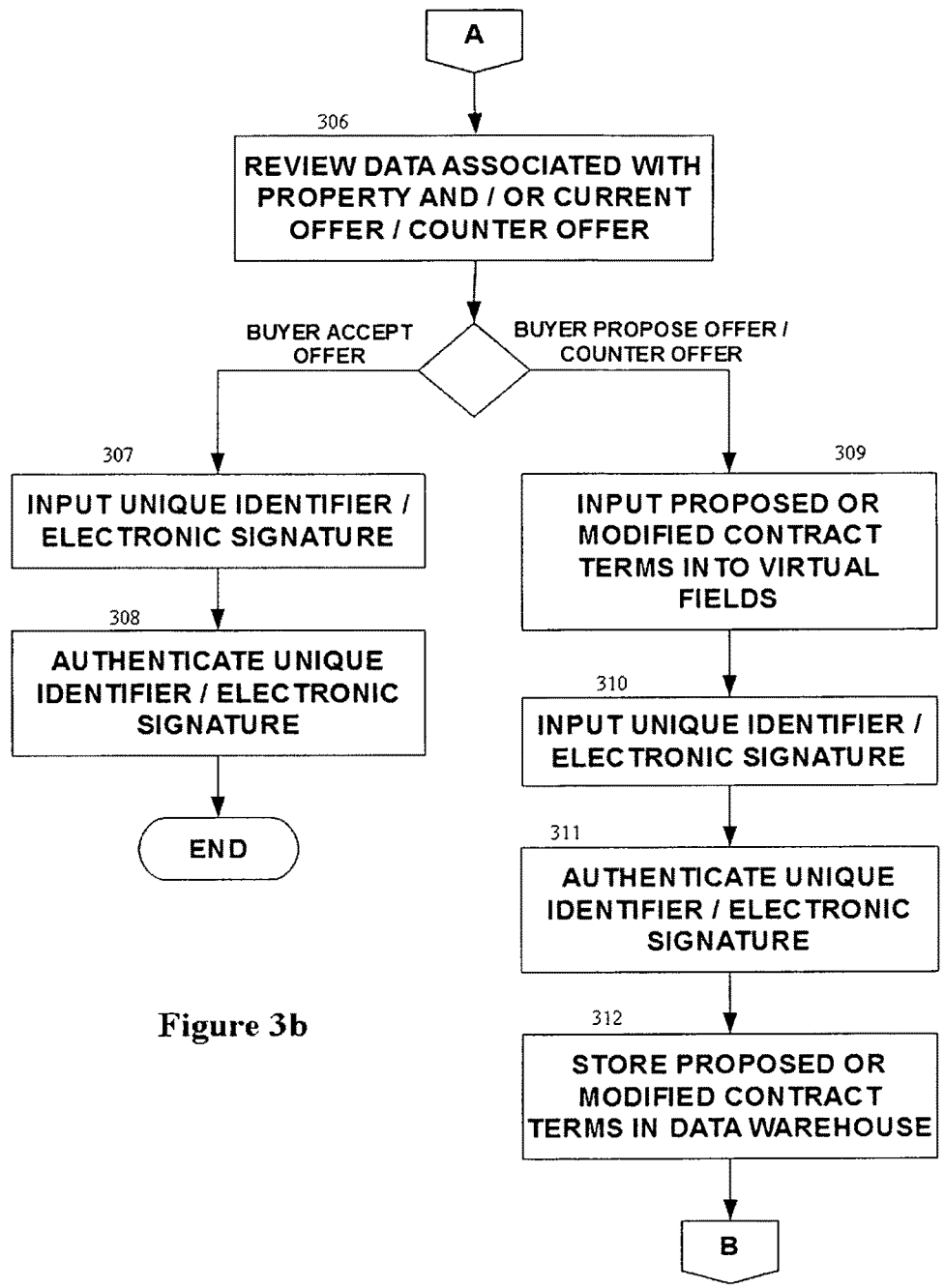

Moving on from the component centric disclosure set forth above, FIGS. 3a-3f set forth potential sequences of events for a negotiation between a buyer and a seller which could take place utilizing systems implemented by those of ordinary skill in the art using aspects of this disclosure. FIG. 3a depicts a sequence of events which could be triggered by a buyer accessing a system such as described above from a remote location [301]. Initially, a buyer might access the system [301] and select a property that he or she is interested in making an offer on [302]. This selection of a property [302] can be accomplished in a variety of ways. For example, in some cases it is possible that a web component [103] could provide a buyer (or the buyer's agent) with access to a search tool (e.g., such as the search tool [401] shown in FIG. 4). In such a case, the buyer (or his or her agent) could provide information about, for example, a neighborhood where he or she is interested in making an offer for a property (e.g., by adding a zip code to the search tool [401]). Alternatively, it is possible that the buyer may have already decided on a property he or she wishes to purchase, and could simply add the house number to the search tool [401]. Once the information is added to the search tool [401] a search of the data warehouse could be conducted to find properties which match the information provided in the search tool [401], and then provide a list of such properties in a results area (not shown in FIG. 4), and the buyer would select one of the properties from the list to continue the process.

Figure 5:
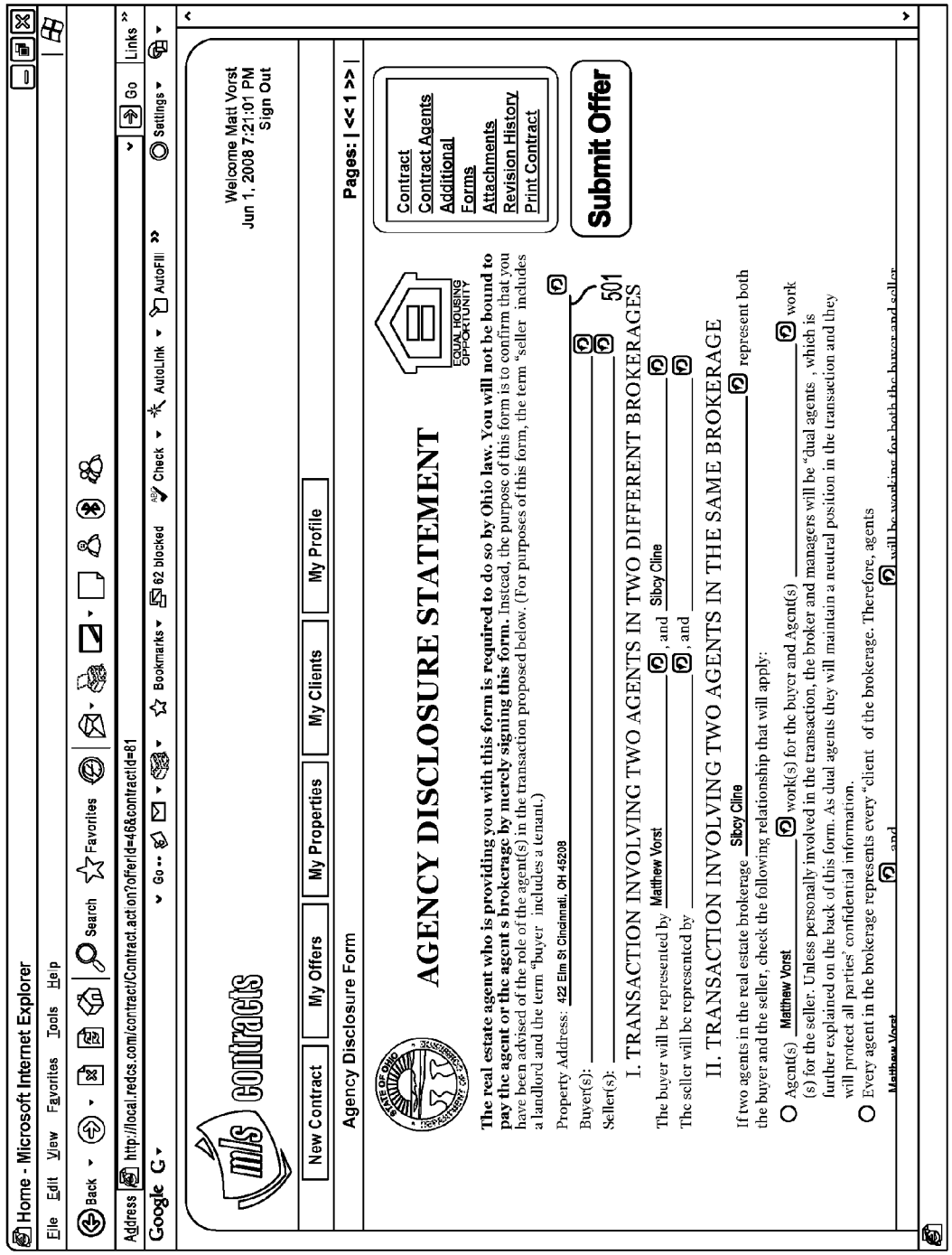
FIG. 5 depicts an interface associated with an agency disclosure statement.

Once the buyer had selected a property [302], the process shown in FIG. 3a could continue with the system automatically loading virtual forms associated with the selected property [303]. These virtual forms could comprise electronic documents (e.g., web pages) which are designed to have the appearance of standard real estate contract forms (e.g., an agency disclosure statement as shown in FIG. 5, a contract to purchase, etc). However, rather than being actual forms (e.g., PDF documents containing the relevant information) they could be simply placeholder documents into which data from a data warehouse could be retrieved [304] and inserted [305]. For example, a virtual form could be an HTML document such as shown in the file submitted herewith entitled "ADSource.txt" which could present the appearance of a standard agency disclosure form when viewed through a web browser, and which would retrieve information from a data warehouse using calls such as "lookupAgentName(this)" and insert that information into virtual fields [501] in the form. Of course, it should be understood that other types of virtual forms could be used. For example, in some implementations, there might be PDF documents which are automatically created by combining standard forms with information from a data warehouse, then displayed to the buyer. Similarly, there could be documents which are stored in a data warehouse in a fully or partially complete state (e.g., the listing agent for a property might be included in advance, and then the buyer's agent might be added dynamically for each individual customer) rather than having all information added dynamically.

Figure 3C:
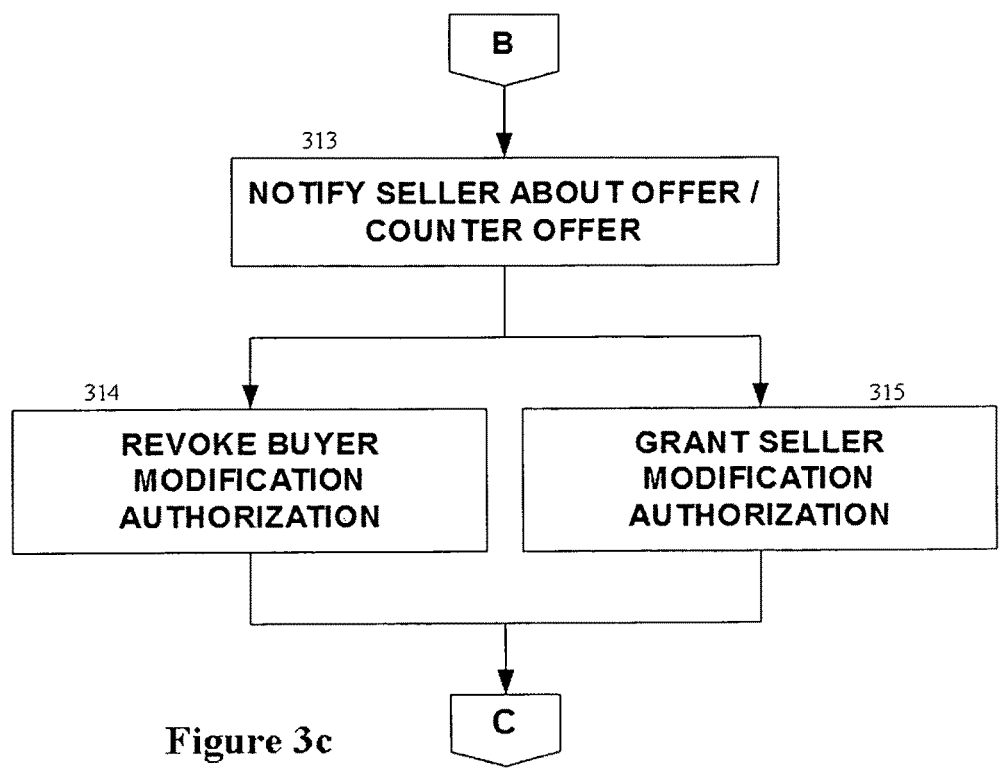
Figure 4:
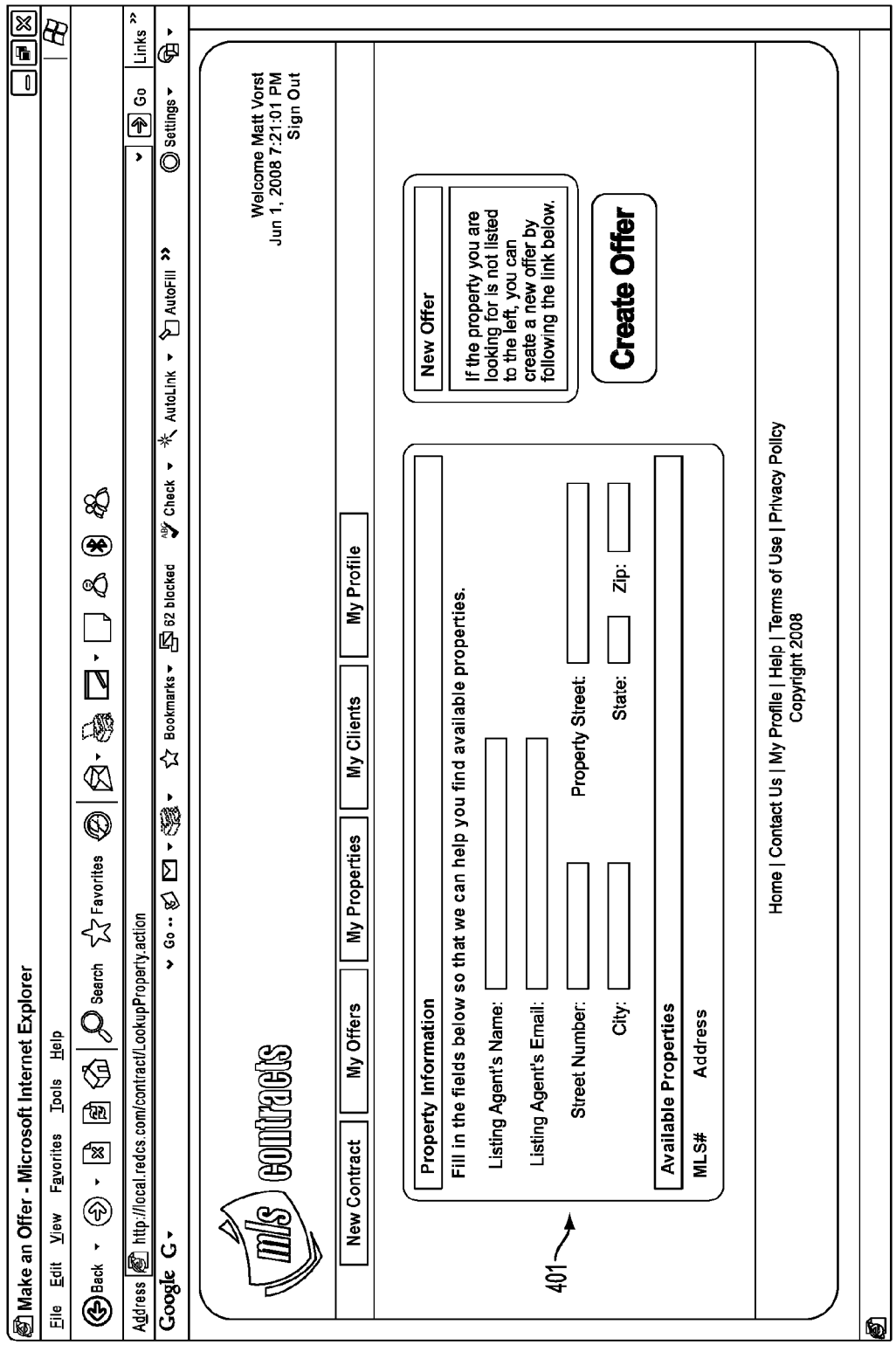
FIG. 4 depicts an interface including a search tool.

Regardless of the techniques used in presenting data to the buyer, once that data had been presented, the process described above could continue as shown in FIG. 3b, with the buyer reviewing the data displayed in the virtual form [306]. If the data displayed in the virtual form is complete (e.g., there is data in all fields in the virtual form) the buyer can then accept the form as an offer to form a real estate purchase contract, and input a unique identifier [307] to indicate his or her acceptance of the terms. The identifier could then be authenticated [308], and the negotiation could end. Alternatively, it is possible that a buyer could input proposed or modified contract terms into virtual fields [501] to create a counter-offer. Once the buyer made all appropriate changes/ additions, he or she could input an electronic signature or other identifier [310], and that signature or other identifier could be authenticated [311]. Once the identifier had been authenticated [311], the changes to the proposed terms could be stored in the data warehouse [312], and the negotiation could continue, with the seller being notified of the changes made by the buyer [313] as shown in FIG. 3c.

After the changes made by a buyer had been entered into the data warehouse [312], in addition to notifying the seller of those changes [313], some implementations of the technology set forth herein could include steps where the buyer's authorization for making further changes would be revoked [314], and authorization for making changes to the new terms would be granted to the seller [315]. In practice, this could be implemented by, once a buyer has committed changes to the data warehouse, modifying the buyer's permissions from read/write to read only, and modifying the seller's permissions (which might have been set as read only while the buyer was reviewing the terms) to read/write. Additionally, in some implementations, more complicated functionality than simply exchanging permissions could be used. For example, there could be support for time-limited offers, where a party could specify that an offer would be good only for a certain time period, after which the ability of the other party to accept the terms would cease, and the ability of the parties to view and/or modify terms would revert to its state from before the offer was made. Similarly, some implementations might allow a user who had made an offer to withdraw that offer (i.e., remove the other party's ability to accept and thereby create a binding contract) even if the user who had made the offer otherwise did not have the ability to change the offer's terms. Additional negotiating functionality, such as the ability to make alternative offers (e.g., accept price 1 with down payment 1, or price 2 with down payment 2), or the ability to make form offers (e.g., a seller could make an offer available to multiple buyers, effectively turning a two party sale into an auction, where the best counter-offer from any buyer could either be accepted or become the new basis for negotiating with all buyers) could also be supported. Accordingly, the authorization exchange depicted in FIG. 3c should be understood as being illustrative only, and not limiting.

Figure 3D:
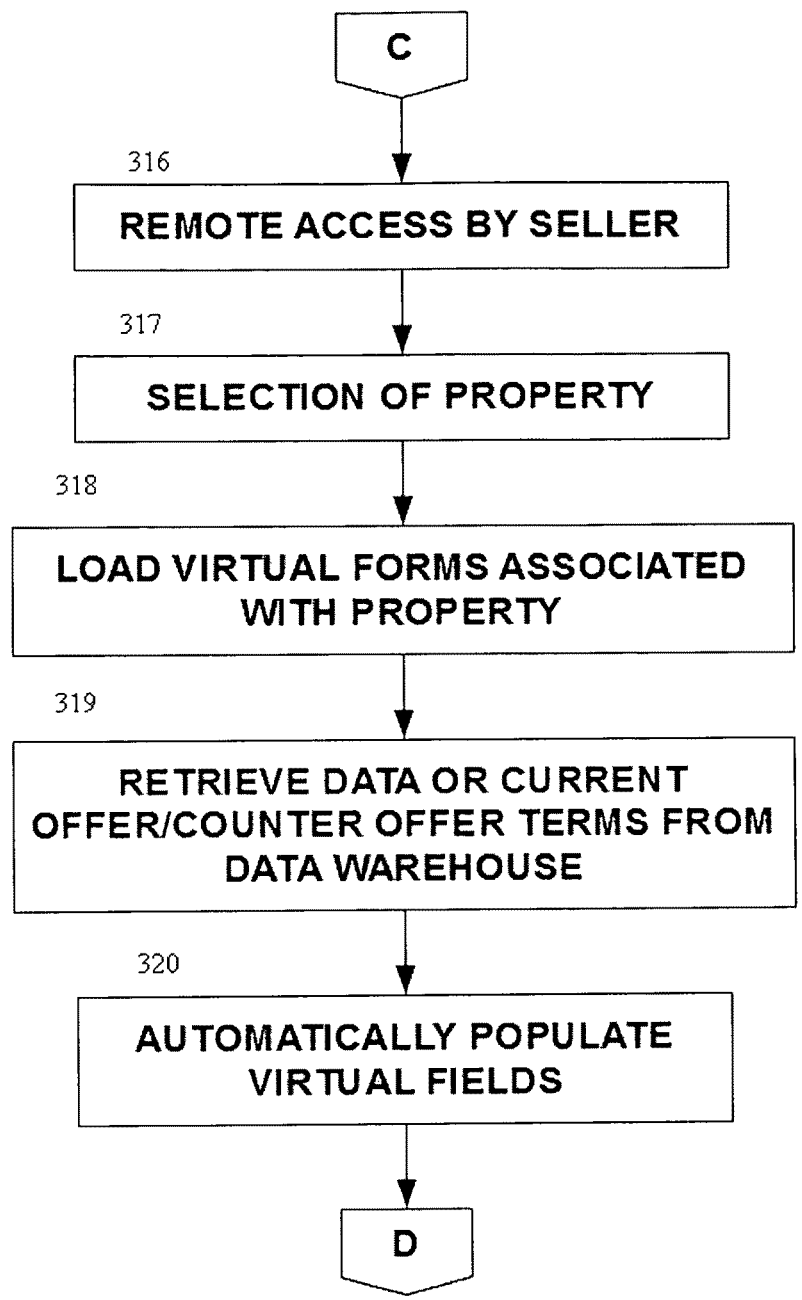
Figure 3E:
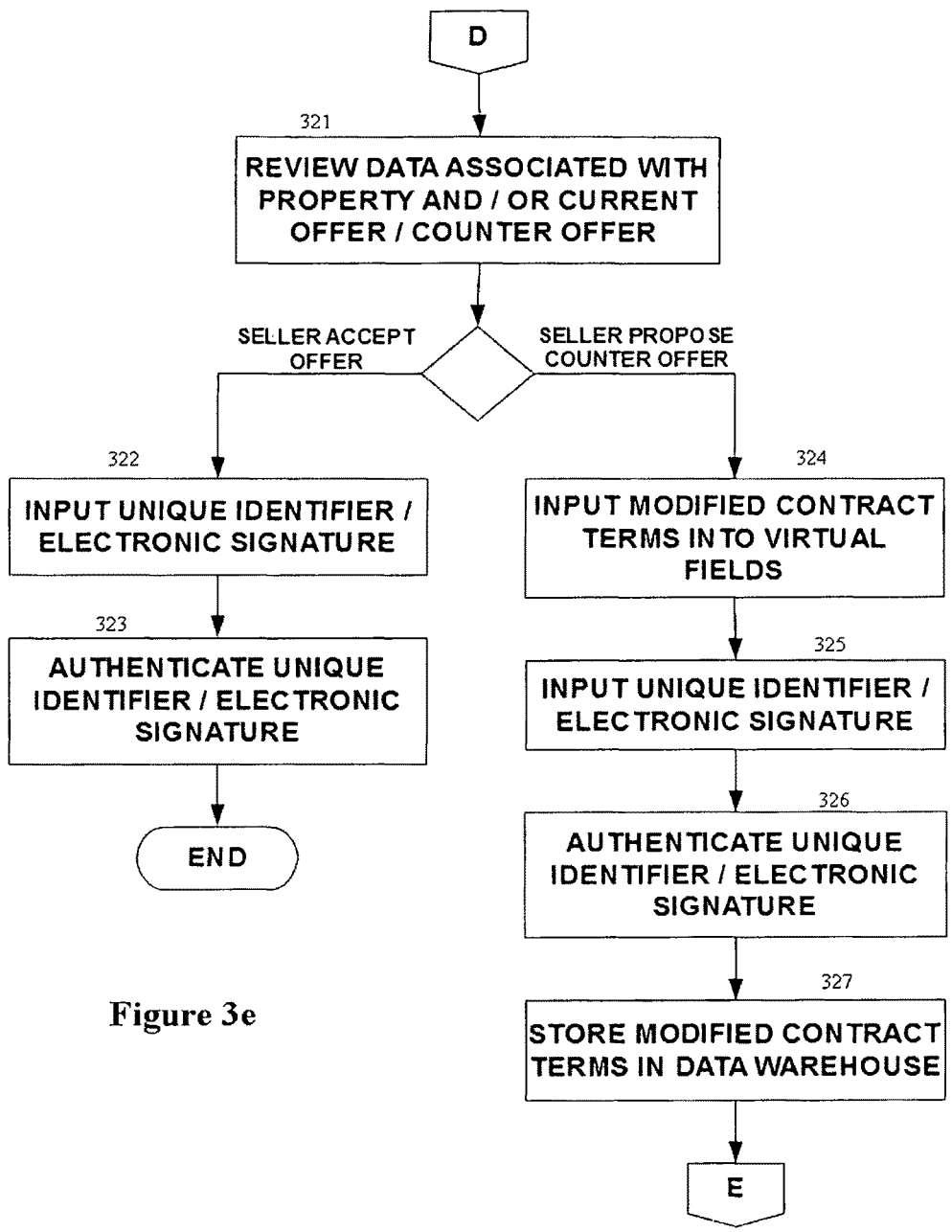
Figure 3F:
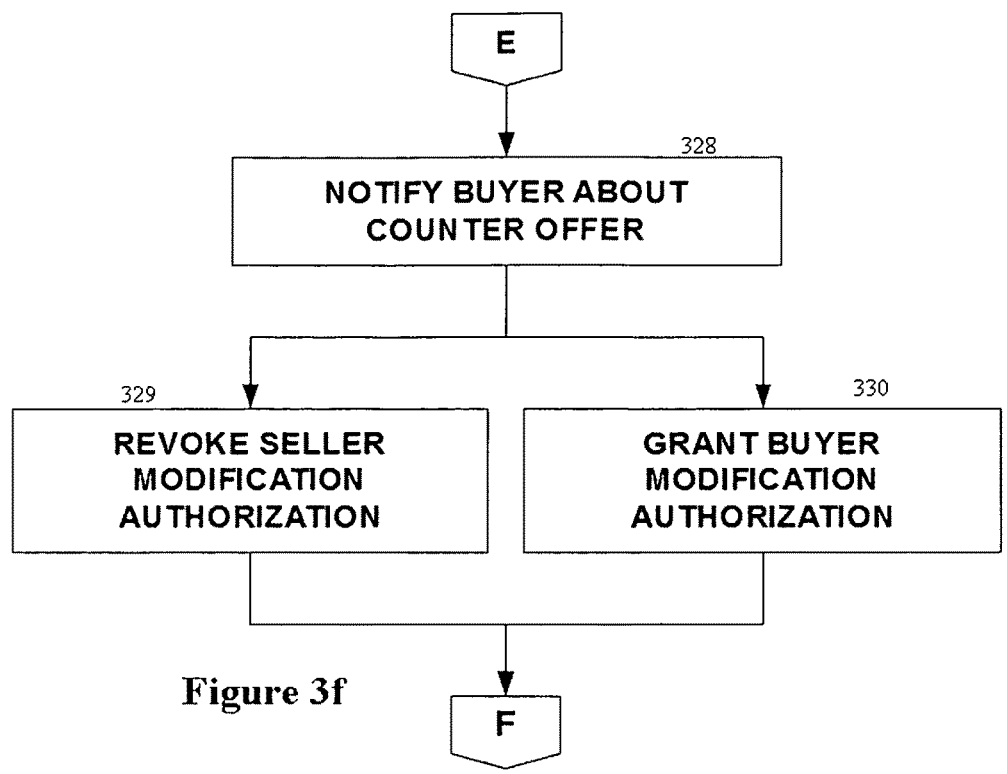

Once modification authorization has been revoked from the buyer [314] and granted to the seller [315], the seller can engage in a process which is essentially parallel to that discussed above with respect to the buyer. As shown in FIG. 3d, this can include the seller accessing the system from a remote location [316], selecting the property [317] associated with the buyer's counter-offer, loading the forms [318] and retrieving the data [319] associated with the counter-offer, and populating the data into the forms [320] so that the counter-offer can be considered. The similarities continue with the steps of a seller reviewing data associated with a current offer [321], inputting a unique electronic signature [322][325], authenticating the signature [323][326], adding modified contract terms into virtual fields [324], and storing the modified terms in the data warehouse [327]. There can also be similar steps of sending a notification to the buyer [328], revoking the seller's modification authorization [329], and granting authorization modification to the buyer [330], as shown in FIG. 3f. This type of offer and counter-offer cycle can then continue until one side or the other accepts an offer, and the process ends.

Of course, it should be understood that systems implemented according to the teachings of this disclosure are not limited to being used in processes such as described above and illustrated in FIGS. 3a-3f. As an illustration of this, in some cases, a system could be implemented to provide support for activities which might take place after a negotiation was completed. For example, there could be a payment system which would automatically transfer funds from an account associated with a buyer (e.g., a bank which had agreed to issue a mortgage to the buyer) to an account associated with a seller (e.g., an escrow account for closing funds, the bank holding the seller's outstanding mortgage, the seller himself or herself, or some combination of those and/or other accounts). Systems discussed above could also be included in after-transaction activities, such as a notification system [108], which could be configured to instead of (or as an alternative to) notifying the seller of the acceptance, send instructions to third parties to perform the physical acts that might be necessary to complete a sale (e.g., record title to a deed, provide the buyer with a physical key to the property purchased, generating triggers to activate or transfer utilities, etc).

Variations where a real estate (or other) type of negotiation includes steps which take place before those depicted in FIGS. 3a-3f are also possible. For example, there could be a method during which terms that are not subject to negotiation (e.g., the name of the buyer or seller's agents, the location of a particular property, etc) are agreed on during a face-to-face meeting between a buyer and a seller, and then the negotiation process would start after one of the parties inputs those terms, along with an initial offer, into the system. In such a case, the party entering terms into the system to begin the negotiation process could be presented with a wizard, which would walk the party through the various documents to be completed, and the information required to complete them. Of course, such a wizard is not a requirement, and it is possible that a party entering information related to a property could use interfaces such as described above with respect to FIGS. 3a-3f for the initial data entry. Additionally, variations in negotiation methods which could be performed based on this disclosure are not limited to modifying FIGS. 3a-3f by adding steps before or after those depicted in the figures. For example, in some cases, a negotiation method (and supporting infrastructure) could be implemented to include fewer steps than discussed previously. To illustrate, consider a case where a seller is negotiating the sale of a single property to a buyer. In such a case, it might be that a system would automatically provide the participants with the latest information related to that single property, thereby removing the property selection steps described above.

Also, it is possible that some systems could be implemented to support changes to the structure of negotiation described above. For example, some systems might have roles for agents which are independent of the buyers/sellers themselves. To illustrate, consider a system implemented such that permission to modify information or add terms to a data warehouse would reside with real estate agents (e.g., realtors representing buyers and sellers), while permission to approve terms or changes would reside with their principals (e.g., the buyers and sellers). In a negotiation which takes place using such a system, a real estate agent (e.g., the buyer's agent) might create a set of terms which would then be submitted to the agent's principal (e.g., the buyer). The buyer could then approve those terms by providing a unique electronic identifier, at which point the agent would add them to the data warehouse, and modification authorization would pass to the other agent (e.g., the seller's agent) who could make additional modifications in a similar manner. If the principal does not approve terms, then he or she could request that the terms be modified by his or her agent. Once the changes are made by the agent, they could be resubmitted to the principal for approval. To support such an interaction, there could be functionality built into a system which would allow the principals and their agents to communicate with one another (e.g., over instant message while viewing or collaboratively editing terms), or even engage in mini-negotiations amongst themselves (e.g., when trying to prepare a counter-offer).

Similarly, systems could be set up to facilitate different types of transactions, such as property swaps. For example, this could take place by allowing a user to specify the characteristics (e.g., price, location, lot size, etc) of a property that he or she wishes to exchange, along with the characteristics of properties that the user would be willing to exchange for. Once these characteristics had been entered, the system could perform a search to identify other users wishing to swap properties who had compatible desired and current property characteristics. The system could then automatically suggest potential swap opportunities based on characteristic compatibility. Of course, it is also possible that users of the system might independently decide on properties they wished to exchange. In such a situation, the system could retrieve the relevant information regarding those properties from the data warehouse and use it to automatically populate the appropriate documents. Other variations are also possible, and will be immediately apparent to those of ordinary skill in the art in light of this disclosure. Accordingly, the description set forth herein should be understood as being illustrative only, and not limiting.

A further illustration of potential applications of technology such as disclosed herein is provided by the computer program listing appendix, which is submitted herewith and incorporated herein by reference in its entirety. In particular, the computer program listing appendix provides code which, when used to configure a server, can provide certain aspects of an interactive electronic real estate negotiating system such as described above with respect to FIG. 1. Additionally, the code in the computer program listing appendix (or portions thereof) could be used to support functionality such: as assembling packages of forms based on a request that is submitted (e.g., whether someone is listing for sale, leasing, or purchase), continuing from one form to another as if they were the same physical form based on selection of a form-set, administrative reporting and managing analytical information, and transferring access to shared documents based on identifying a property to submit an offer on. Of course, it should be understood that the computer program listing appendix is provided as an illustration only, and that various implementations may include different (or additional) features, and may implement those features in manners other than used in the provided code. As a result, the computer program listing appendix, like the other portions of this disclosure, should be understood as being illustrative only, and not limiting.

While the above discussion focused on implementations in which the disclosed technology is used in the formation of real estate purchase contracts, it should be understood that the inventors' technology is not limited to being implemented in the manners explicitly described. For example, the approaches described herein could be applied in other contexts where multiple parties might be involved in deciding or approving terms. These contexts include (but are not limited to) the creation of corporate policies (e.g., where multiple committees would have to sign off on the contents of a new policy before it could be put into place), approval of vendor contracts, or the creation of form documents. In some cases, applications of the described technology in these other contexts might include modifications which reflect the requirements of those contexts. For example, in a corporate context, where there may be multiple decision makers, authorization to make modifications might be passed to multiple parties concurrently (e.g., all members of a committee), or might be passed with one party (e.g., a committee chair) having authorization to make modifications, but other parties (e.g., committee members) having to give approvals. Of course, it should be understood that such variations could also be implemented in the context of real estate purchase contracts, and that other variations are also possible, and will be immediately apparent to those of ordinary skill in the art.

Additionally, some applications may utilize only a portion of the techniques described herein. For example, there could be some applications which would include exchanging of modification authorization as described, but would not necessarily include the association of modifications with identifiers. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, "based on" should be understood to mean that something is determined at least in part by the thing that it is indicated as being "based on." When something is completely determined by a thing, it will be described as being "based EXCLUSIVELY on" the thing.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, "corresponding data elements" should be understood to refer to data elements which, while distinct, refer to the same subject matter. For example, in a real estate purchase contract, if a first user creates an offer with a first data element representing a first price for the sale of the property, and a second user responds by making a counter-offer with a second data element representing a second price for the sale of the property, the first and second data elements would be "corresponding data elements."

When used in the claims, "data" should be understood to refer to information which is represented in a form which is capable of being processed, stored and/or transmitted.

When used in the claims, the term "data element" should be understood to refer to an identifiable and distinct entity expressed in a form (e.g., data stored in a computer readable medium) which can be manipulated by a computer.

When used in the claims, "data warehouse" should be understood be to refer to a device or set of devices which maintains a collection of data in a manner such that the data can be retrieved by a computer.

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, a "form portion" should be understood to refer to a part of something which is susceptible of multiple uses in similar circumstances, such as a template.

When used in the claims, a "real estate transaction contract" should be understood to refer to a document in which two or more parties exchange promises to take or not to take certain actions with respect to land, structures or other forms of real property.

When used in the claims, "remote" should be understood to refer to the relationship between entities which are physically distant from one another, such as between entities that communicate over a network.

When used in the claims, "restrict" should be understood to refer to impeding, either partially or completely, the ability of an entity to perform the "restricted" activity.

When used in the claims, the term "set" should be understood to refer to a number, group, or combination of zero or more things of similar nature, design, or function.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

Accordingly, we claim:

1. A computing device comprising a non-transitory non-volatile computer-readable storage device including instructions, which when executed by a processor of the computing device, cause the computing device to:
   present, to a first user, a human-readable representation of an initial version of a virtual real estate transaction document comprising an editable field, wherein the virtual real estate document is an electronic representation of a corresponding physical real estate transaction document and visually similar to the physical real estate transaction document;
   receive, from the first user, a first user-specified data element designated for insertion into the editable field of the virtual real estate transaction document;
   create a first user record in a data store;
   store in the first user record of the data store the first user-specified data element designated for insertion into the editable field of the virtual real estate transaction document;
   restrict, in response to storage of the first user-specified data element, the first user from adding information to the first user record and authorize a second user to add information to the editable field of the virtual real estate transaction document;
   apply a digital signature to a human-readable representation of a first modified version of the virtual real estate transaction document, the human-readable representation of the first modified version of the virtual real estate transaction document is based at least in part upon the initial version of the virtual real estate transaction document and the first user-specified data element, wherein the first user-specified data element visually presented in the editable field;

present, to the second user, the human-readable representation of the first modified version of the virtual real estate transaction document;

receive, from the second user, a second user-specified data element designated for insertion into the editable field of the first modified version of the virtual real estate transaction document;

create a second user record in the data store;

store, in the second user record in the data store, the second user-specified data element designated for insertion into the editable field of the virtual real estate transaction document in the second data record;

restrict, in response to storage of the second user-specified data element, the second user from adding information to the second user record and authorize the first user to add information to the editable field of the virtual real estate transaction document;

generate, in response to storage of the second user-specified data element, a notification for receipt by the first user that comprises a summary of changes made by the second user to the editable field of the first modified version of the virtual real estate transaction document;

present, to the first user, a human-readable representation of a second modified version of the virtual real estate transaction document that is based at least in part upon the initial version of the virtual real estate transaction document and the second user-specified data element, the second user-specified data element visually presented in the editable field;

based on receipt of a request for a document history, retrieve, from the data store, a set of records, the set of records comprising the first user-specified data element designated for insertion by the first user and the second user-specified data element designated for insertion by the second user; and display the document history, the document history comprising the first user-specified data element received from the first user for insertion into the editable field of the virtual real estate transaction document, the second user-specified data element received from the second user for insertion into the editable field of the virtual real estate transaction document, a markup showing differences in corresponding data elements between records, and an indication of whether each data element was provided by the first user or the second user.

2. The computing device of claim 1, wherein the instructions further cause the computing device to refuse to store in the data store any user-specified data element designated for insertion into the editable field of the virtual real estate transaction document in response to receipt of an indication.

3. The computing device of claim 2, wherein the indication indicates that an identified user-specified data element designated for insertion into the editable field of the virtual real estate transaction document is a final user-specified data element.

4. The computing device of claim 3, wherein the instructions further cause the computing device to store a read-only version of the virtual real estate transaction document, wherein the read-only version of the virtual real estate transaction document comprises the final user-specified data element.

5. The computing device of claim 1, wherein the instructions further cause the computing device to authenticate at least one of the user-pecified data elements designated for insertion into the editable field of the virtual real estate transaction document.

6. The computing device of claim 5, wherein to authenticate at least one of the user-specified data elements designated for insertion into the editable field of the virtual real estate transaction document is based at least partially on user authentication credentials.

7. The computing device of claim 6, wherein the user authentication credentials comprise a username and a password.

8. The computing device of claim 6, wherein the user authentication credentials comprise the digital signature.

9. The computing device of claim 4, wherein the instructions further cause the computing device to create a physical real estate transaction document based at least in part upon the read-only version of the virtual document.

10. A method for editing virtual real estate transactional documents, comprising:

displaying a virtual real estate transactional document, the virtual real estate transactional document graphically displayed to appear visually similar to a corresponding physical real estate transactional document;

creating a first user record in a data store;

receiving, from a first user, a first data element for insertion into at least one editable field of the virtual real estate transactional document;

storing, in the first user record of the data store, the first data element;

subsequent to storing the first data element, restricting the first user from adding information to the first user record and authorizing a second user to add information to the at least one editable field of the virtual real estate transactional document;

applying a digital signature to a first modified virtual real estate transactional document, the first modified virtual real estate transactional document comprises the first data element visually presented in the at least one editable field;

displaying, for the second user, first modified virtual real estate transactional document;

in response to receiving an indication of acceptance of the second user, designating the first data element as a final data element and restricting the second user from adding information to the at least one editable field;

in response to not receiving the indication of acceptance of the second user, creating a second user record in the data store and receiving, from the second user, a second data element for insertion into the at least one editable field of the first modified virtual real estate transactional document;

storing the second data element in the second user record of the data store;

generating, in response to storing the second data element, a notification for receipt by the first user that comprises a summary of changes made by the second user to the at least one editable field;

displaying, for the first user, a second modified electronic version of the virtual real estate transactional document that comprises one of the second data element and the final data element in the at least one editable field;

when the virtual real estate transactional document comprises the second data element, receiving an indication of acceptance of the first user and designating the second data element as the final data element;

based on receiving a request for a document history, retrieving, from the data store, a set of records, the set of records comprising the first data element and the second first data element; and displaying the document history, the document history comprising the first data element received from the first user for insertion into the at least one editable field, the second data element received from the second user for insertion into the at least one editable field, a markup showing differences in corresponding data elements between records, and an indication of whether each data element was provided by the first user or the second user.

11. The method of claim 10, further comprising authenticating each user.

12. The method of claim 11, wherein authenticating each user comprises using access credentials comprising a username and a password.

13. The method of claim 10, further comprising authenticating each of the first and second data elements.

14. The method of claim 13, wherein the digital signature comprises a first digital signature of the first user; and
wherein authenticating each of the first and second data elements comprises at least one of (i) referencing login information for at least one user and (ii) one of referencing the first digital signature of the first user and reference a second digital signature of the second user.

15. The method of claim 10, further comprising authenticating each acceptance.

16. The method of claim 15, wherein authenticating each acceptance includes referencing login information for at least one user.

17. A method, comprising
accessing, from a data store, a virtual real estate transaction document;
presenting, to a first user, a human-readable representation of an initial version of the virtual real estate transaction document comprising an editable field, wherein the virtual real estate transaction document is a visually similar electronic representation of a corresponding physical real estate transaction document;
creating a first user record in the data store;
receiving, from the first user, a first user-specified data element designated for insertion into the editable field of the virtual real estate transaction document;
storing, in the first user record, the first user-specified data element designated for insertion into the editable field of the virtual real estate transaction document;
restricting, in response to storing the first user-specified data element, the first user from altering the first user-specified data element designated for insertion into the editable field of the virtual real estate transaction document;
applying a digital signature to a human-readable representation of a first modified version of the virtual real estate transaction document, the human-readable representation of the first modified version of the virtual real estate transaction is based at least in part upon the initial version of the virtual real estate transaction document and the first user-specified data element, wherein the first modified version of the virtual real estate transaction document is a visually similar representation of the physical real estate transaction document populated with the first user-specified data element;
presenting, to a second user, the human-readable representation of the first modified version of the virtual real estate transaction document;
creating a second user record in the data store;
receiving, from the second user, a second user-specified data element designated for insertion into the editable field of the virtual real estate transaction document;
storing, in the second user record, the second user-specified data element designated for insertion into the editable field of the virtual real estate transaction document;
restricting, in response to storing the second user-specified data element, the second user from altering the second user-specified data element designated for insertion into the editable field of the virtual real estate transaction document;
generating, in response to storing the second user-specified data element, a notification for receipt by the first user that comprises a summary of changes made by the second user to the editable field of the virtual real estate transaction document;
presenting, to the first user, a human-readable representation of a second modified version of the virtual real estate transaction document that is based at least in part upon the second user-specified data element, wherein the second modified version of the virtual real estate transaction document is a visually similar representation of the physical document populated with the second user-specified data element;
based on receiving a request for a document history, retrieving, from the data store, a set of records, the set of records comprising the first user-specified data element designated for insertion by the first user and the second user-specified data element designated for insertion by the second user; and
displaying the document history, the document history comprising the first user-specified data element received from the first user for insertion into the editable field of the virtual real estate transaction document, the second user-specified data element received from the second user for insertion into the editable field of the virtual real estate transaction document, a markup showing differences in corresponding data elements between records, and an indication of whether each data element was provided by the first user or the second user.

* * * * *